US008423460B2

(12) United States Patent
Kay et al.

(10) Patent No.: US 8,423,460 B2
(45) Date of Patent: Apr. 16, 2013

(54) METHOD OF SETTLING COMMERCIAL INDEBTEDNESS

(75) Inventors: Alan William Kay, Gloucestershire (GB); Roy David Hatfield, London (GB); Jonathan Nicholas Kay, Worcestershire (GB); Anthony Alan Harte, Hertfrodshire (GB); Michael Steven Hirst, Lancashire (GB)

(73) Assignee: Obilisk Supplier Finance (UK) Limited, Marlow (GB)

( * ) Notice: Subject to any disclaimer, the term of this patent is extended or adjusted under 35 U.S.C. 154(b) by 738 days.

(21) Appl. No.: 11/568,439

(22) PCT Filed: Apr. 29, 2005

(86) PCT No.: PCT/GB2005/001655
§ 371 (c)(1),
(2), (4) Date: Oct. 27, 2006

(87) PCT Pub. No.: WO2005/106726
PCT Pub. Date: Oct. 11, 2005

(65) Prior Publication Data
US 2008/0249848 A1 Oct. 9, 2008

(30) Foreign Application Priority Data
Apr. 29, 2004 (GB) .................................. 0409610.3

(51) Int. Cl.
*G06Q 40/00* (2012.01)
(52) U.S. Cl.
USPC ............................................. 705/40; 705/38
(58) Field of Classification Search .................... 705/40, 705/38
See application file for complete search history.

(56) References Cited

U.S. PATENT DOCUMENTS

| 5,285,383 | A | 2/1994 | Lindsey et al. |
| 5,465,206 | A * | 11/1995 | Hilt et al. ........................ 705/40 |
| 5,710,889 | A | 1/1998 | Clark et al. |
| 5,717,989 | A | 2/1998 | Tozzoli et al. |
| 5,727,165 | A | 3/1998 | Ordish et al. |
| 5,890,140 | A | 3/1999 | Clark et al. |
| 7,155,409 | B1 | 12/2006 | Stroh |
| 7,206,768 | B1 | 4/2007 | deGroeve |
| 7,765,161 | B2 | 7/2010 | McKenney |
| 2001/0018739 | A1 | 8/2001 | Anderson et al. |

FOREIGN PATENT DOCUMENTS

WO 00/52555 A 8/2000

*Primary Examiner* — Thomas Dixon
*Assistant Examiner* — Benjamin S Fields
(74) *Attorney, Agent, or Firm* — Brooks Kushman P.C.

(57) ABSTRACT

A method whereby vendors and purchasers settle invoices and account for sales taxes, integrated with the drawing, accepting, guaranteeing, endorsing, discounting, presenting, and cash settlement of electronic bills of exchange in all traded currencies (Ebill). Ebills are activated automatically as a direct consequence of the approval of one or more invoices for payment. Acceptance is against a guarantee with a managed credit risk limit or endorsed Ebills. Settlement is also activated by matching a purchase order to a goods received or delivery note or bill of lading. A single instance of each invoice and Ebill is held for all functions required by vendors, purchasers, risk managers, Ebill traders, discounters, guarantors and banks. Trading accounts are represented by a single ledger instance with automated updating of their back-office ledgers. Settlement reconciliation is supported by messages related to individual transactions and by quantified debit advice notes reconciled with credit notes.

38 Claims, 47 Drawing Sheets

Overview

U.S. PATENT DOCUMENTS

| | | |
|---|---|---|
| 2002/0013767 A1 | 1/2002 | Katz |
| 2002/0026394 A1 | 2/2002 | Savage et al. |
| 2002/0082990 A1* | 6/2002 | Jones ............................ 705/40 |
| 2002/0103754 A1 | 8/2002 | Dunlop |
| 2003/0023553 A1* | 1/2003 | Applewhite .................... 705/40 |
| 2004/0064351 A1 | 4/2004 | Mikurak |

* cited by examiner

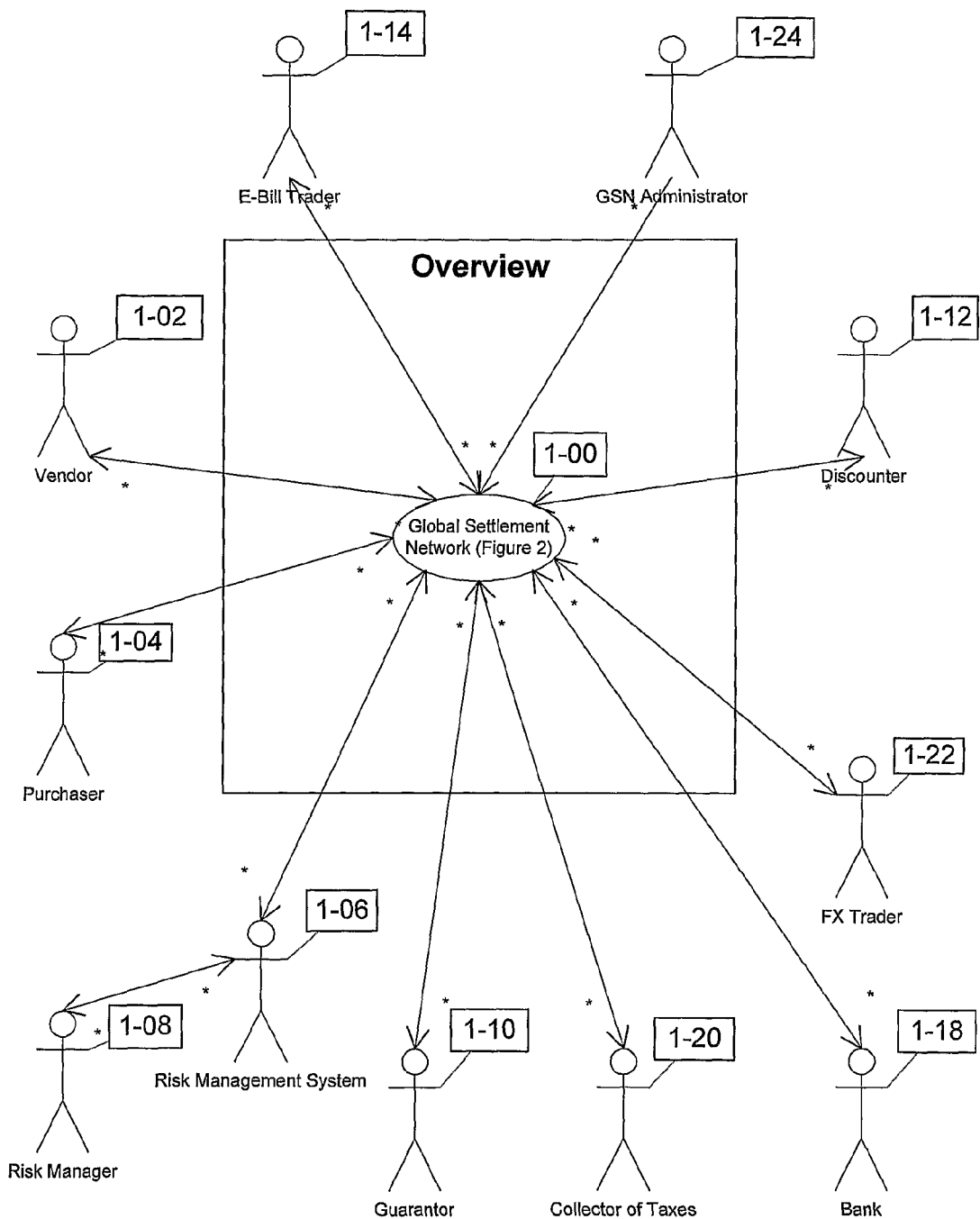
FIGURE 1 - Overview

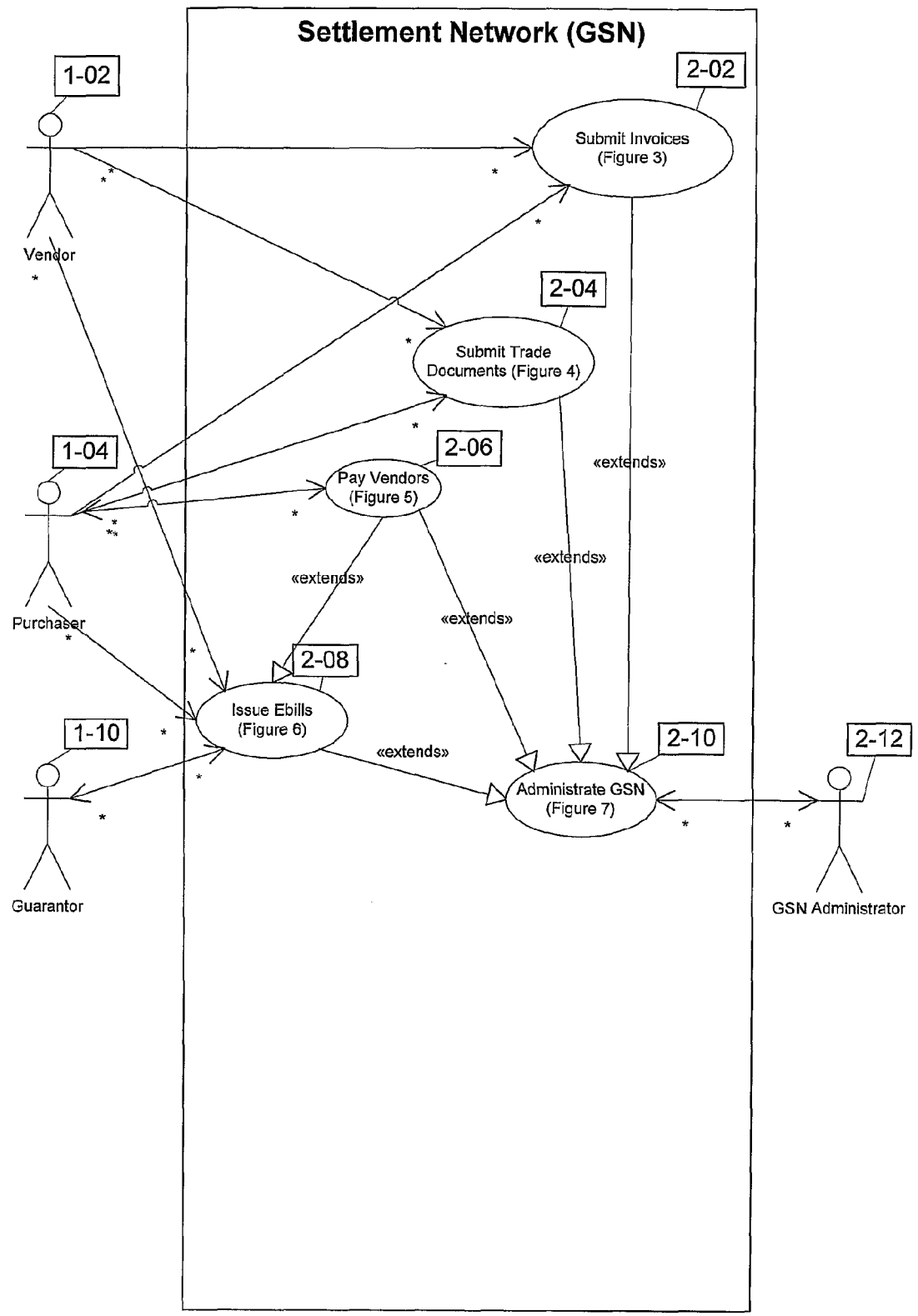
FIGURE 2A – Settlement Network (1)

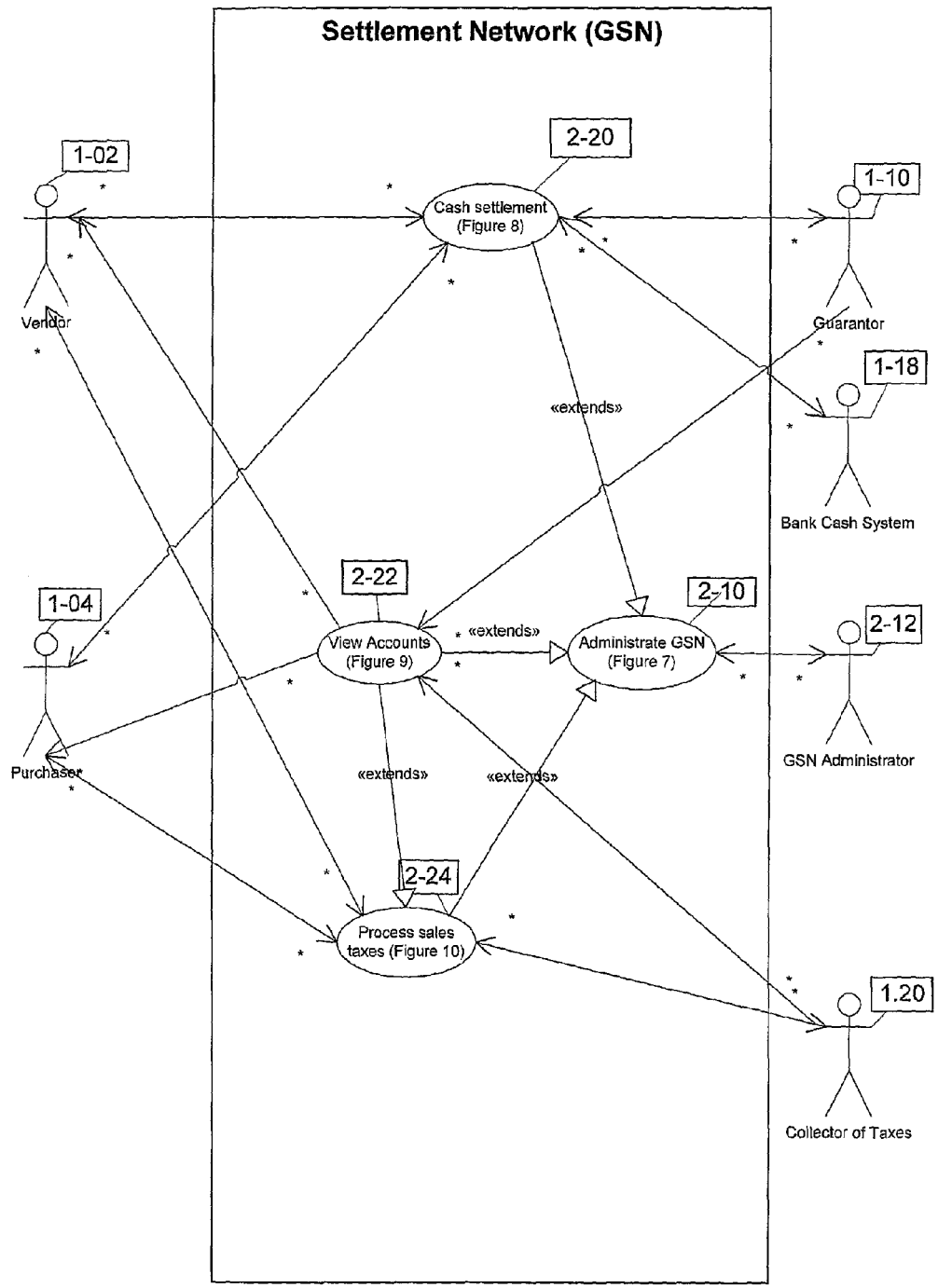
FIGURE 2B – Settlement Network (2)

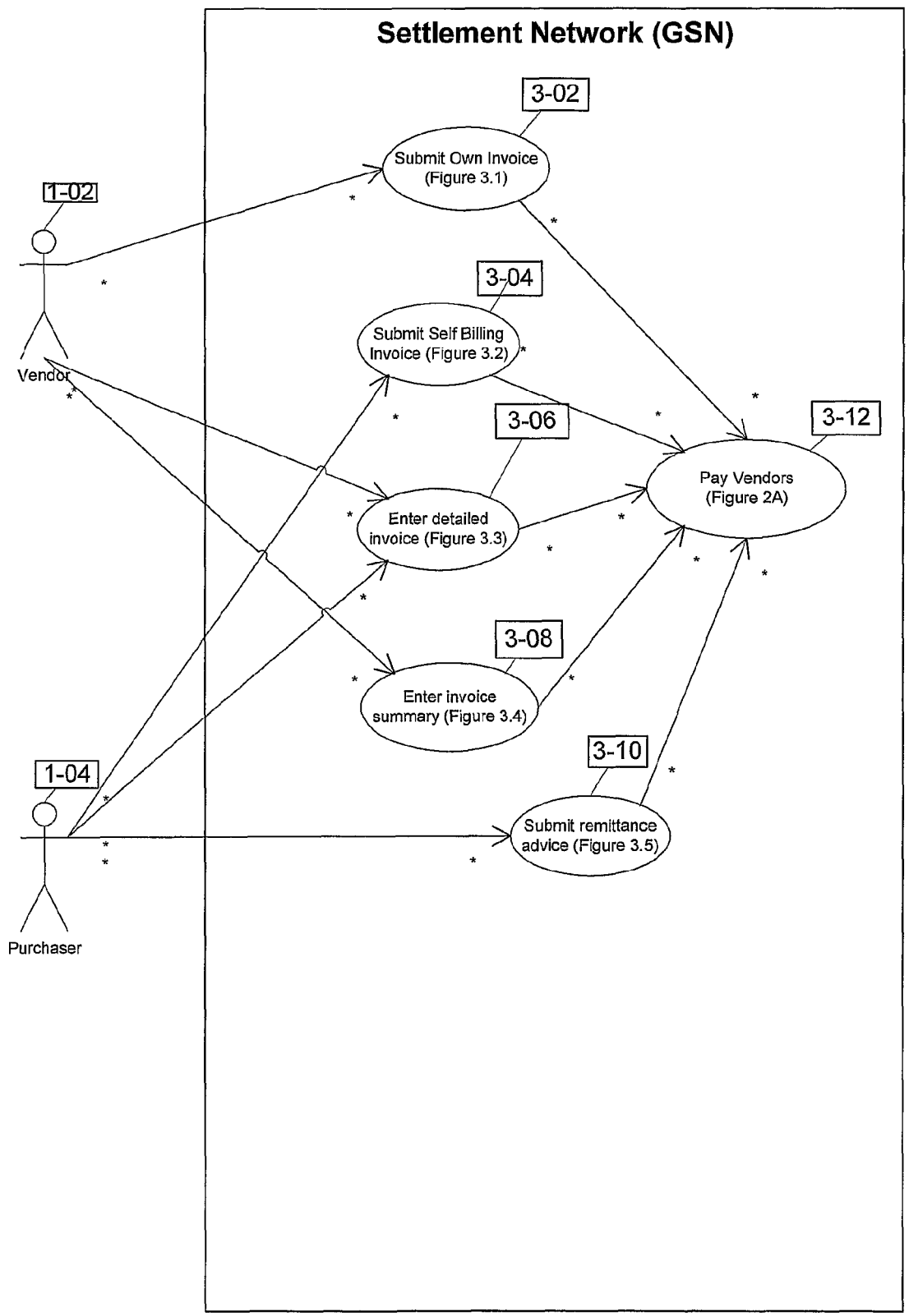
FIGURE 3 – Submit Invoices

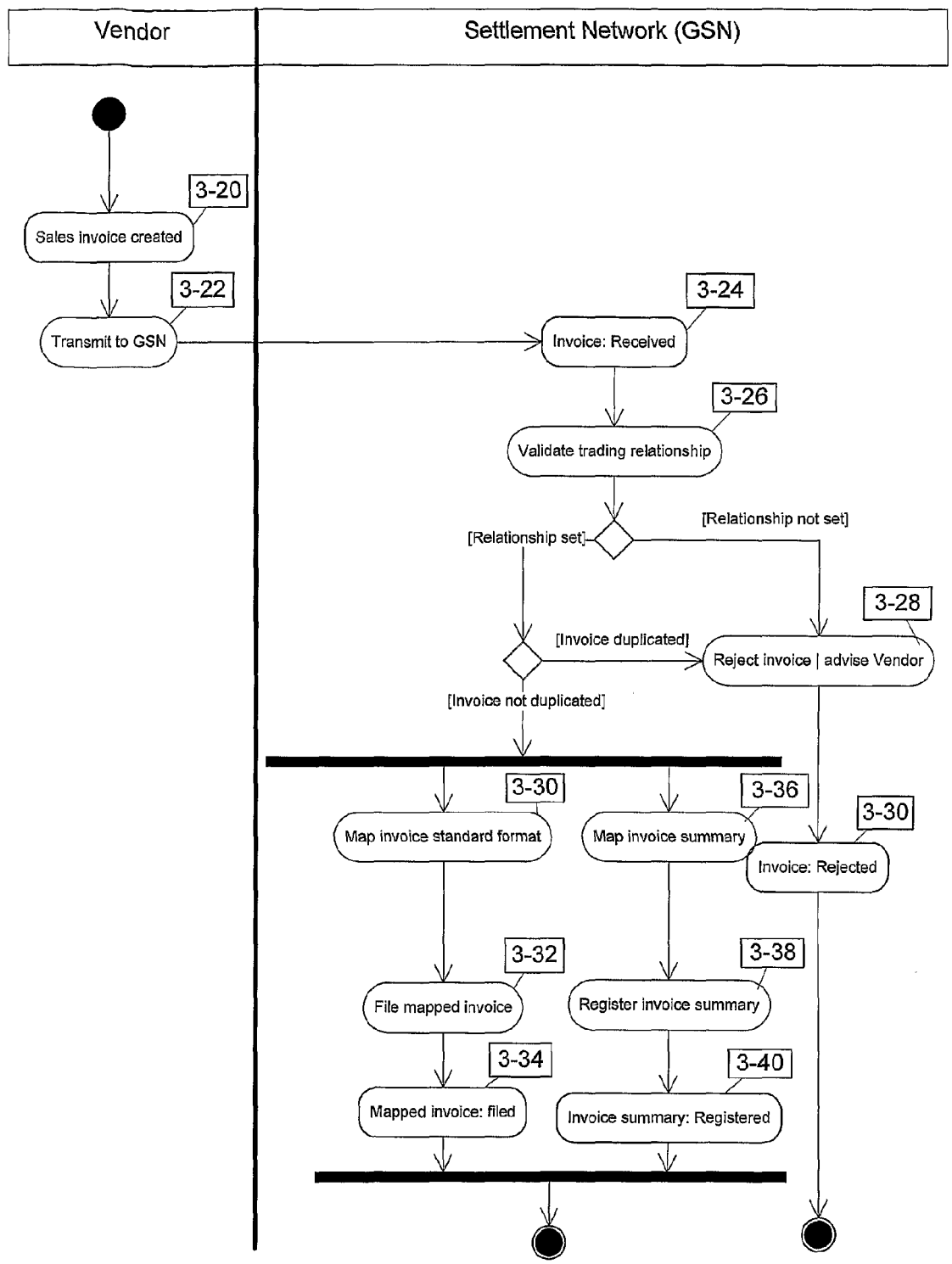
FIGURE 3.1 – Submit Own Invoice

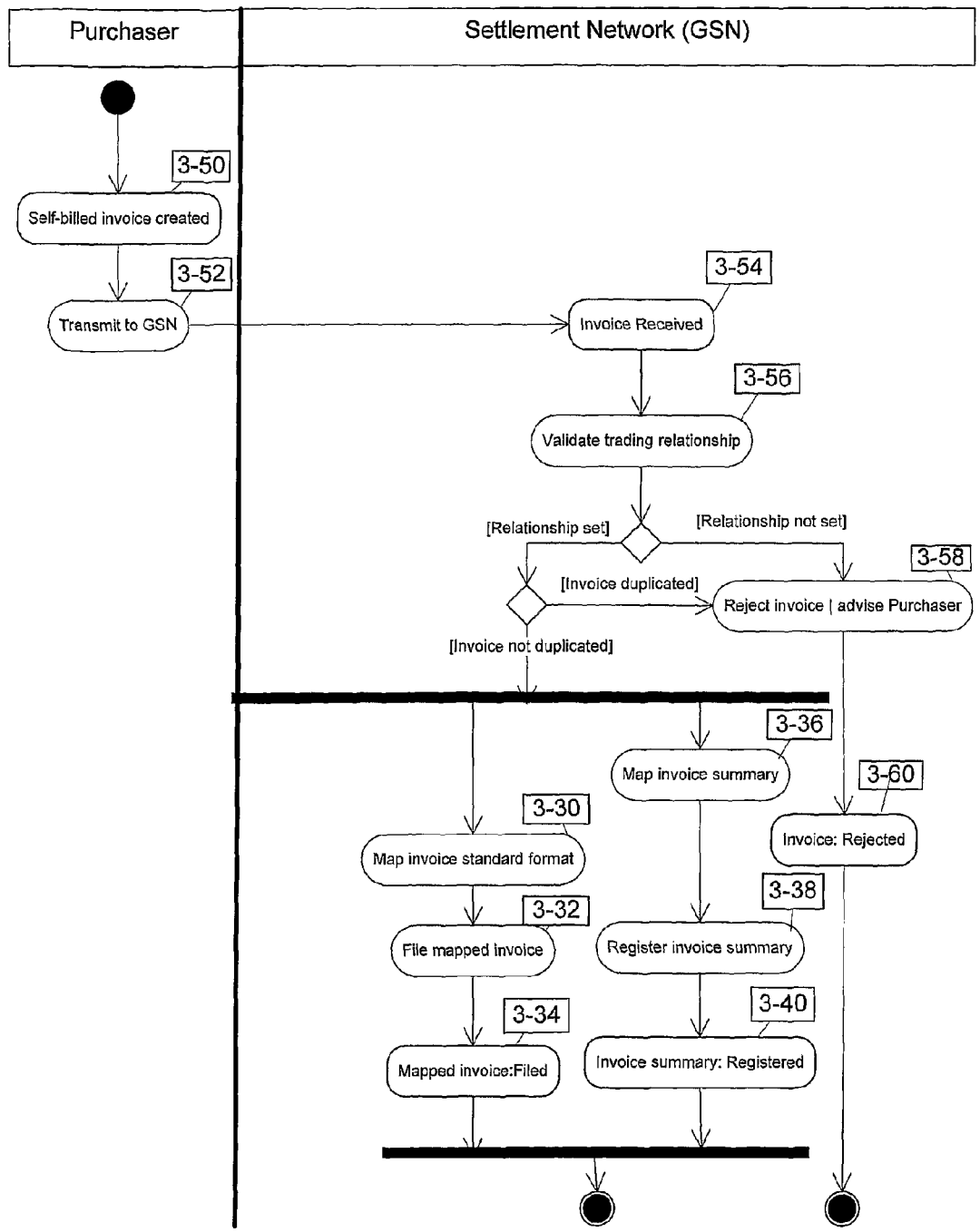
FIGURE 3.2 – Submit Self-billed Invoice

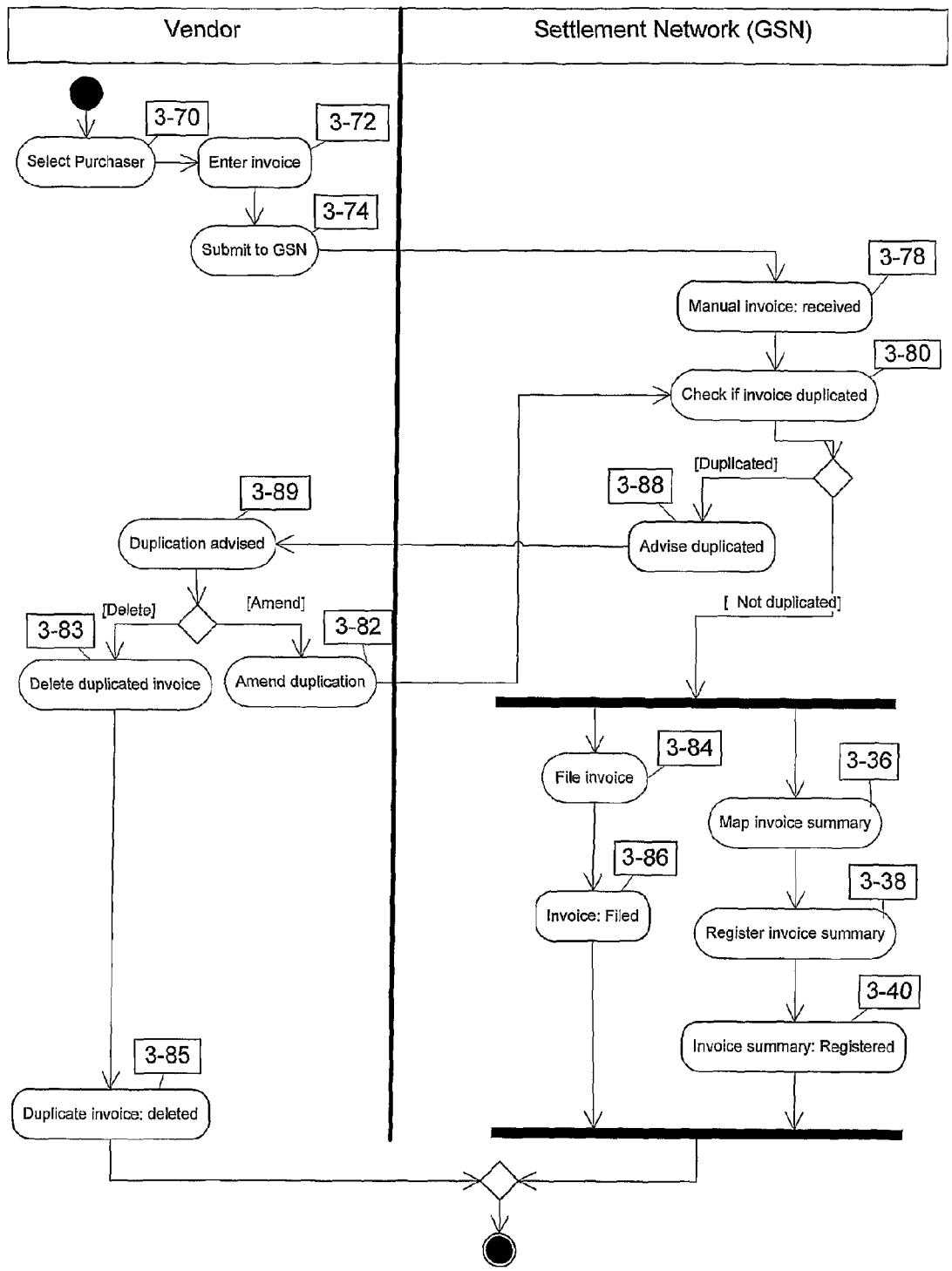
FIGURE 3.3 – Enter Invoice Manually

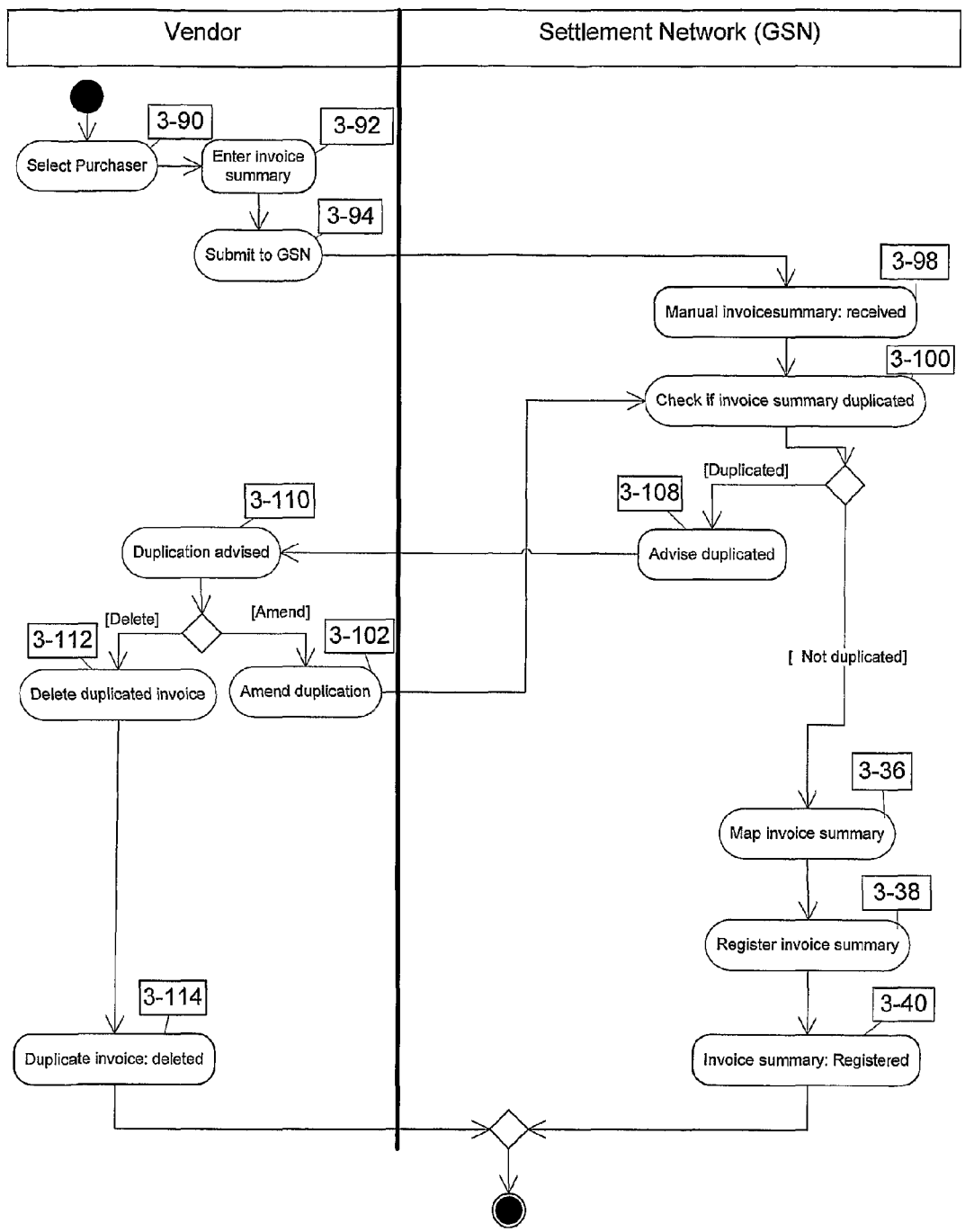
FIGURE 3.4 – Enter Invoice Summary Manually

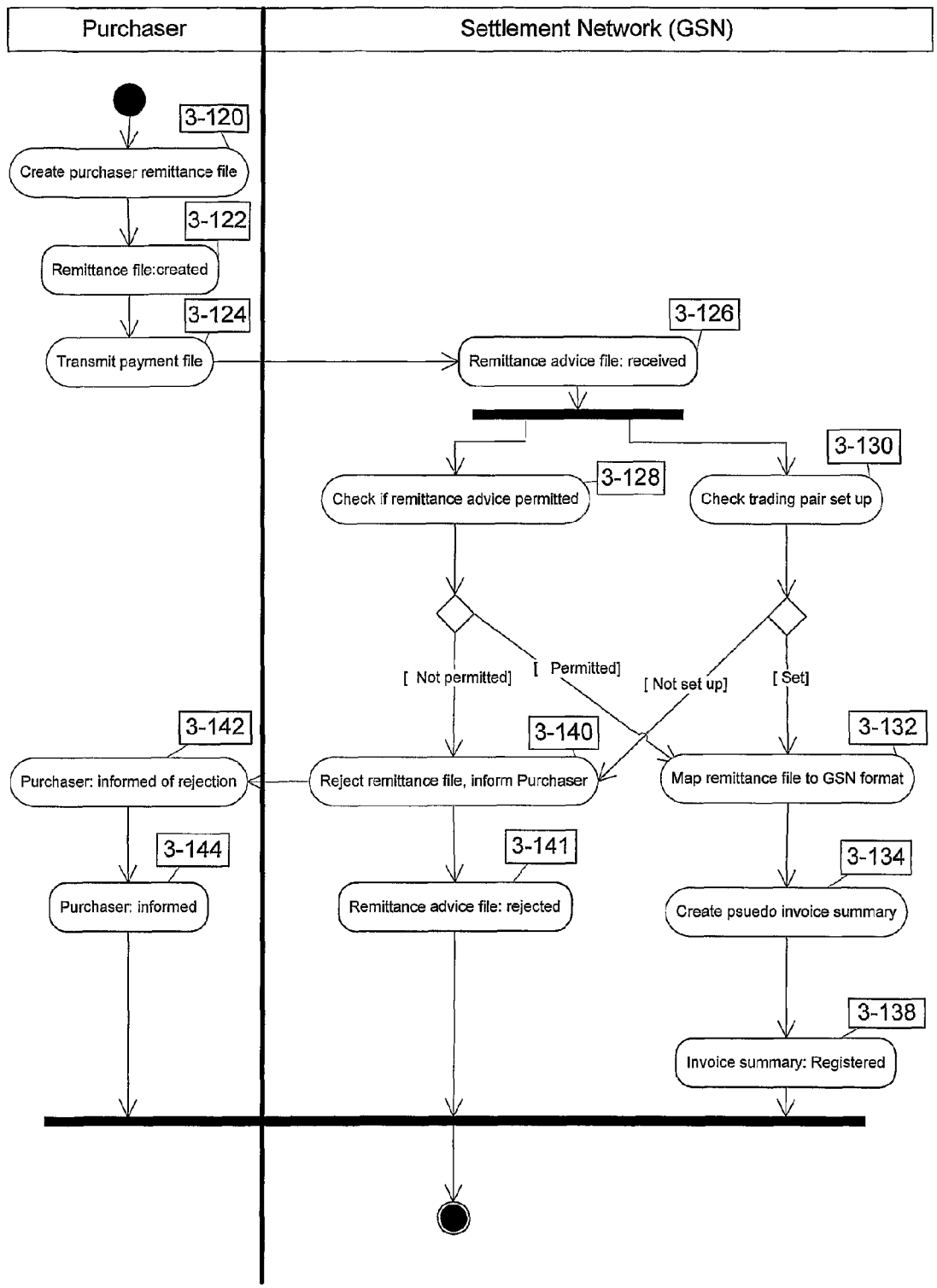
FIGURE 3.5 – Submit Remittance Advice

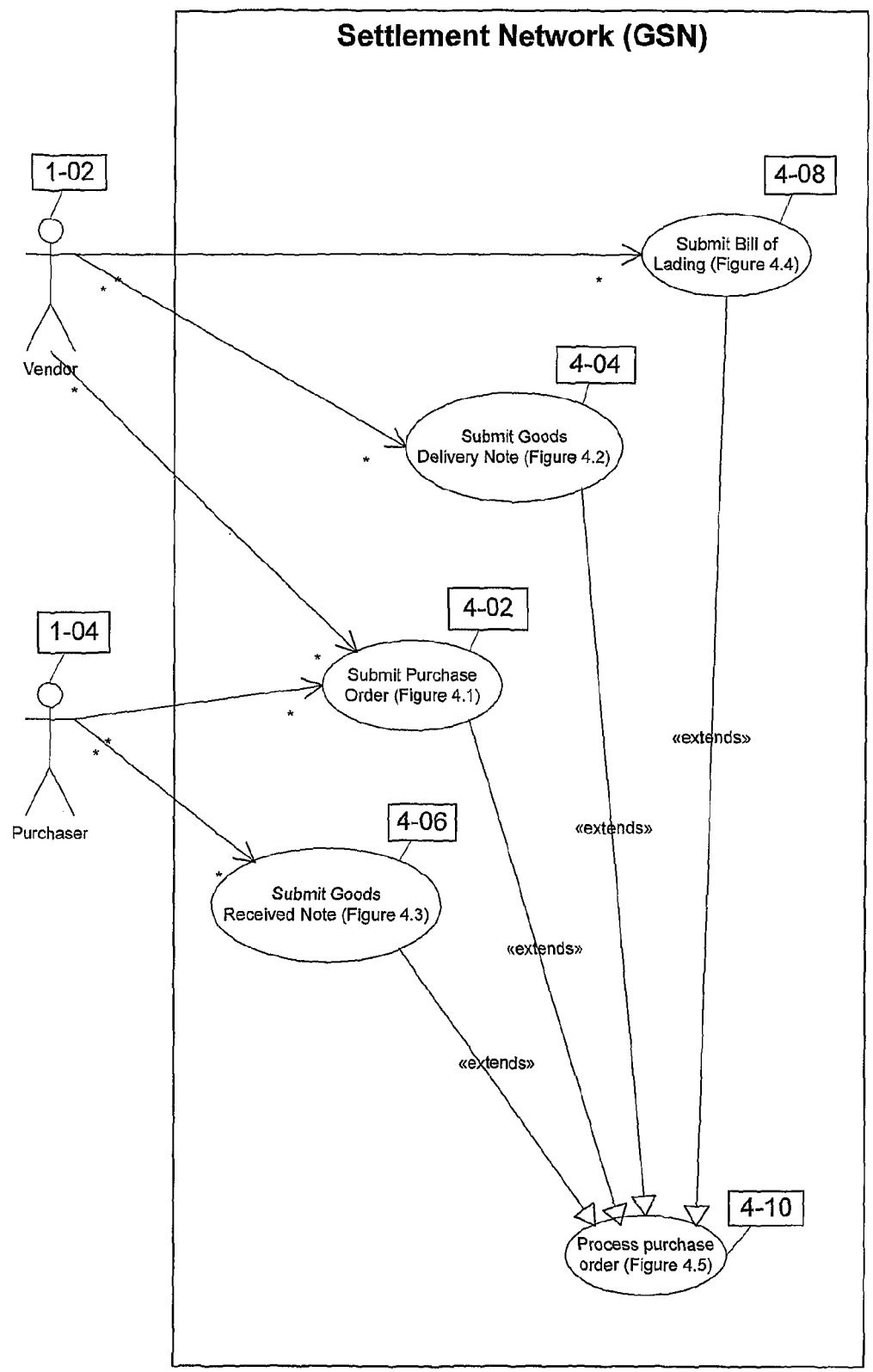
FIGURE 4 – Submit Trade Documents

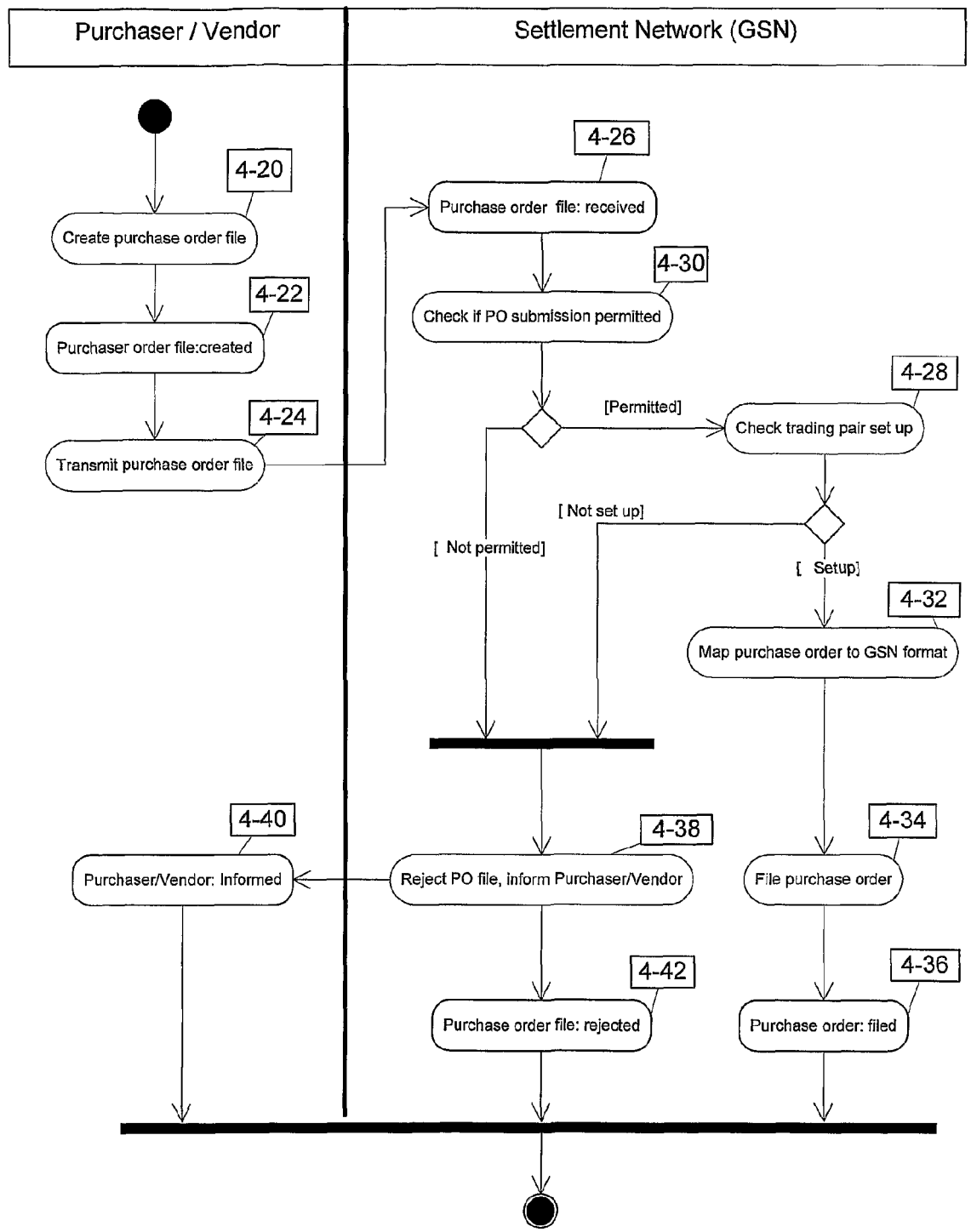
FIGURE 4.1 – Submit Purchase Order

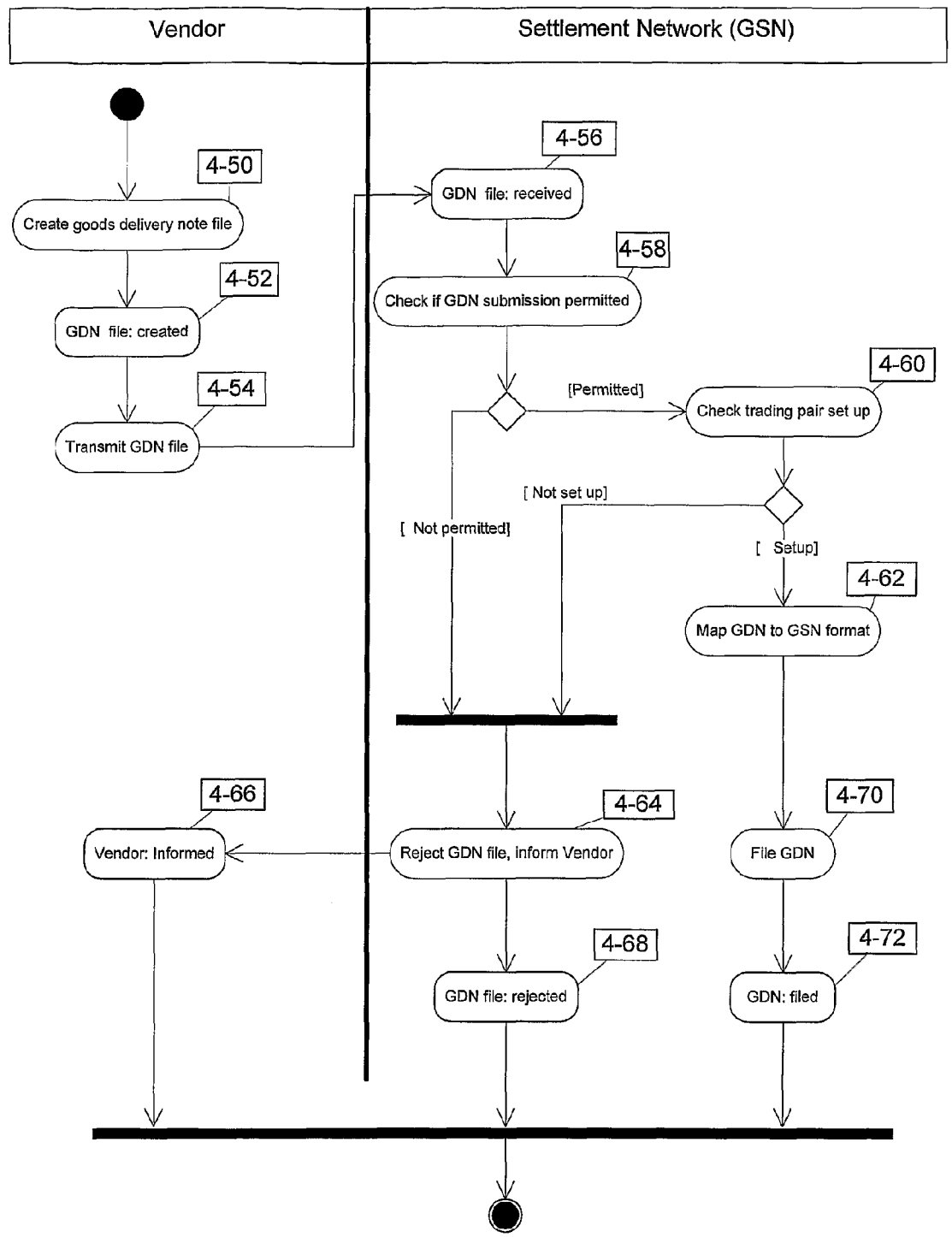
FIGURE 4.2 – Submit Goods Delivery Note

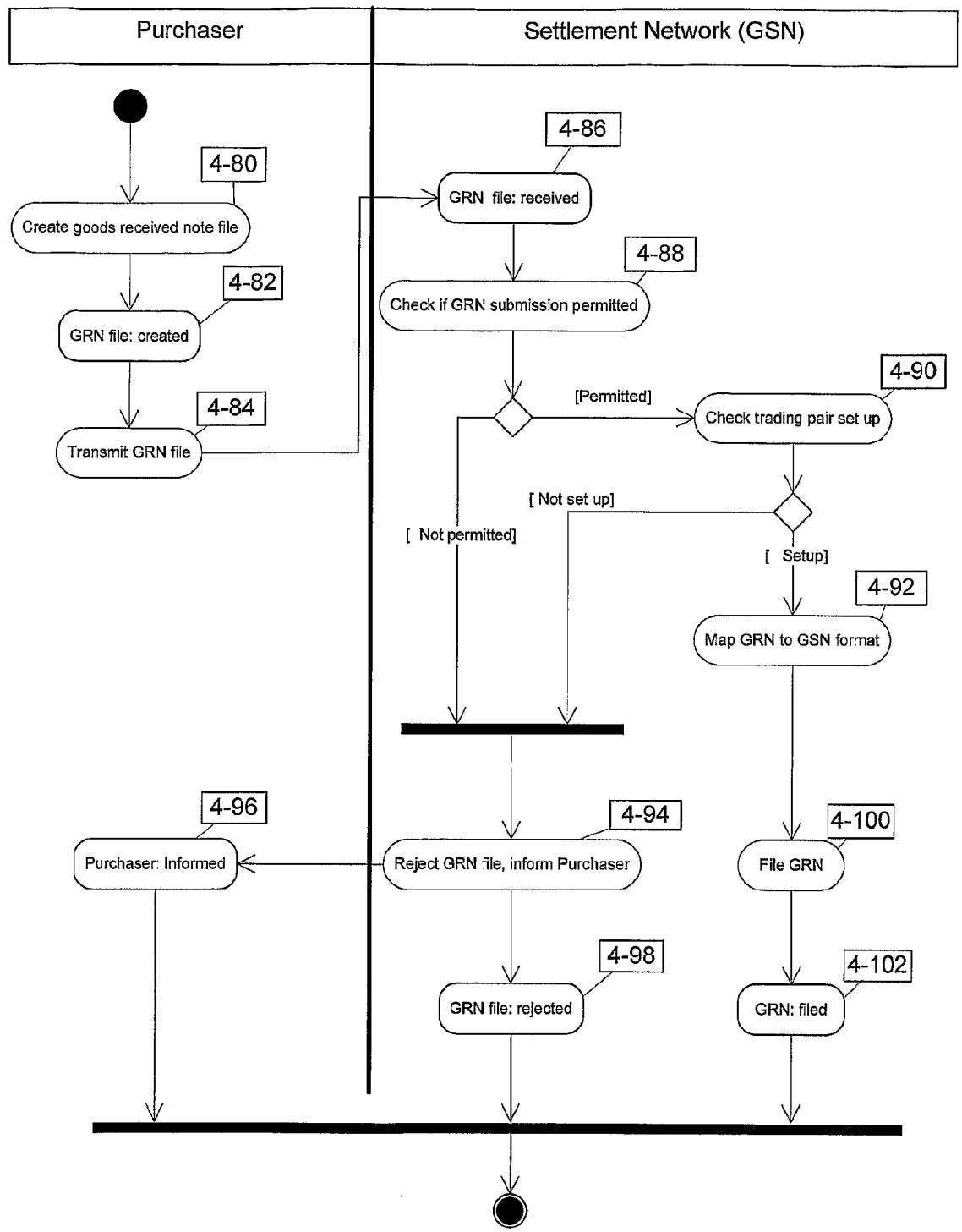
FIGURE 4.3 – Submit Goods Received Note

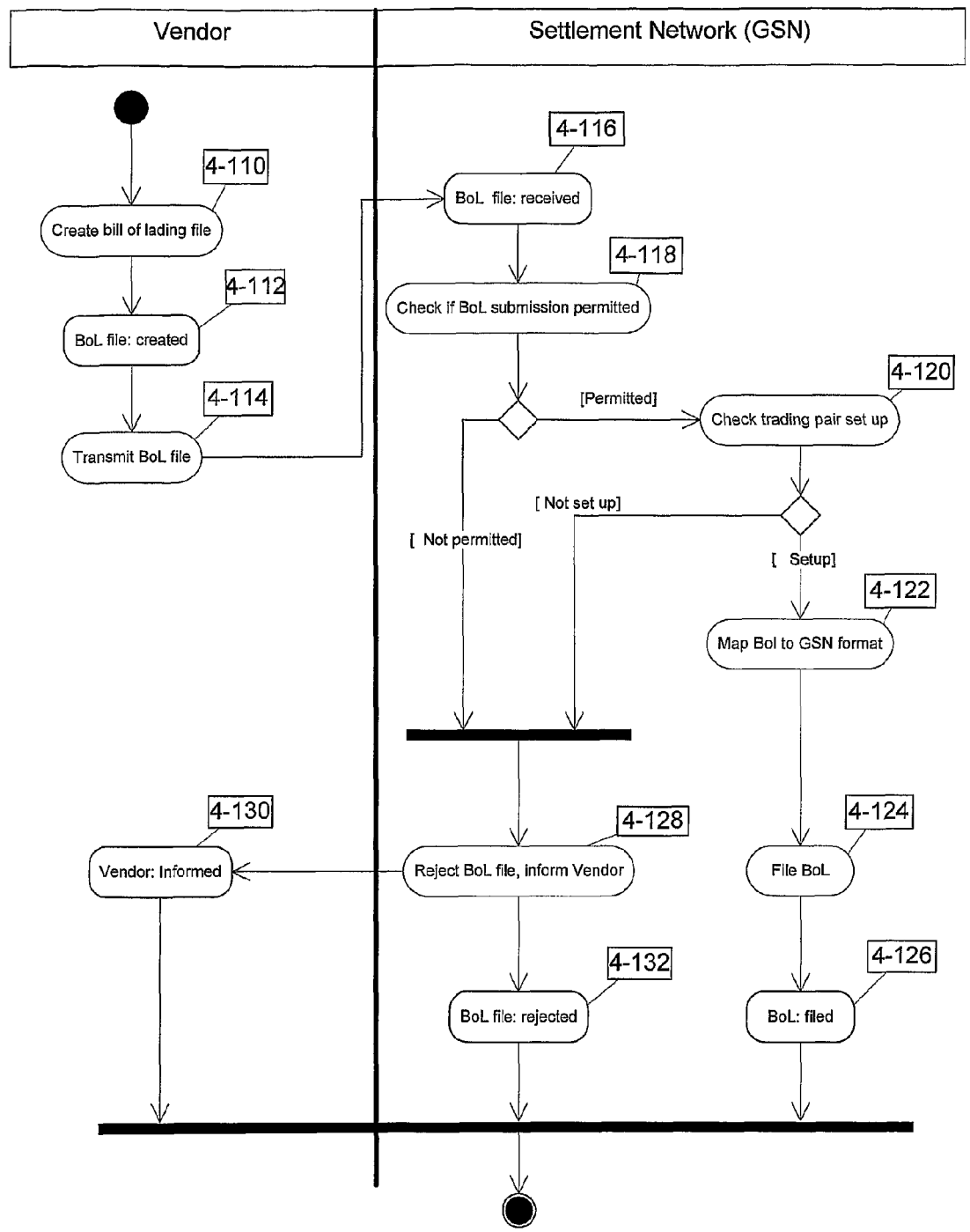
FIGURE 4.4 – Submit Bill of Lading

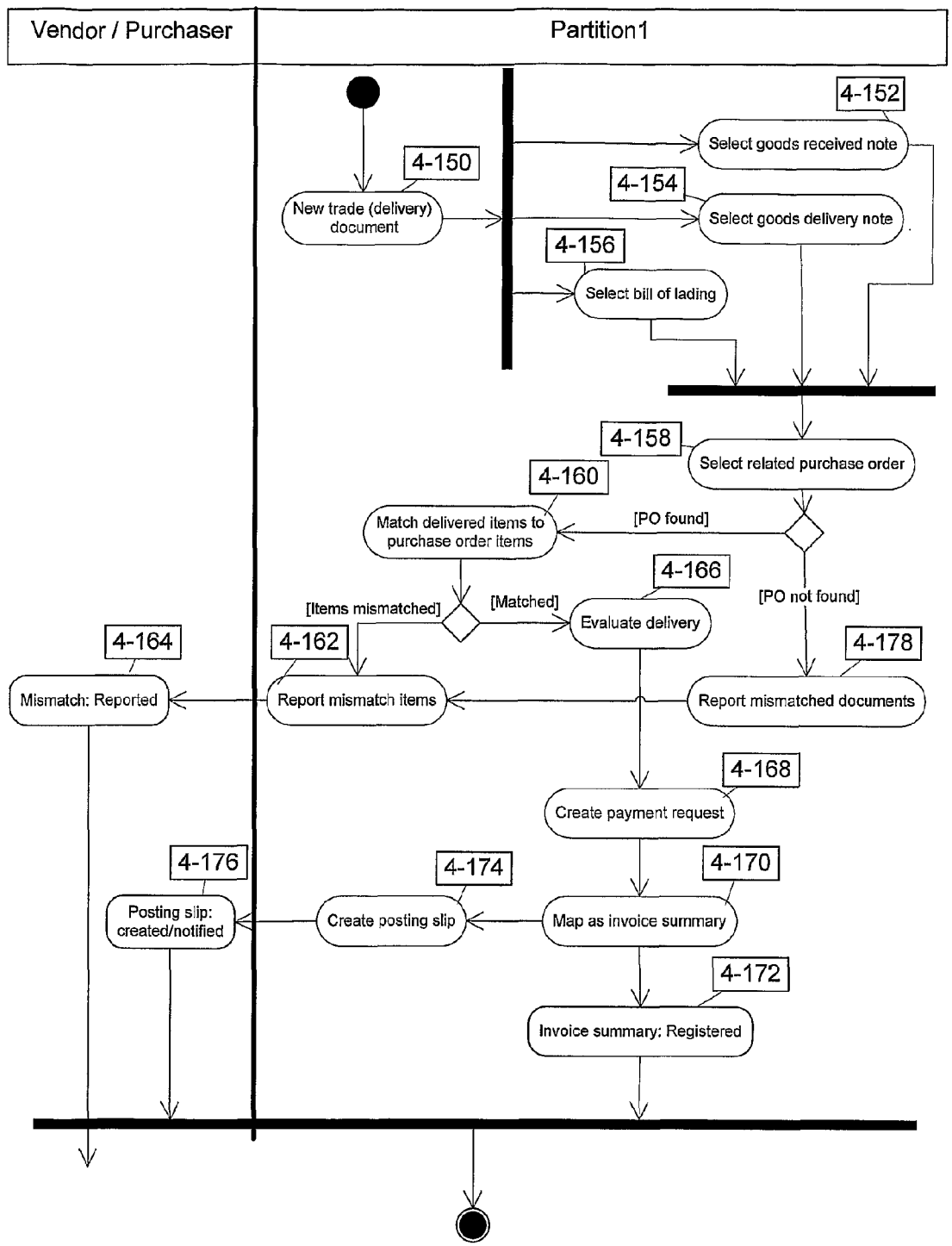
FIGURE 4.5 – Create Payment Request

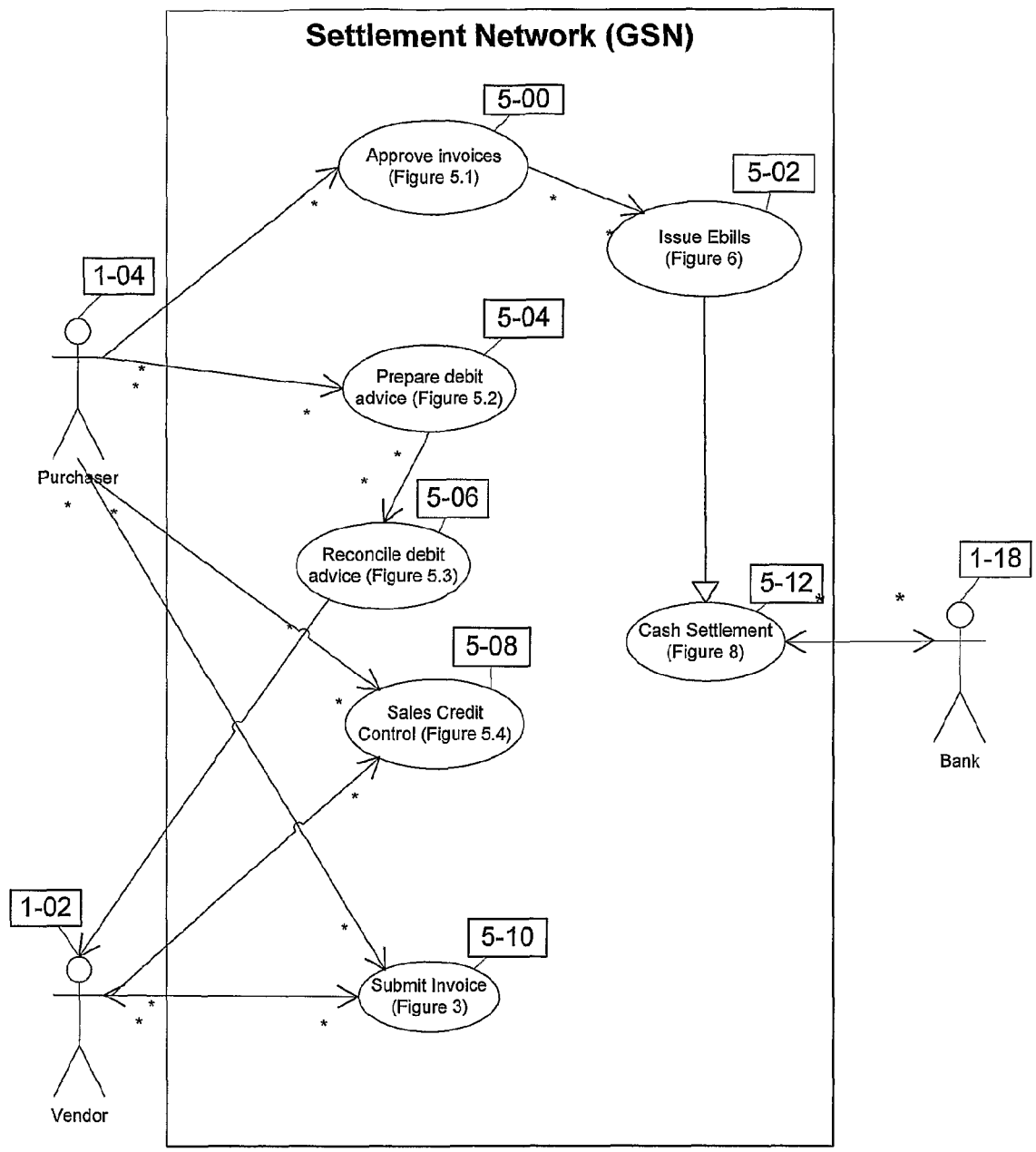
FIGURE 5 – Pay Vendors

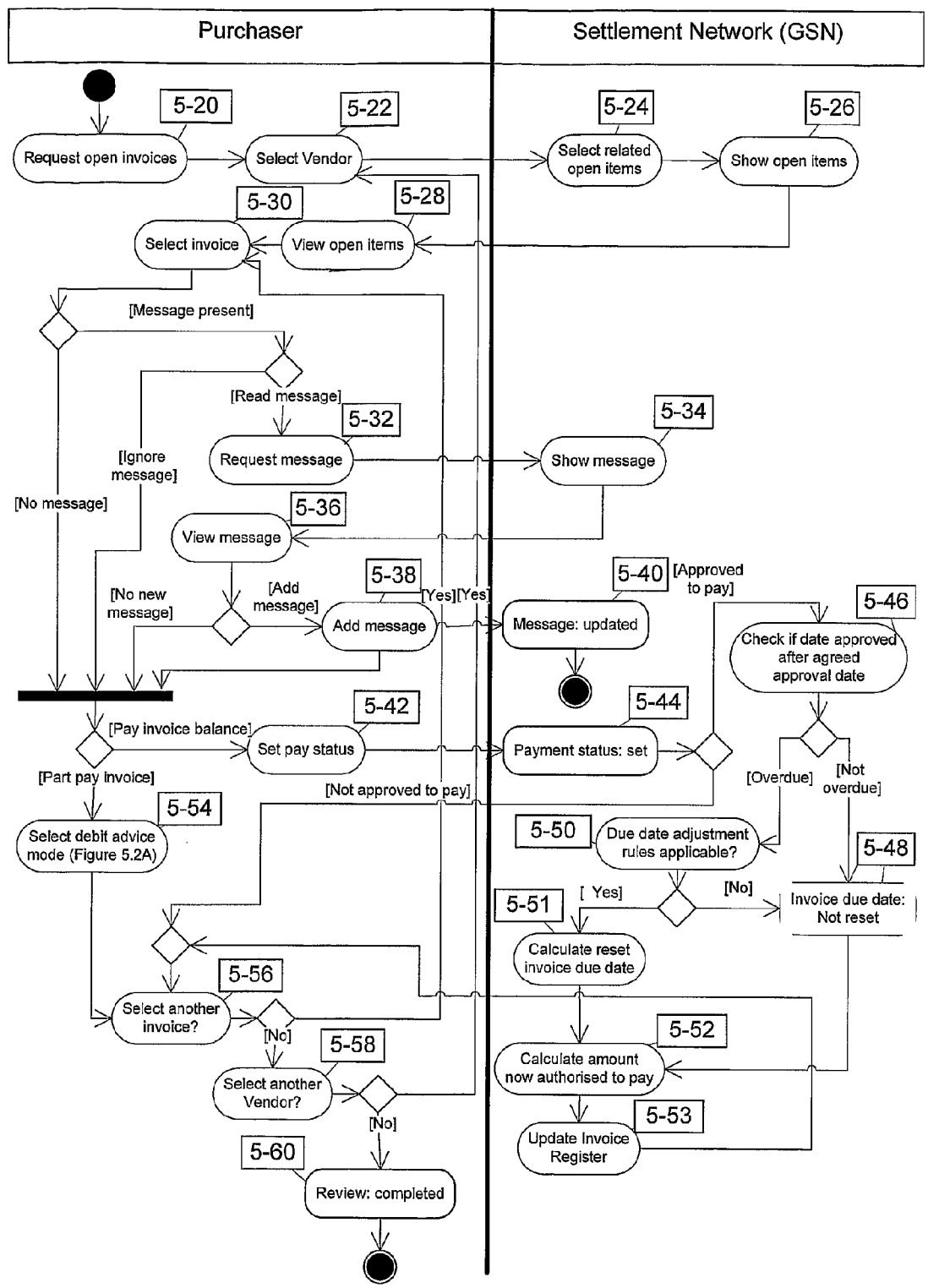
FIGURE 5.1 – Approve Invoices

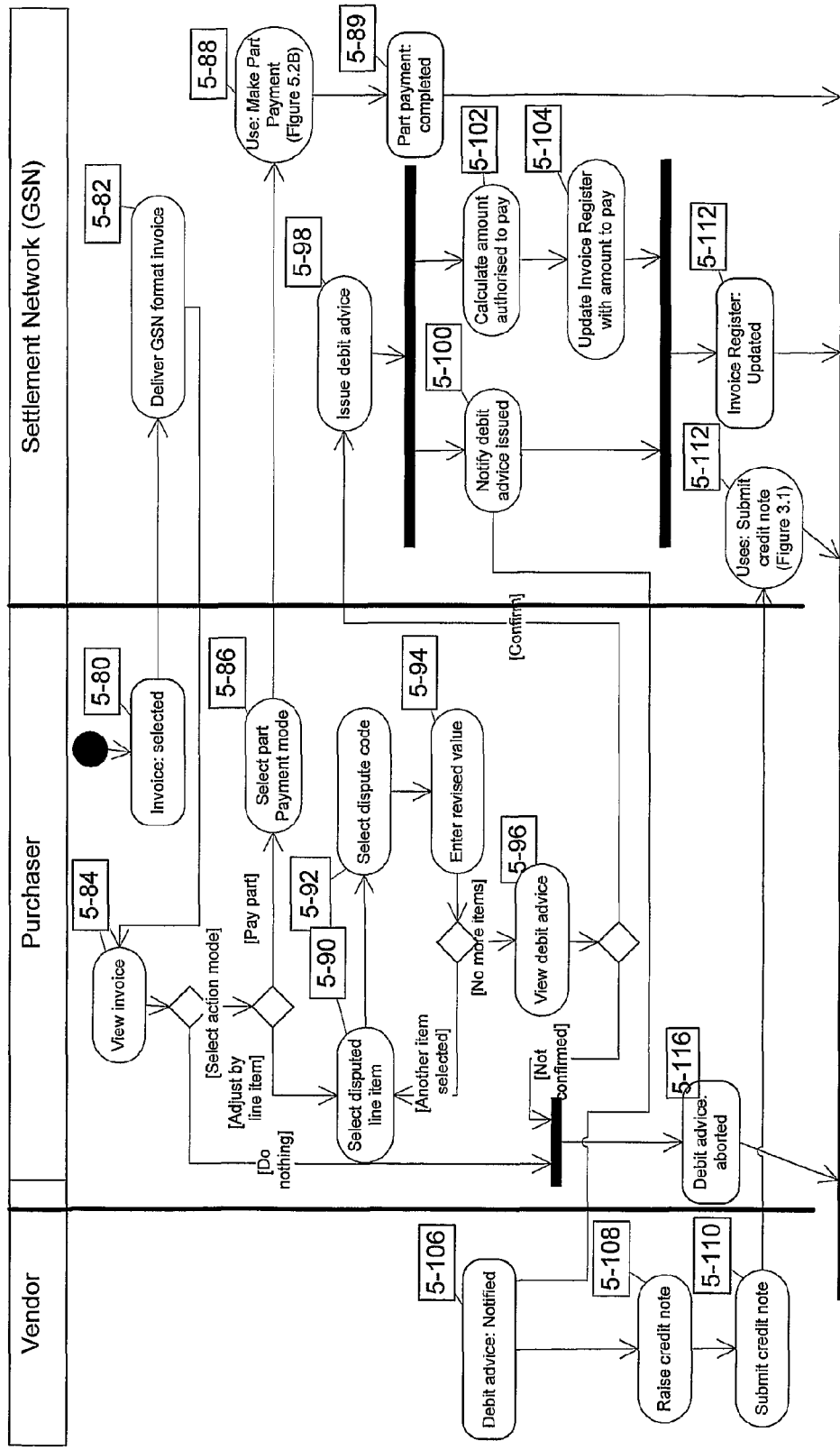
FIGURE 5.2A – Prepare Debit Advice

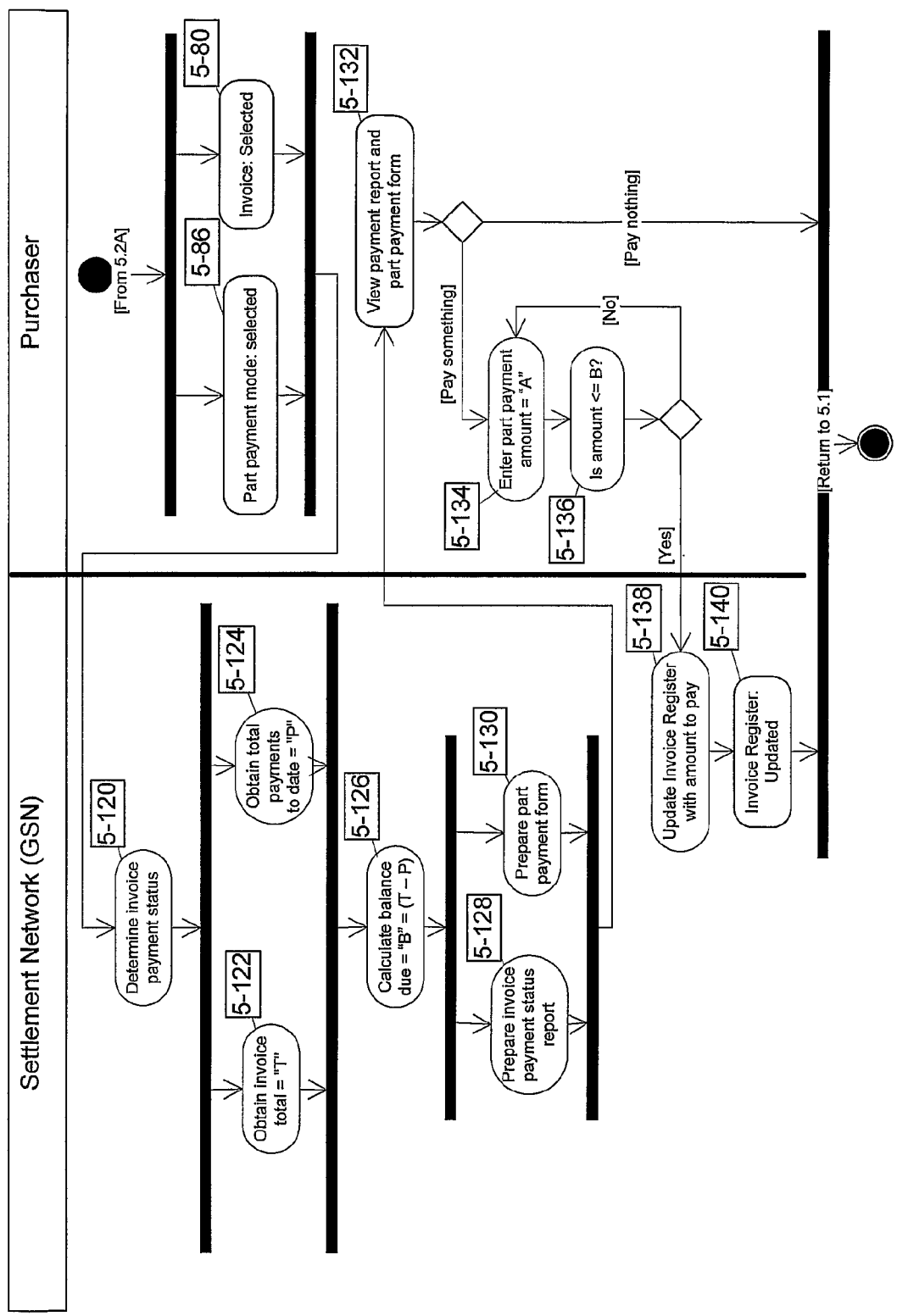
FIGURE 5.2B – Make Part Payment

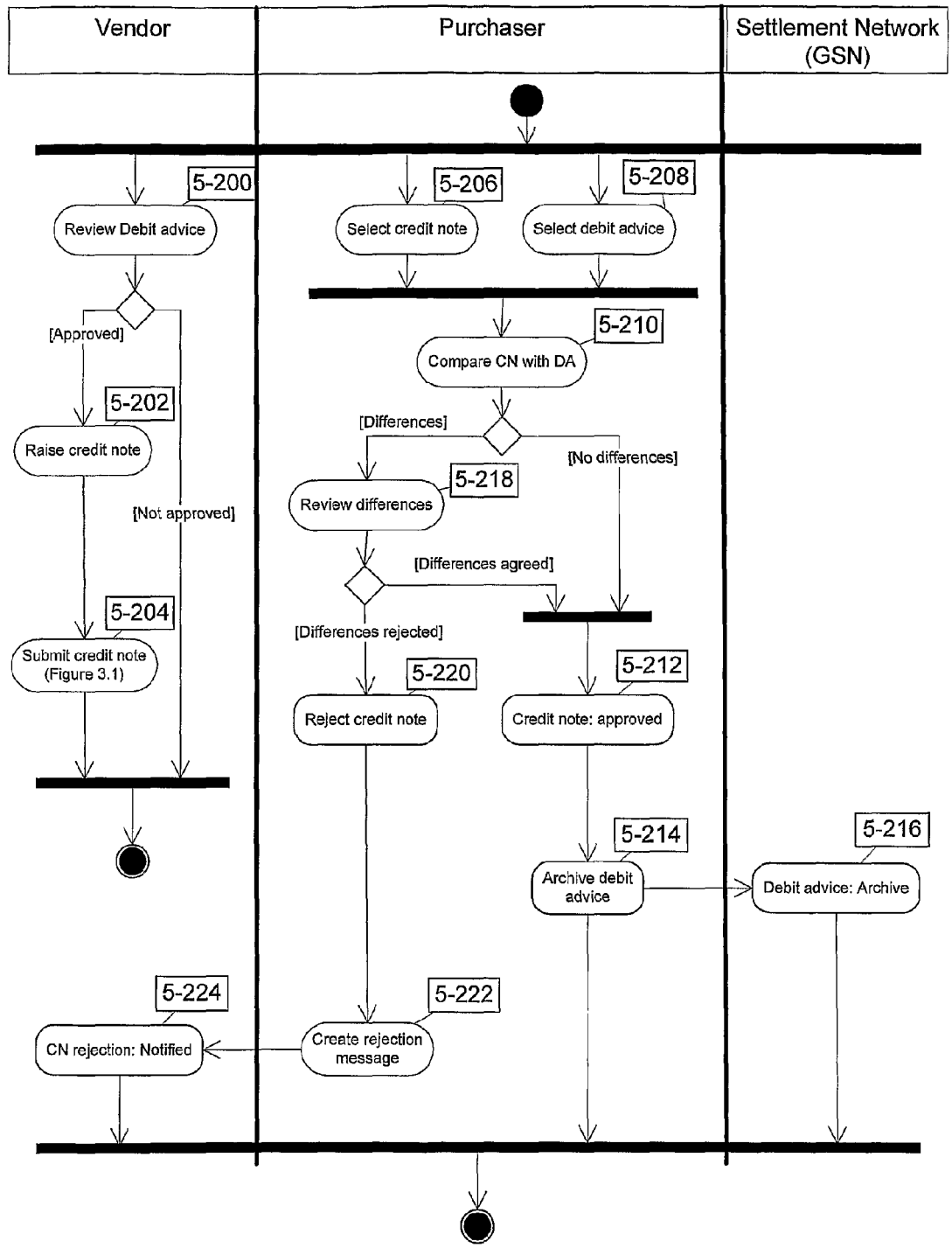
FIGURE 5.3 – Reconcile Debit Advice

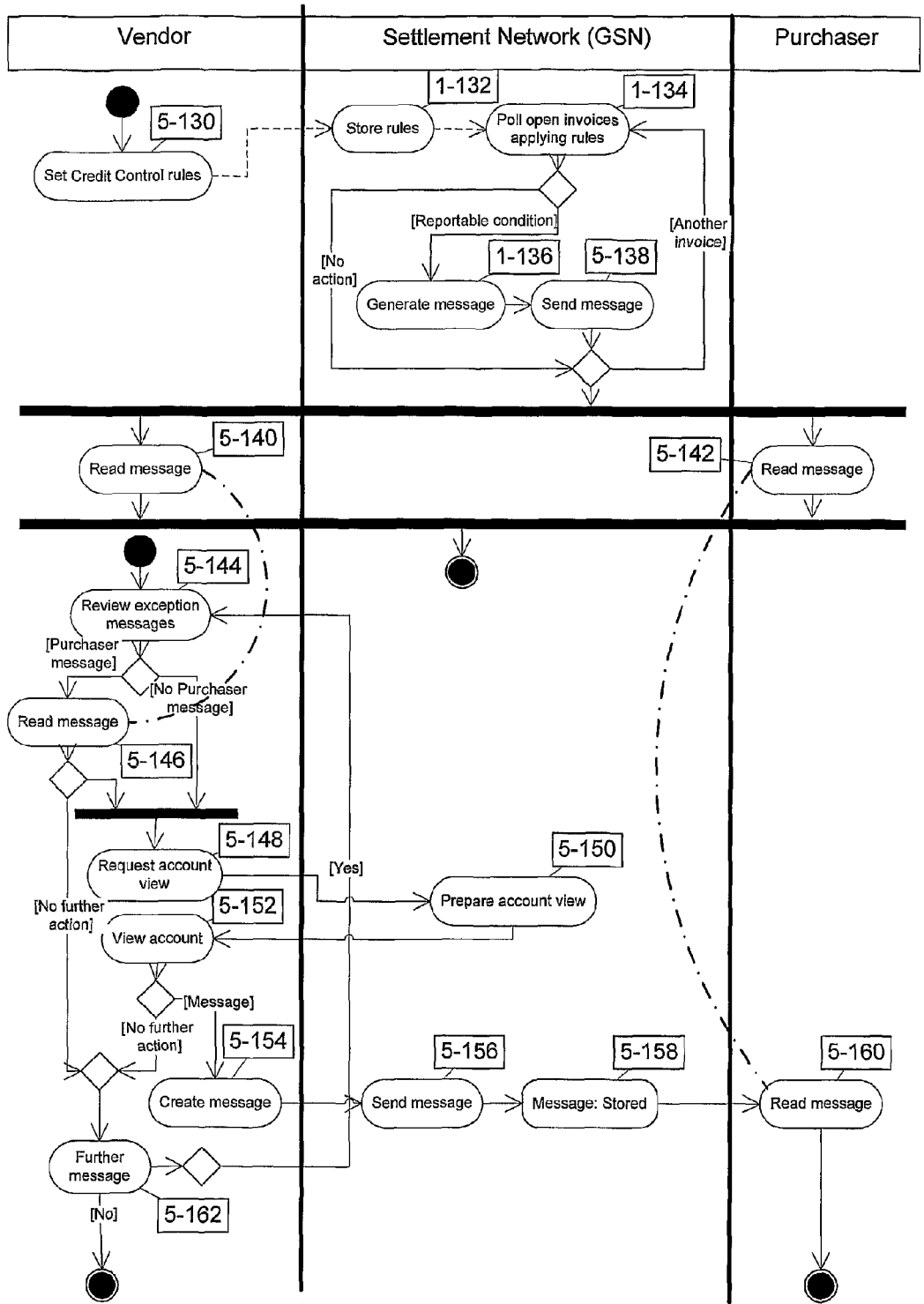
FIGURE 5.4 – Sales Credit Control

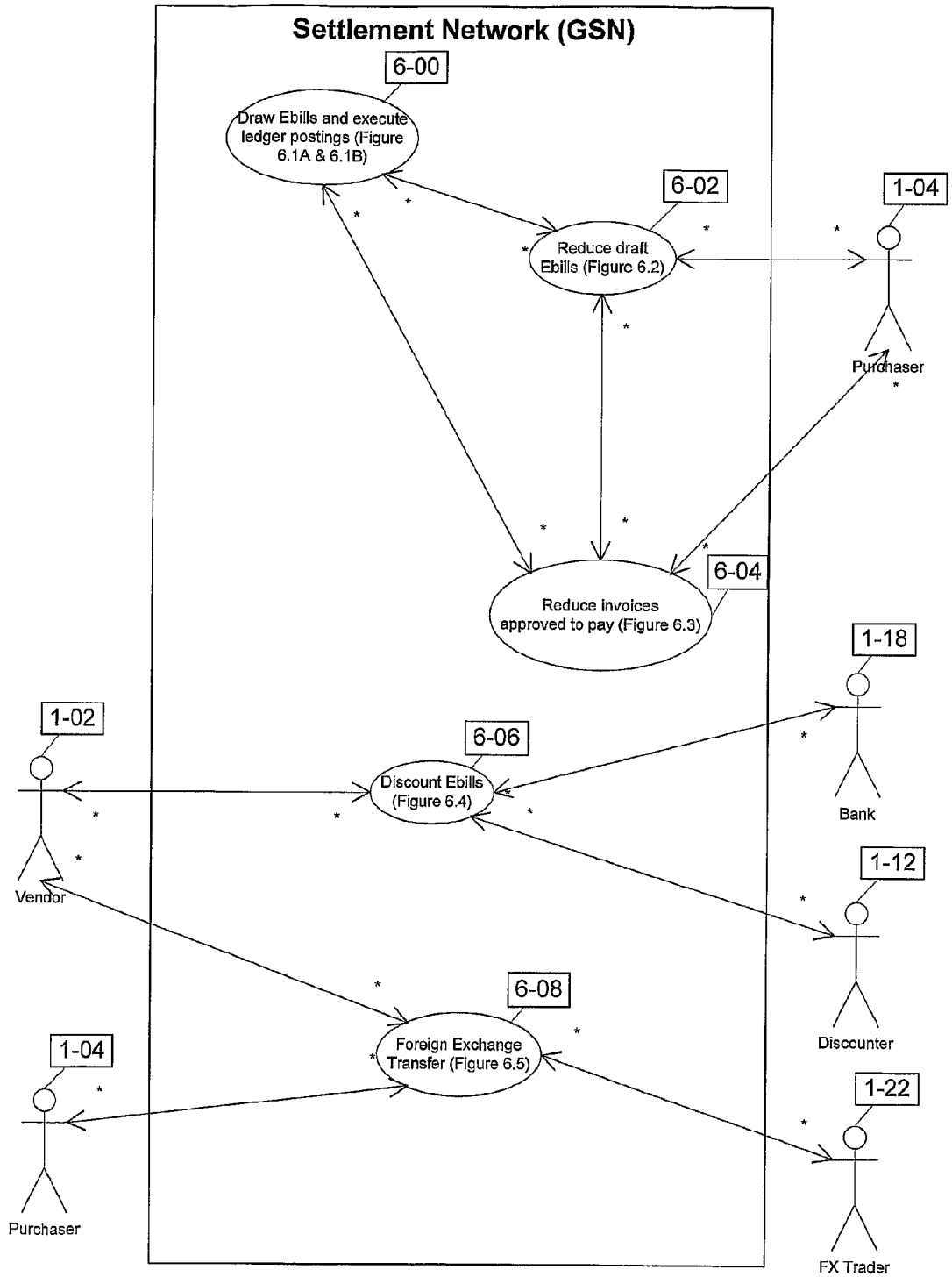
FIGURE 6 – Process Ebills

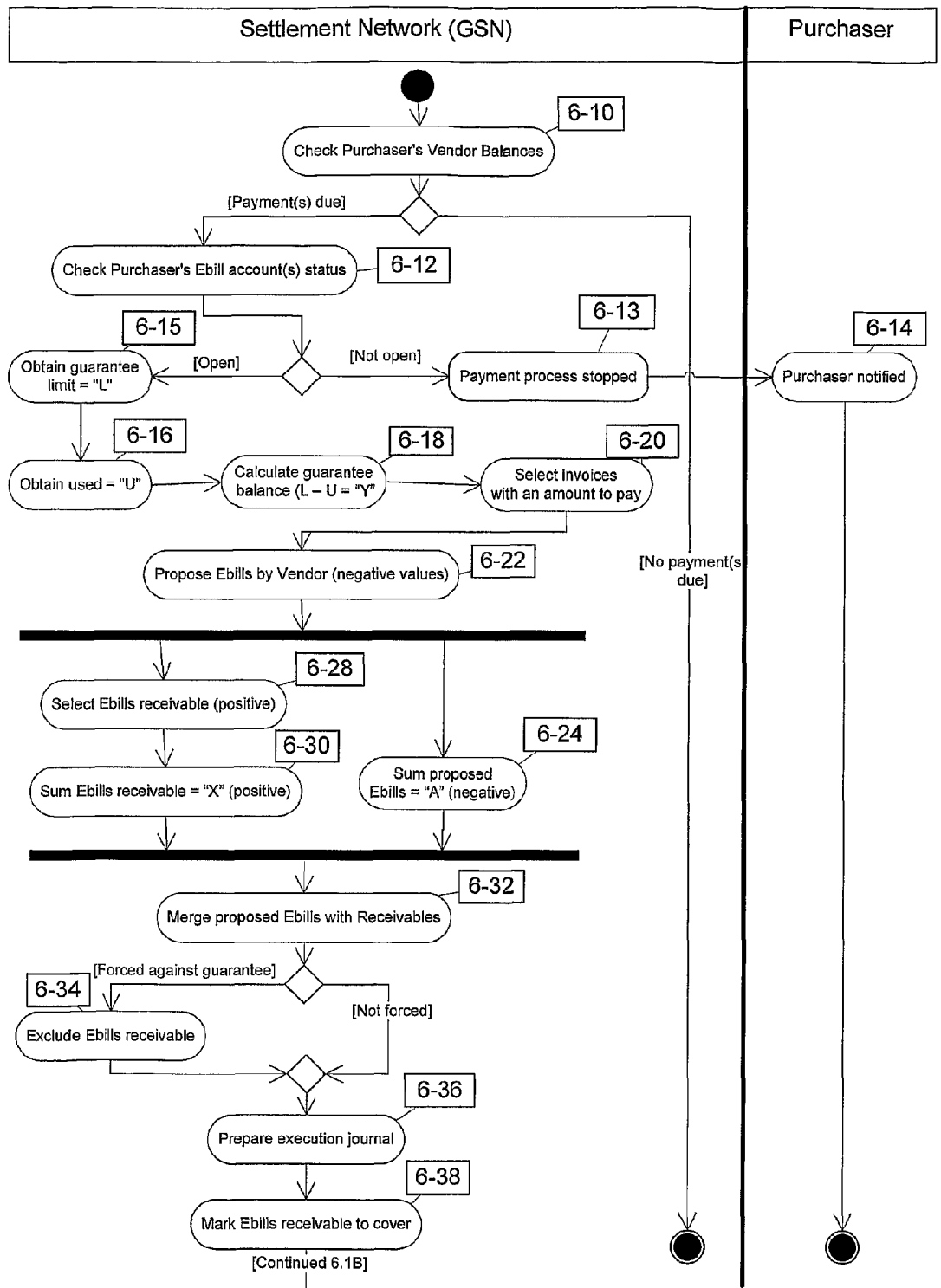
FIGURE 6.1A – Draw Ebills (1/2)

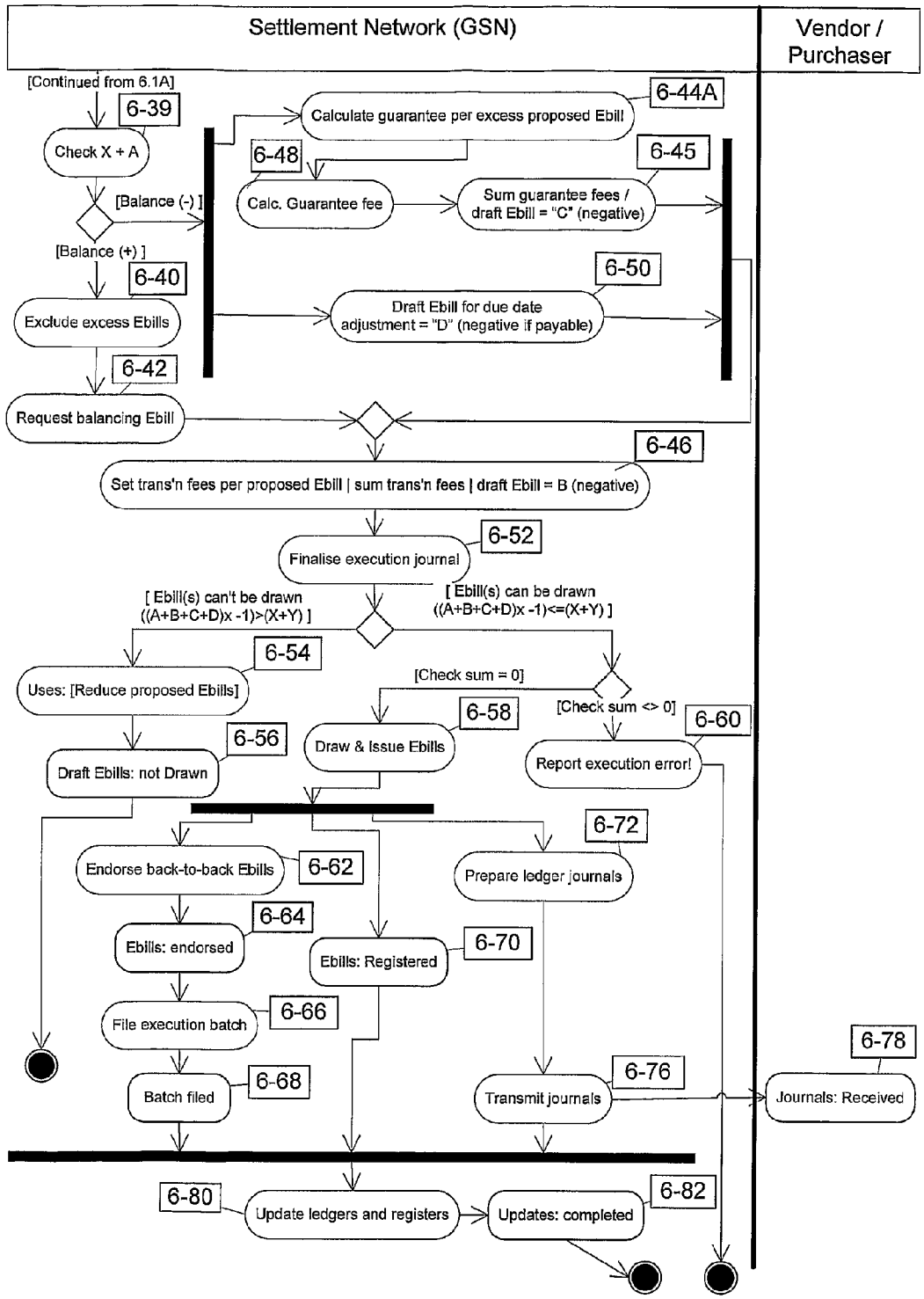
FIGURE 6.1B – Draw Ebills (2/2)

| | A | B | C | D | E | F | G | H | J | K | L |
|---|---|---|---|---|---|---|---|---|---|---|---|
| | EXAMPLE ALGORITHM | | | | | | | | | | |
| 1 | Current date | 11-Jan-04 | | | | Guarantee fee rate | | Credit balance rate | | 1.750% | |
| 2 | | | | | | Guarantee limit | 1,000,000.00 | Debit balance rate | | 1.600% | |
| 3 | | | | | | Guarantee available = "Y" | 723,000.00 | | | | |
| 4 | | Due Date | Note | Ebill amount payable | Ebill amount receivable | Receivable Endorsed | Guarantee | Guarantee Fee | Ebill Acceptance Fee | Running Balance | Due Date Allowance | Ebill Drawing Fee |
| 5 | | | | | | | | | | | | |
| 6 | 13-Mar-04 | | -7,000.00 | | | 0.00 | 0.00 | -0.50 | -7,000.00 | 0.00 | -0.25 |
| 7 | 21-Mar-04 | | | 24,000.00 | Yes | | | | 17,000.00 | -2.72 | |
| 8 | 26-Mar-04 | | -25,000.00 | | | 0.00 | 0.00 | -0.50 | -8,000.00 | 3.78 | -0.25 |
| 9 | 2-Apr-04 | | | 56,000.00 | Yes | | | | 48,000.00 | -2.72 | |
| 10 | 7-Apr-04 | | -60,000.00 | | | 0.00 | 0.00 | -0.50 | -12,000.00 | 10.67 | -0.25 |
| 11 | 11-Apr-04 | | | 29,000.00 | Yes | | | | 17,000.00 | -2.33 | |
| 12 | 29-Apr-04 | | -47,000.00 | | | 30,000.00 | -54.95 | -0.50 | 0.00 | 13.60 | -0.25 |
| 13 | | Total Bills payable = "A" | -139,000.00 | | | | | | | | |
| 14 | | Total Bills receivable = "X" | | 109,000.00 | | | | | | | |
| 15 | 10-Feb-04 | Total guarantee fees = "C" | -54.95 | | | | -54.95 | | | | |
| 16 | 10-Feb-04 | Total Ebill issue fees = "B" | -2.00 | | | | | -2.00 | | | |
| 17 | 29-Apr-04 | Due date adjustment = "D" | | 20.27 | | | | | | 20.27 | |
| 18 | | Total Ebill drawing fee | | | | | | | | | -1.00 |
| 19 | | Total guarantee required | | | | 30,000.00 | | | | | |

FIGURE 6.2A - Algorithm - Excess Payables Covered by Guarantee

| | A | B | C | D | E | F | G | H | J | K | L |
|---|---|---|---|---|---|---|---|---|---|---|---|
| 1 | EXAMPLE ALGORITHM | | | | | | | | | | |
| 2 | Current date | 11-Jan-04 | | Guarantee fee rate | | 0.605% | | Credit balance rate | | 1.750% | |
| 3 | | | | Guarantee limit | | 1,000,000.00 | | Debit balance rate | | 1.600% | |
| 4 | | | | Guarantee available = "Y" | | 723,000.00 | | | | | |
| 5 | Due Date | Note | Ebill amount payable | Ebill amount receivable | Receivable Endorsed | Guarantee | Guarantee Fee | Ebill Acceptance Fee | Running Balance | Due Date Allowance | Ebill Drawing Fee |
| 6 | 13-Mar-04 | | -7,000.00 | | | | 0.00 | -0.50 | -7,000.00 | 0.00 | -0.25 |
| 7 | 21-Mar-04 | | | 24,000.00 | Yes | | 0.00 | | 17,000.00 | -2.72 | |
| 8 | 26-Mar-04 | | -25,000.00 | | | | 0.00 | -0.50 | -8,000.00 | 3.78 | -0.25 |
| 9 | 2-Apr-04 | | | 56,000.00 | Yes | | 0.00 | | 48,000.00 | -2.72 | |
| 10 | 7-Apr-04 | | -60,000.00 | | | | 0.00 | -0.50 | -12,000.00 | 10.67 | -0.25 |
| 11 | 11-Apr-04 | | | 29,000.00 | Yes | | 0.00 | | 17,000.00 | -2.33 | |
| 12 | 29-Apr-04 | | -11,000.00 | | | | 0.00 | -0.50 | 6,000.00 | 13.60 | -0.25 |
| 13 | | Total Bills payable = "A" | -103,000.00 | | | | | | | | |
| 14 | | Total Bills receivable = "X" | | 109,000.00 | | | | | | | |
| 15 | 11-Apr-04 | Balance Ebill | | 6,000.00 | | | | | | | |
| 16 | 10-Feb-04 | Total guarantee fees = "C" | 0.00 | | | 0.00 | | | | | |
| 17 | 10-Feb-04 | Total Ebill issue fees = "B" | -2.00 | | | | | -2.00 | | | |
| 18 | 29-Apr-04 | Due date adjustment = "D" | | 20.27 | | | | | | 20.27 | |
| 19 | | Total Ebill drawing fee | | | | | | | | | -1.00 |
| 20 | | Total guarantee required | | | | 0.00 | | | | | |

FIGURE 6.2B - Algorithm - Excess Receivables

| | A | B | C | D | E | F | G | H | J | K | L |
|---|---|---|---|---|---|---|---|---|---|---|---|
| | EXAMPLE ALGORITHM | | | | | | | | | | |
| 1 | Current date | 11-Jan-04 | | Guarantee fee rate | | 0.605% | | Credit balance rate | | 1.750% | |
| 2 | | | | Guarantee limit | | 1,000,000.00 | | Debit balance rate | | 1.600% | |
| 3 | | | | Guarantee available = "Y" | | 723,000.00 | | | | | |
| 4 | Due Date | Note | Ebill amount payable | Ebill amount receivable | Receivable Endorsed | Guarantee | Guarantee Fee | Ebill Acceptance Fee | Running Balance | Due Date Allowance | Ebill Drawing Fee |
| 5 | | | | | | | | | | | |
| 6 | 13-Mar-04 | | -7,000.00 | | | 7,000.00 | -7.29 | -0.50 | 0.00 | 0.00 | -0.25 |
| 7 | 26-Mar-04 | | -25,000.00 | | | 25,000.00 | -31.51 | -0.50 | 0.00 | 0.00 | -0.25 |
| 8 | 7-Apr-04 | | -60,000.00 | | | 60,000.00 | -87.73 | -0.50 | 0.00 | 0.00 | -0.25 |
| 9 | 29-Apr-04 | | -47,000.00 | | | 47,000.00 | -86.09 | -0.50 | 0.00 | 0.00 | -0.25 |
| 10 | 10-Feb-04 | Total guarantee fees = "C" | -212.62 | | | | -212.62 | | | | |
| 11 | 10-Feb-04 | Total Ebill issue fees = "B" | -2.00 | | | | | -2.00 | | | |
| 12 | 29-Apr-04 | Due date adjustment = "D" | | 0.00 | | | | | | 0.00 | |
| 13 | | Total Ebill drawing fee | | | | | | | | | -1.00 |
| 14 | | Total guarantee required | | | | 139,000.00 | | | | | |

FIGURE 6.2C - Algorithm - No receivables (payables covered by guarantee)

| | A | B | C | D | E | F | G |
|---|---|---|---|---|---|---|---|
| | EXAMPLE SETTLEMENT NETWORK CONTROL JOURNAL | | | | | | |
| | | Account | | | Debit | Credit | |
| 1 | | Ebills payable control | | | | 30,000.00 | |
| 2 | | Ebills receivable control | | | 30,000.00 | | |
| 3 | | Trade debtors | | | 37.69 | | |
| 4 | | Guarantee fees receivable | | | | 54.95 | |
| 5 | | Ebill issue fees | | | | 2.00 | |
| 6 | | Ebill drawing fees | | | | 1.00 | |
| 7 | | Due date allowance | | | | -20.27 | |
| 8 | | | | | 30,037.69 | 30,037.69 | 0.00 CHECK SUM TO BE ZERO |

FIGURE 6.2D - Journal - Excess Payables Covered by Guarantee

| | A | B | C | D | E | F | G | |
|---|---|---|---|---|---|---|---|---|
| | EXAMPLE SETTLEMENT NETWORK CONTROL JOURNAL | | | | | | | |
| | | Account | | | Debit | Credit | | |
| 1 | | Ebills payable control | | | | 0.00 | | |
| 2 | | Ebills receivable control | | | 0.00 | | | |
| 3 | | Trade debtors | | | -17.27 | | | |
| 4 | | Guarantee fees receivable | | | | 0.00 | | |
| 5 | | Ebill issue fees | | | | 2.00 | | |
| 6 | | Ebill drawing fees | | | | 1.00 | | |
| 7 | | Due date allowance | | | | -20.27 | | |
| 8 | | | | | -17.27 | -17.27 | 0.00 | CHECK SUM TO BE ZERO |

FIGURE 6.2E - Journal - Excess Receivables

| | A | B | C | D | E | F | G | |
|---|---|---|---|---|---|---|---|---|
| | EXAMPLE SETTLEMENT NETWORK CONTROL JOURNAL | | | | | | | |
| | | Account | | | Debit | Credit | | |
| 1 | | Ebills payable control | | | | 139,000.00 | | |
| 2 | | Ebills receivable control | | | 139,000.00 | | | |
| 3 | | Trade debtors | | | 215.62 | | | |
| 4 | | Guarantee fees receivable | | | | 212.62 | | |
| 5 | | Ebill issue fees | | | | 2.00 | | |
| 6 | | Ebill drawing fees | | | | 1.00 | | |
| 7 | | Due date allowance | | | | 0.00 | | |
| 8 | | | | | 139,215.62 | 139,215.62 | 0.00 | CHECK SUM TO BE ZERO |

FIGURE 6.2F - Journal - No receivables (payables covered by guarantee)

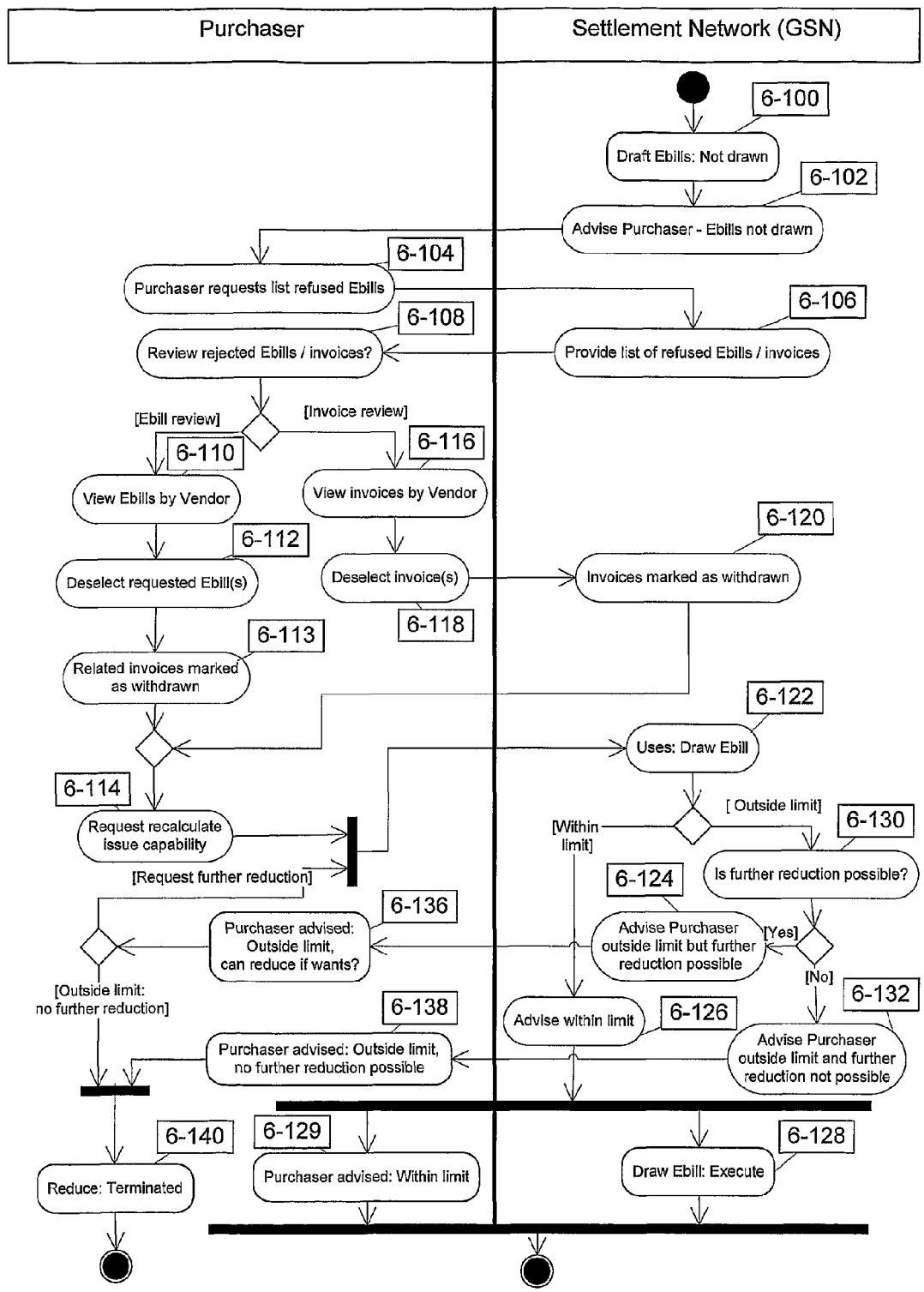
FIGURE 6.3 – Reduce Invoices Approved to Pay

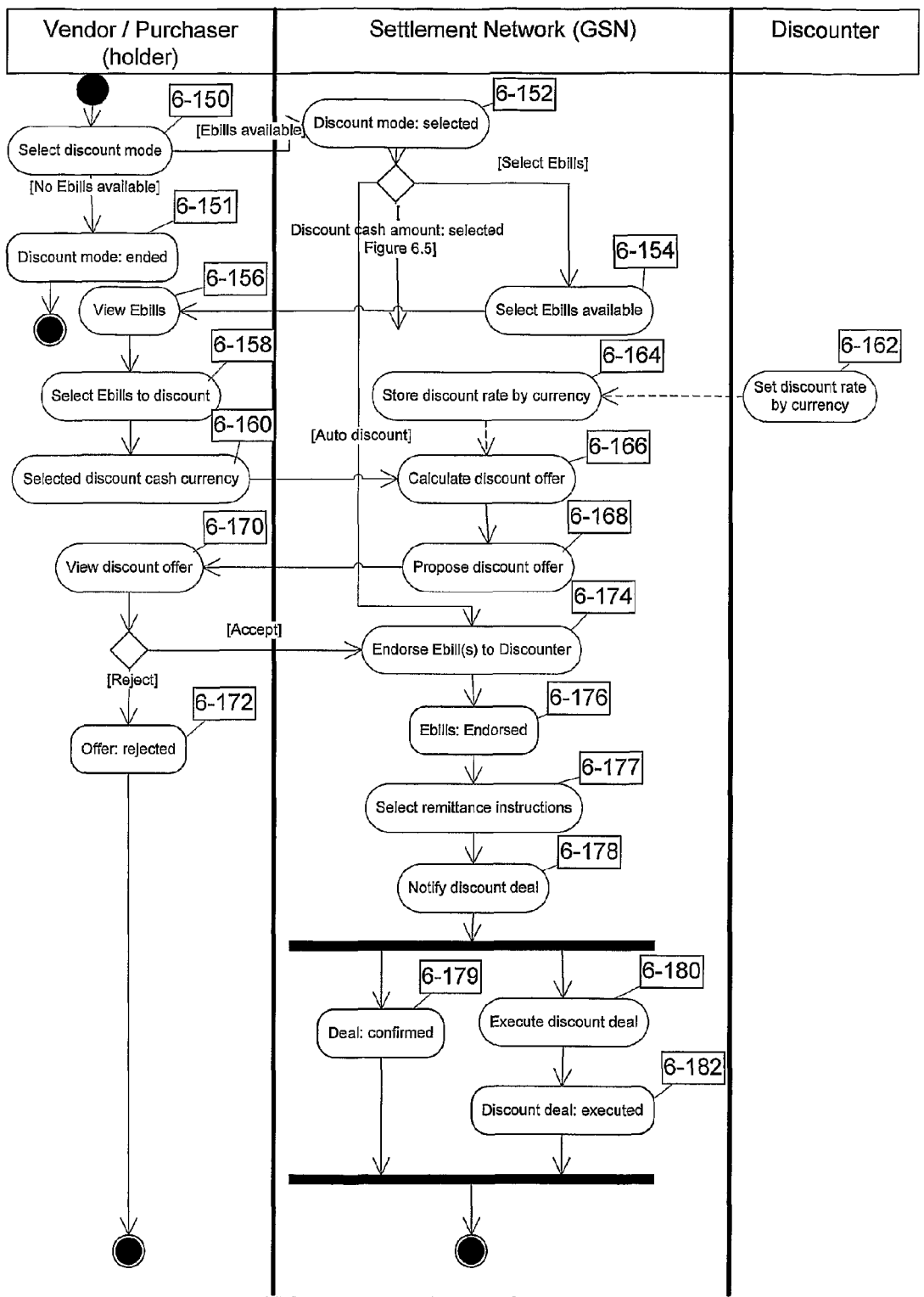
FIGURE 6.4 – Discount Selected Ebills

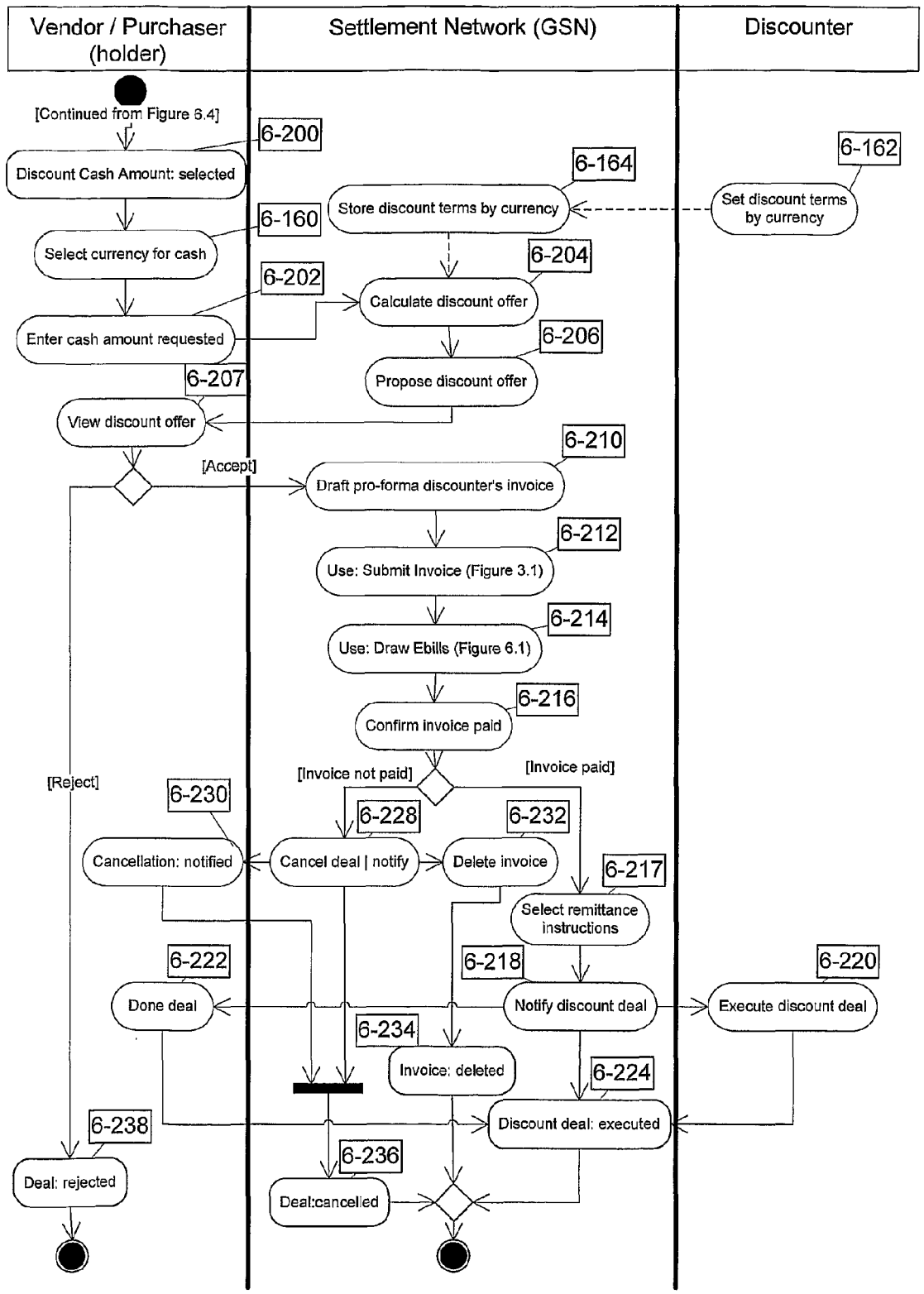
FIGURE 6.5 – Discount Cash Amount

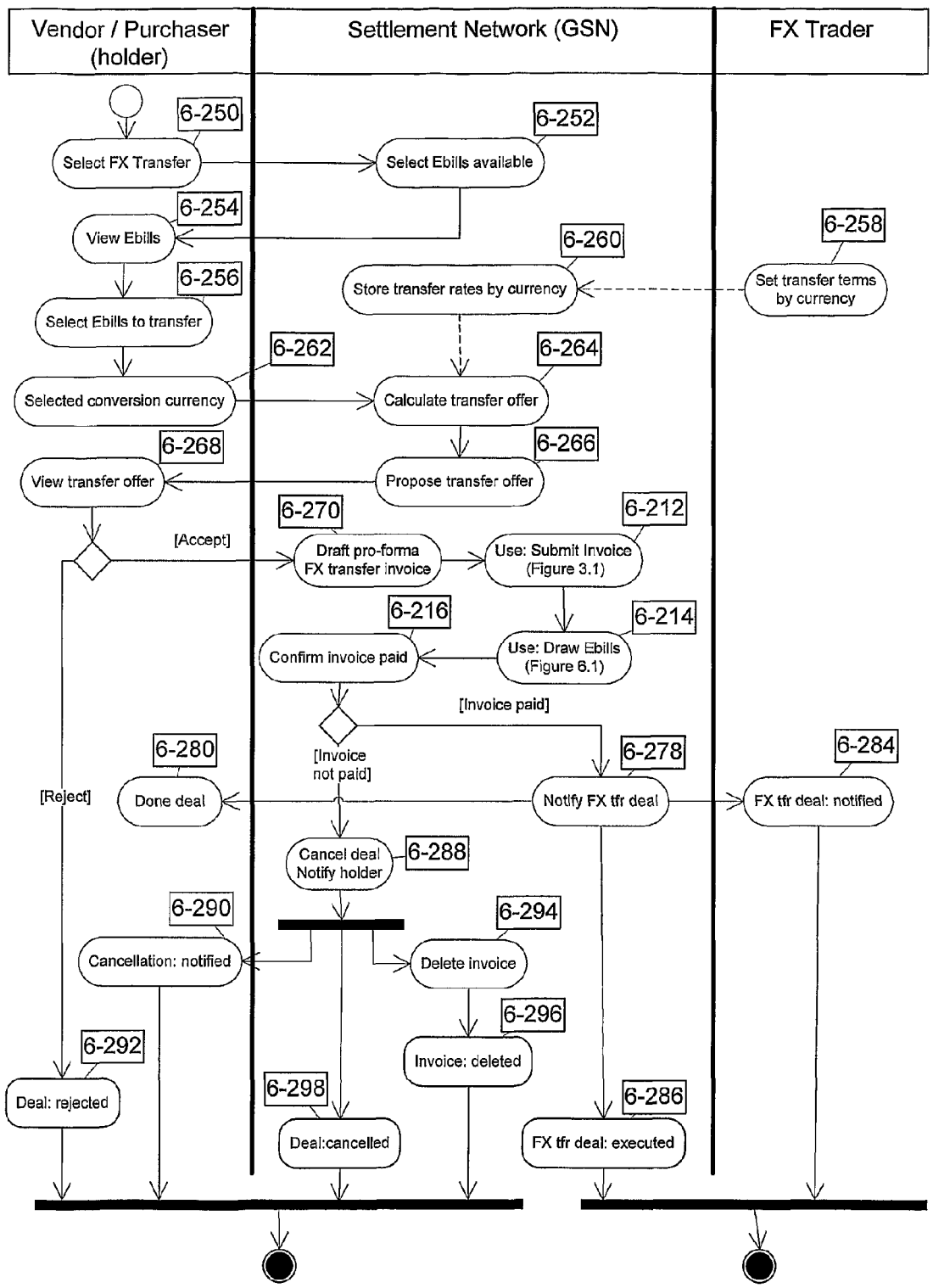
FIGURE 6.6 – Foreign Exchange Transfer

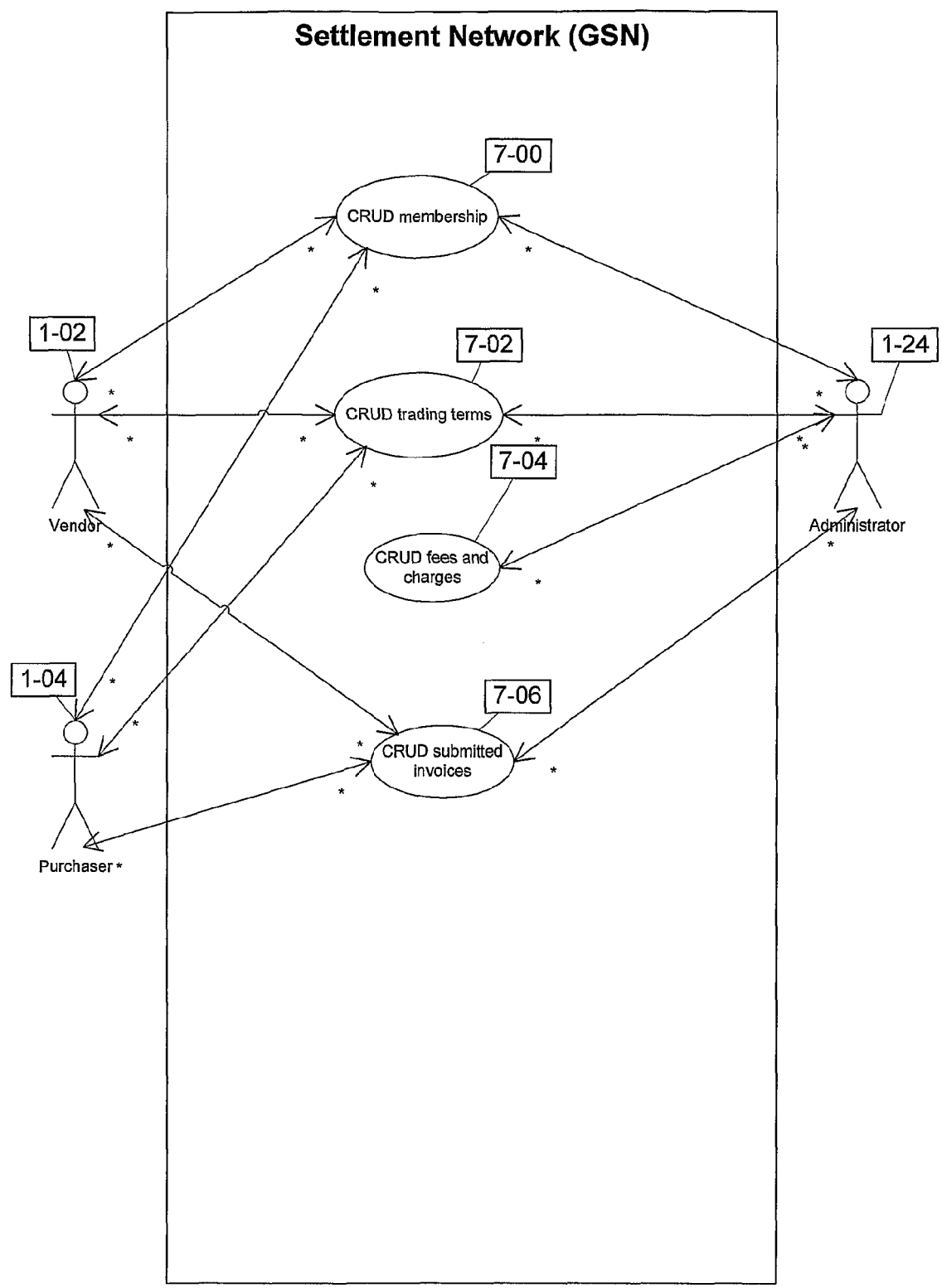
FIGURE 7 – Administrate GSN

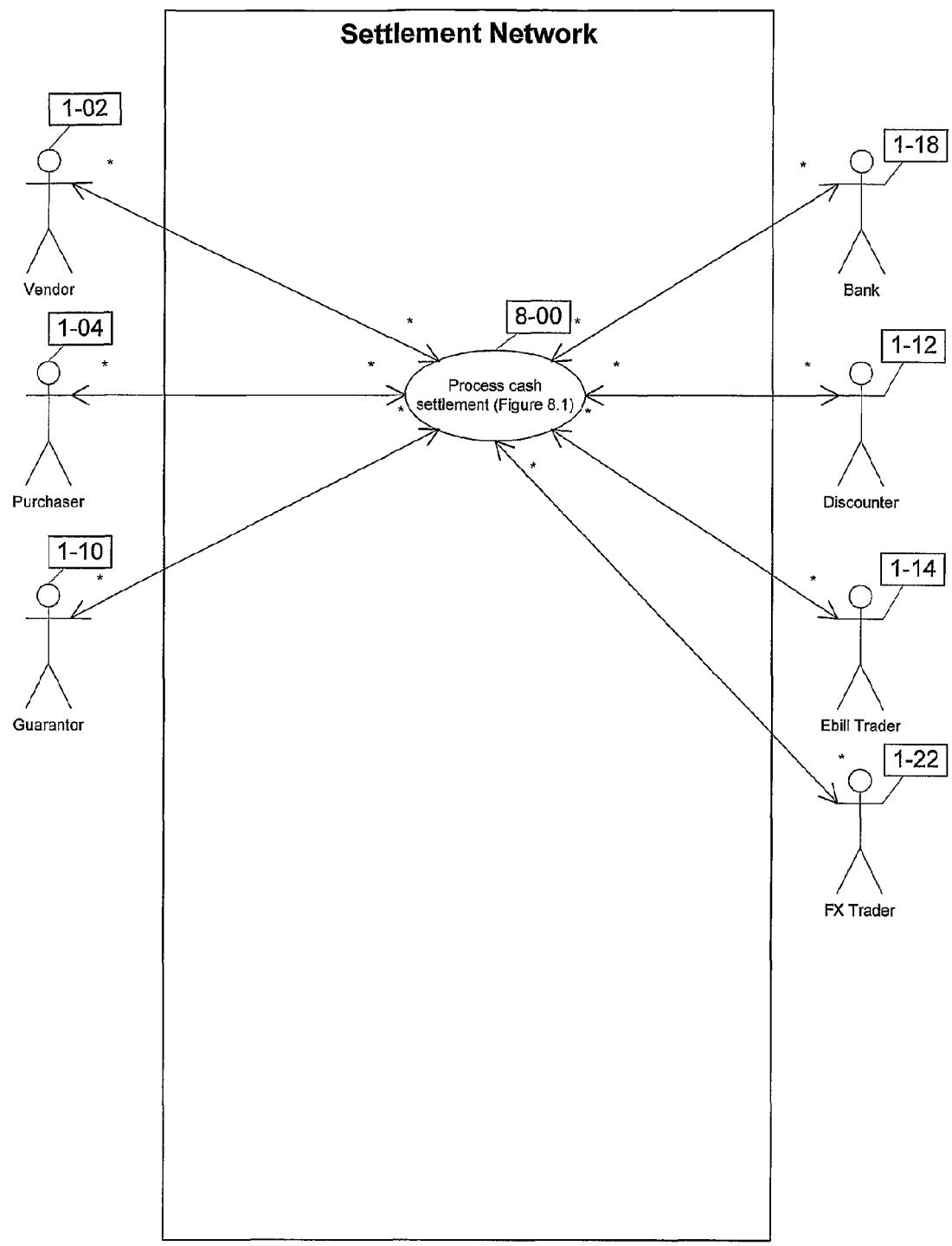
FIGURE 8 – Cash Settlement

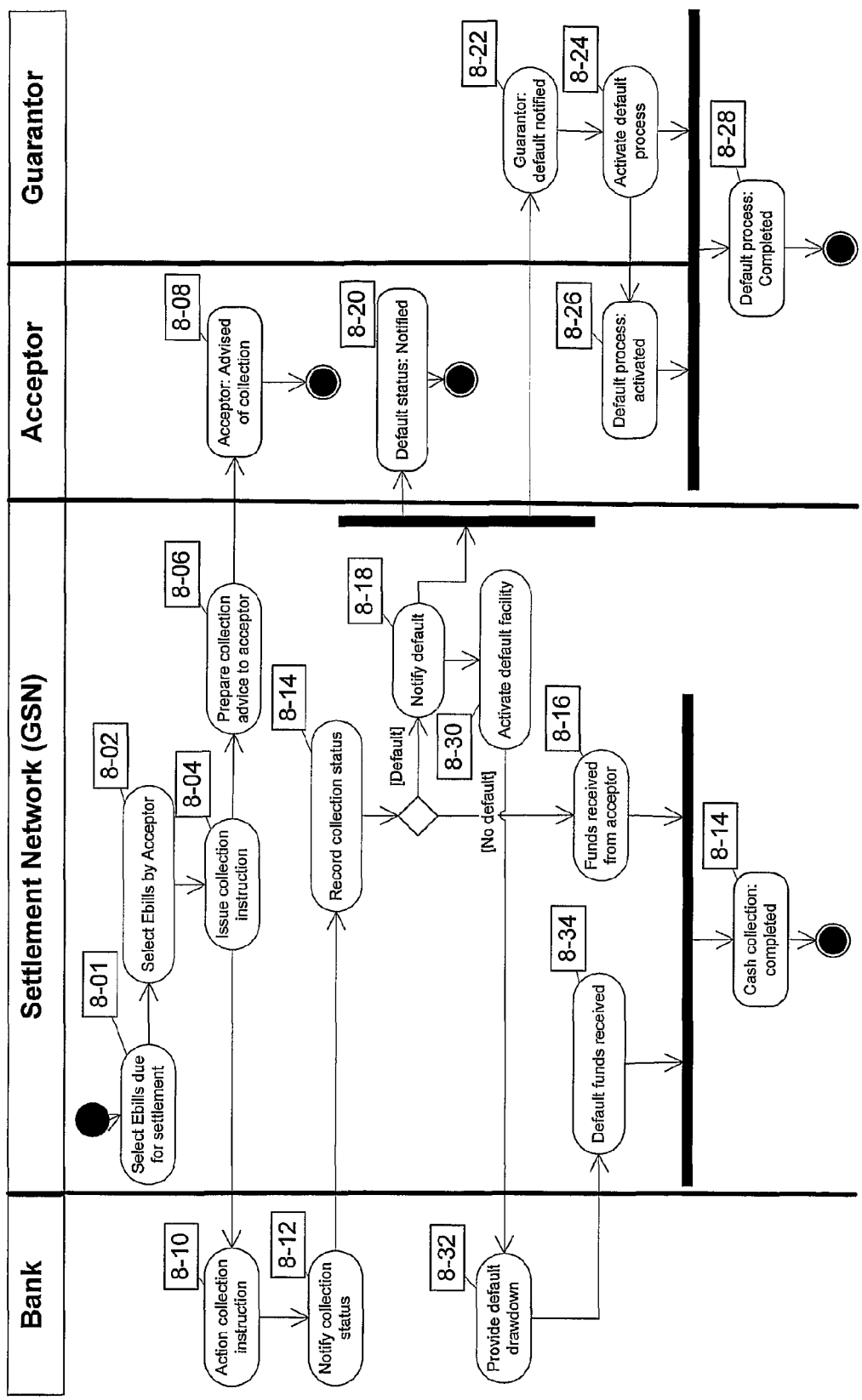
FIGURE 8.1A – Collect Cash From Acceptor / Guarantor

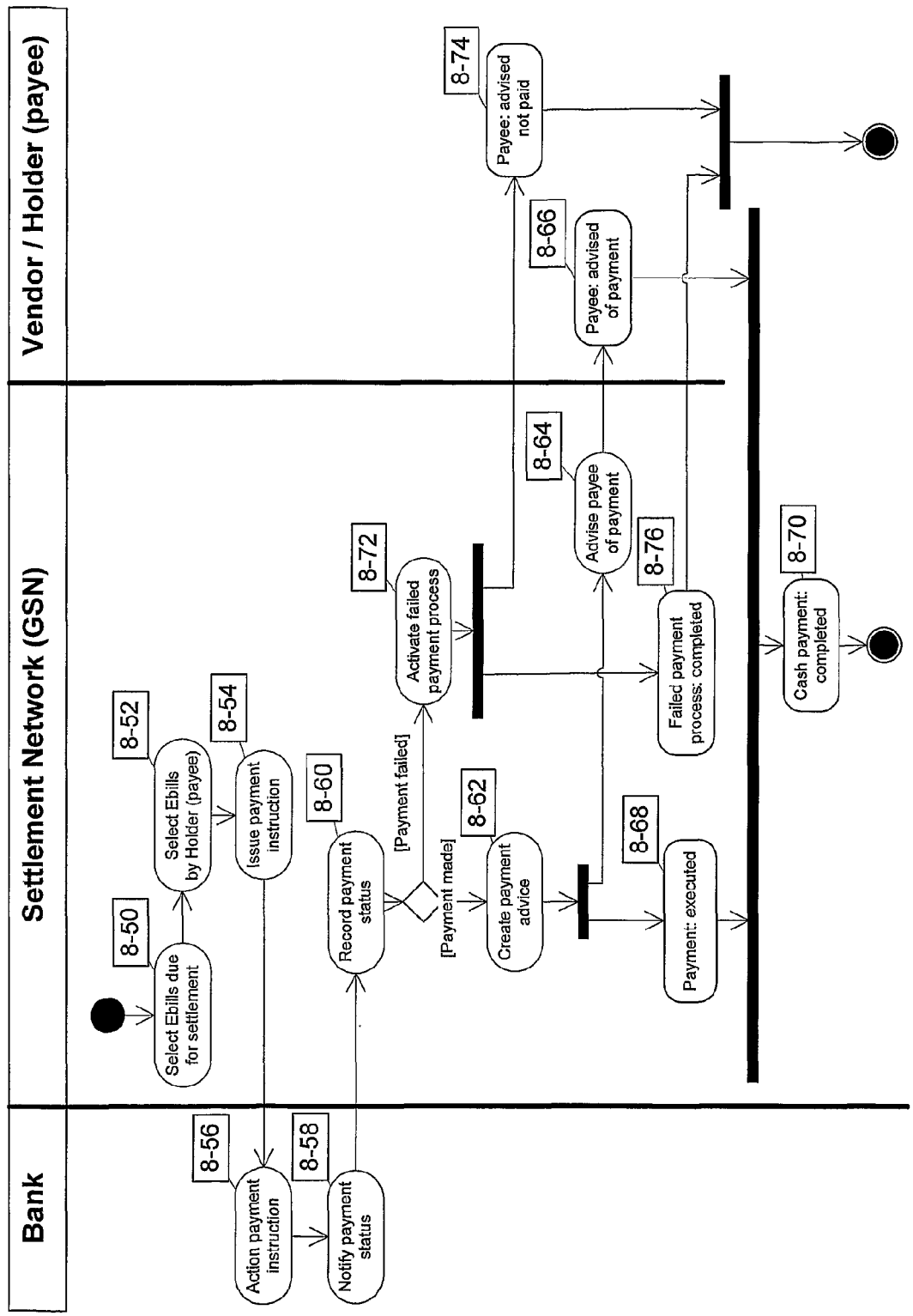
FIGURE 8.1B – Pay Cash to Holder

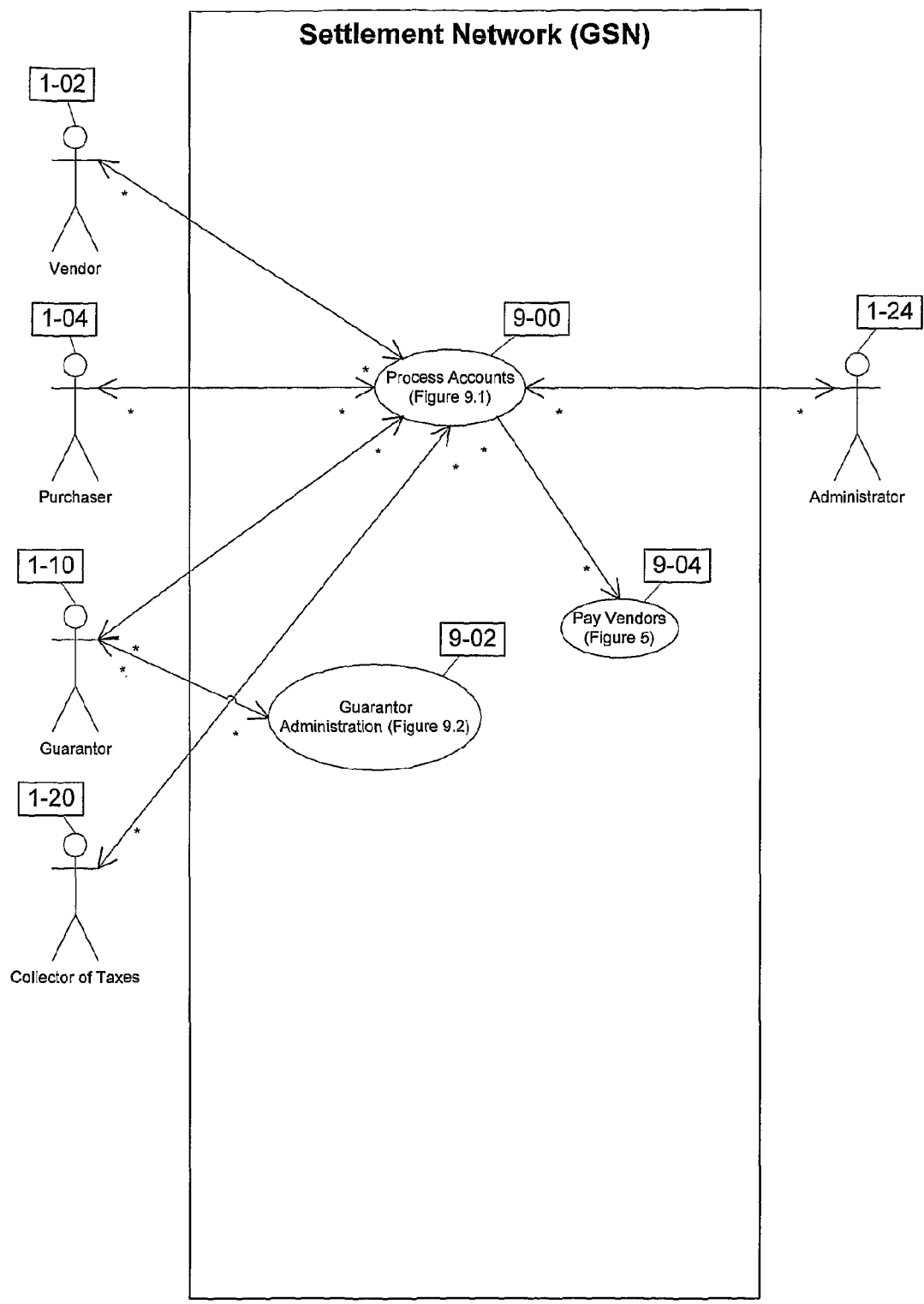
FIGURE 9 – View Accounts

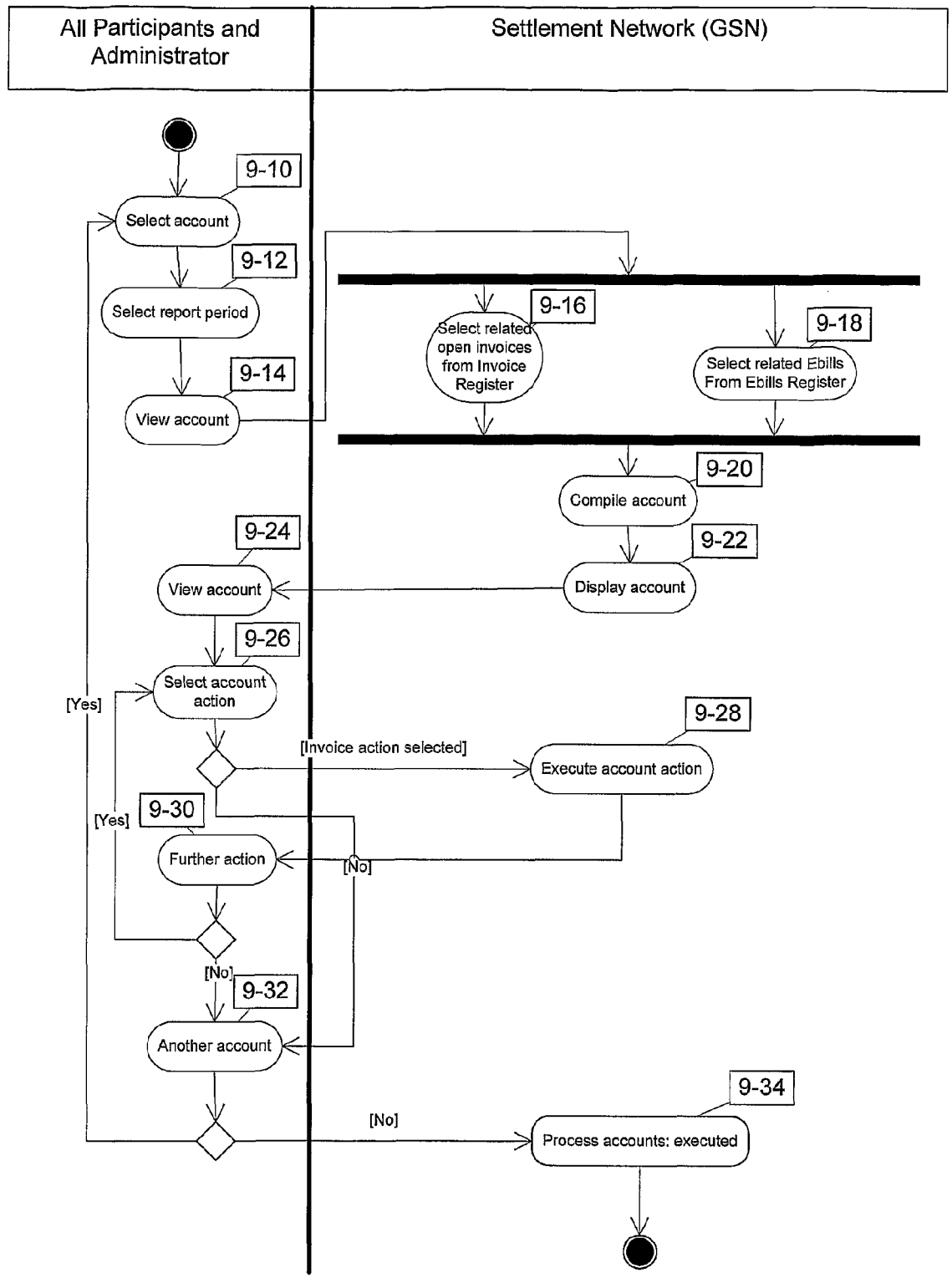
FIGURE 9.1 – Process Accounts

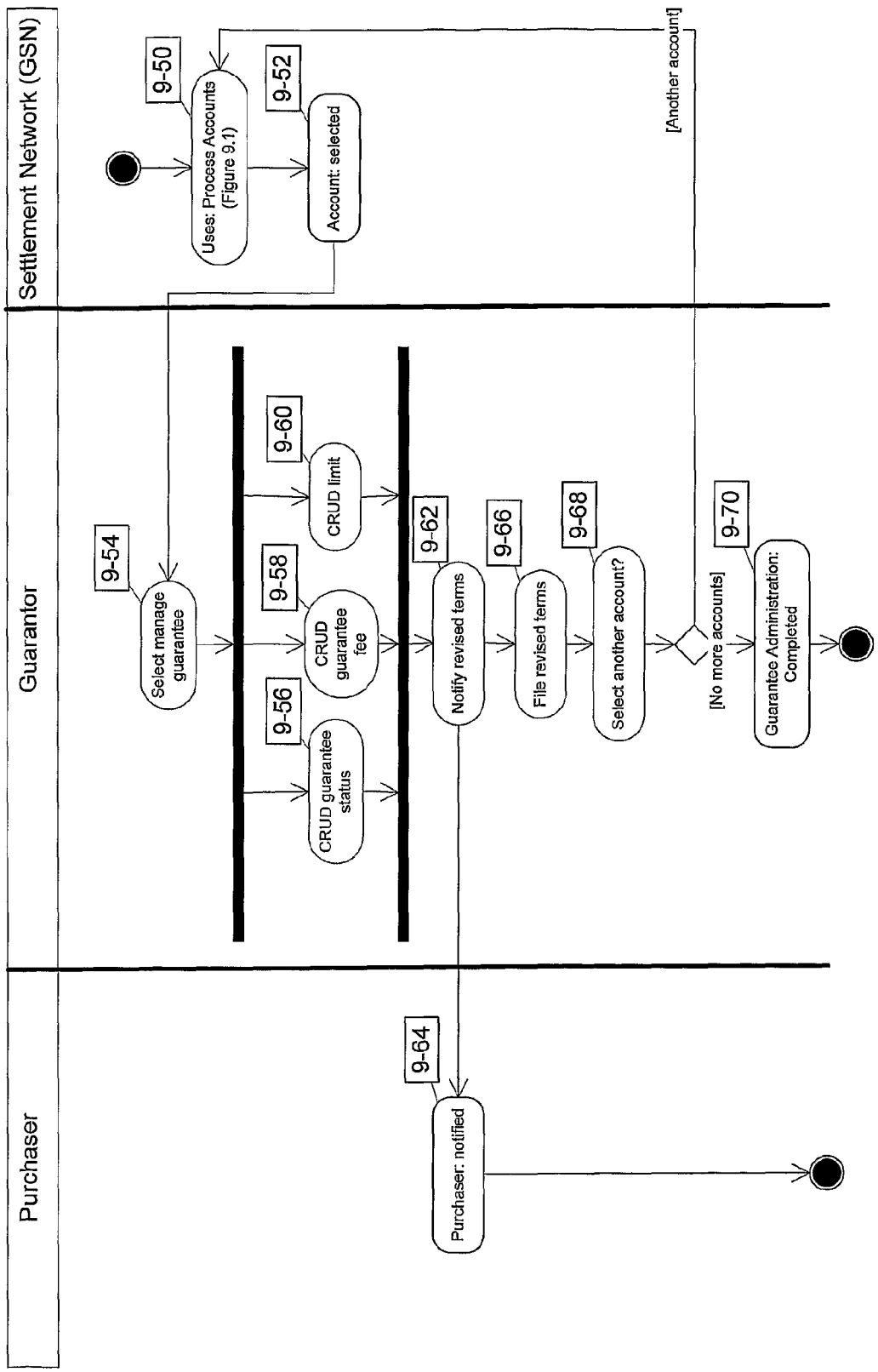
FIGURE 9.2 – Guarantee Administration

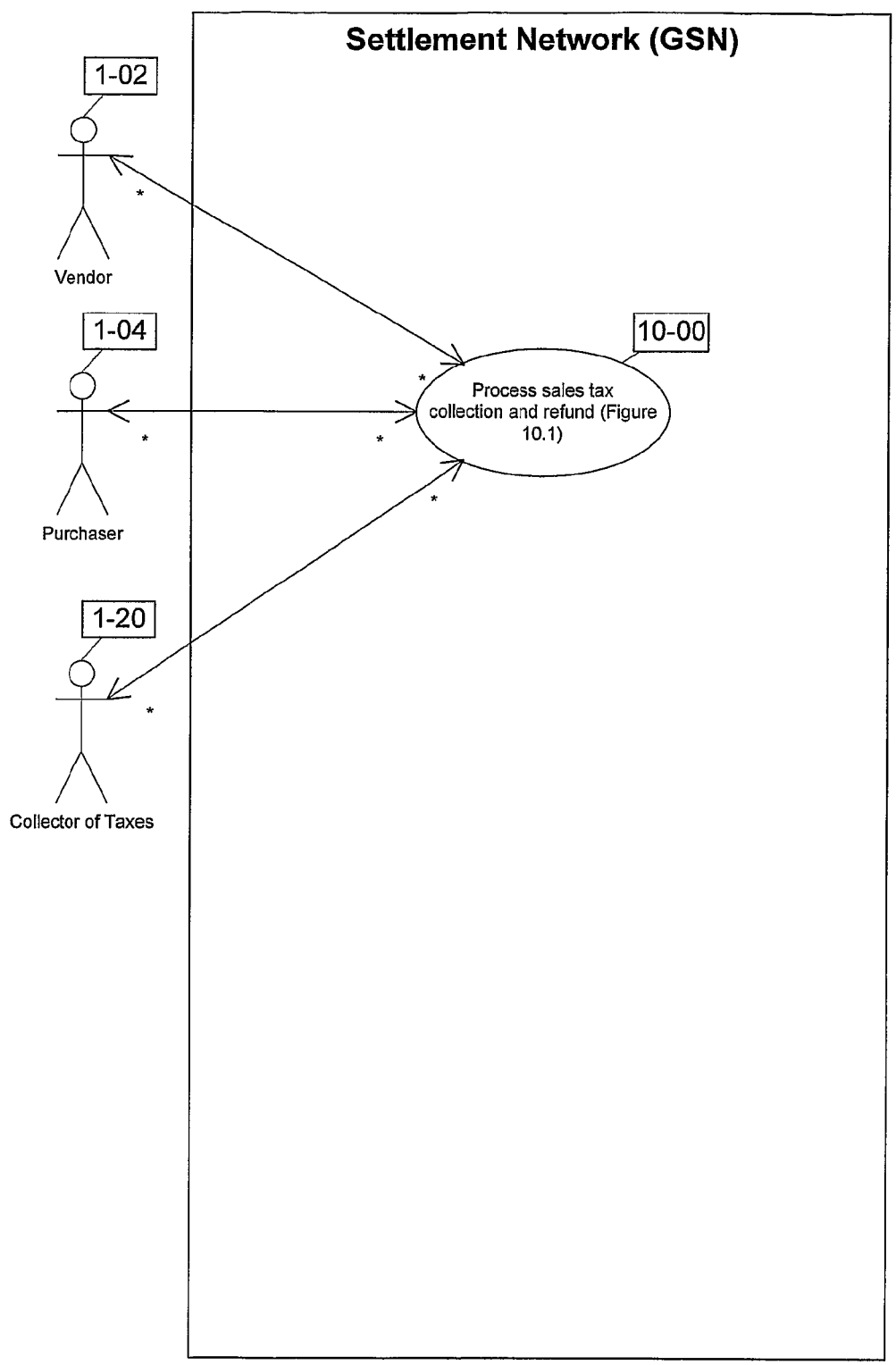
FIGURE 10 – Process Sales Taxes

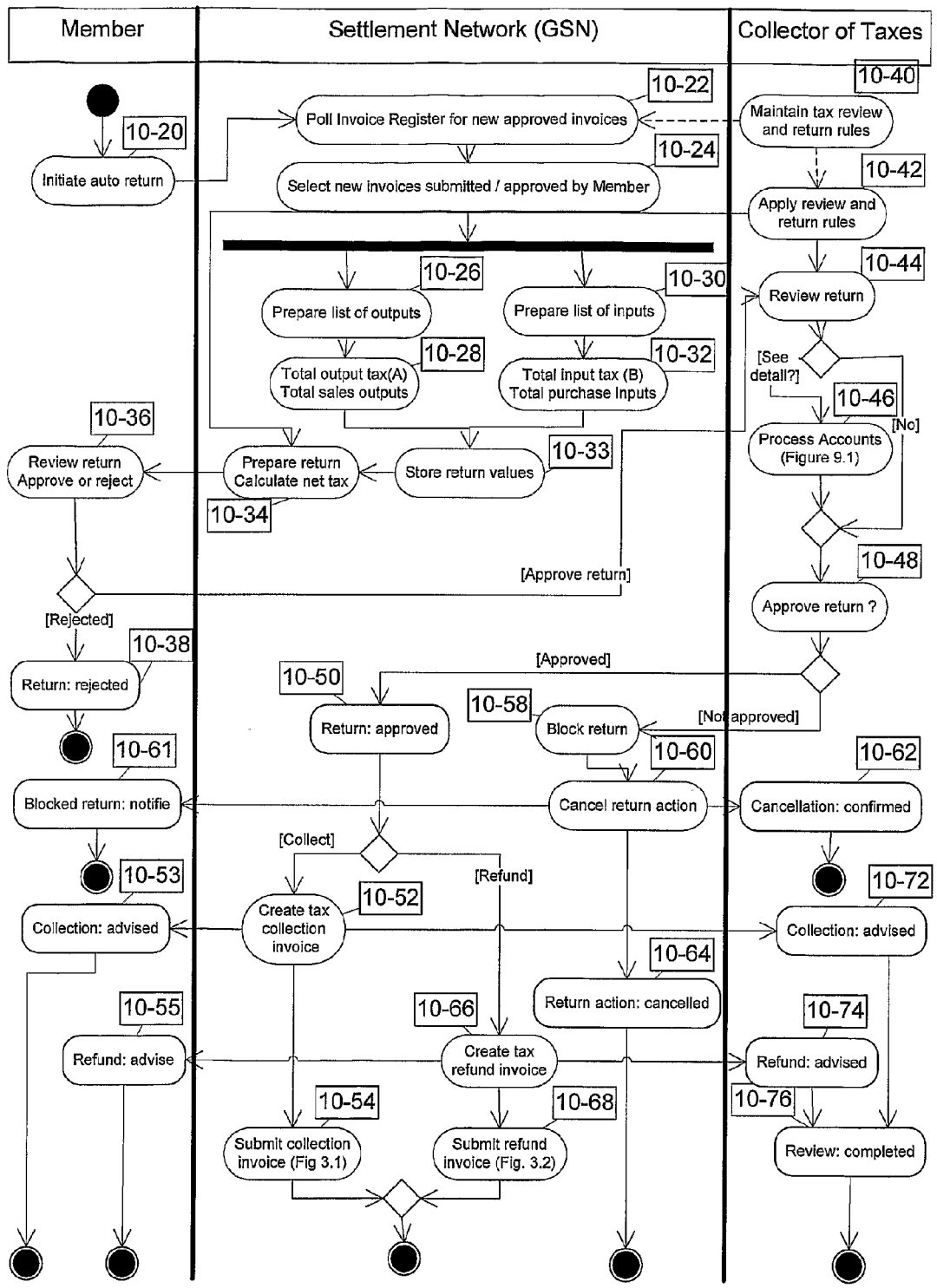
FIGURE 10.1 – Process Sales Tax Collection / Refund

| Row | GSN Doc ID | Invoice date | Invoice type | Vendor ID | Purchaser ID | Approval status | Payment status | VAT | Invoice Total | Total previously paid | Amount approved to pay |
|---|---|---|---|---|---|---|---|---|---|---|---|
| | Status before Ebills drawn | | | | | | | | | | |
| 2 | | | 1 | | | 4 | 0 | | 205,000.00 | 0.00 | 0.00 |
| 3 | | | 1 | | | 2 | 1 | | 123,000.00 | 70,000.00 | 53,000.00 |
| 4 | | | 1 | | | 2 | 1 | | 75,000.00 | 25,000.00 | 25,000.00 |
| | Status after Ebills drawn | | | | | | | | | | |
| 5 | | | 1 | | | 4 | 0 | | 205,000.00 | 0.00 | 0.00 |
| 6 | | | 1 | | | 2 | 2 | | 123,000.00 | 123,000.00 | 0.00 |
| 7 | | | 1 | | | 2 | 1 | | 75,000.00 | 50,000.00 | 0.00 |

KEYS

| Invoice Type | | | Approval Status | |
|---|---|---|---|---|
| 1 = | Vendor sales invoice | | 1 = | Open |
| 2 = | Self-billed invoice | | 2 = | Approved to pay |
| 3 = | Vendor credit note | | 3 = | Pay now |
| 4 = | Self-billed credit note | | 4 = | Hold |
| 5 = | Debit advice | | | |
| 6 = | Proforma invoice | | | |
| 7 = | Tax collection invoice | | | |
| 8 = | Tax refund invoice | | | |
| 9 = | FX invoice | | | |

| Payment Status | |
|---|---|
| 0 = | Nothing paid |
| 1 = | Part paid |
| 2 = | Fully paid |

FIGURE 11.1 – Invoice Register

| GSN Doc ID | GSN Doc ID (invoice) | GSN Doc ID (debit advice) | Debit Advice issue date | Part payment type | Bill ID | Ebill issue date | Amount paid |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

| KEY | | |
|---|---|---|
| Part Payment Type | 1 = | Debit advice offset |
|  | 2 = | Non debit advice payment |

FIGURE 11.2 – Invoice Part Payment Register

| Row | GSN Doc ID | Ebill ID | Ebill Payable Account ID | Ebill Type | Ebill Status | Issue Batch ID | Endorse Batch ID | Issue Date | Due Date | Drawer ID (Vendor) | Drawer Sig | Acceptor ID (Purchaser) | Acceptor Sig | Guarantor ID |
|---|---|---|---|---|---|---|---|---|---|---|---|---|---|---|
| 1 | | | | | | | | | | | | | | |
| 2 | | | | 1 | 1 | | | 19-Mar-04 | 18-May-04 | | | | | |
| 3 | | | | 2 | 1 | | | 19-Mar-04 | 13-May-04 | | | | | |
| 4 | | | | 3 | 1 | | | 19-Mar-04 | 28-May-04 | | | | | |
| 5 | | | | 4 | 1 | | | 4-Apr-04 | 28-May-04 | | | | | |

[Continuation]

| Row | Guarantor Sig | Primary Endorsee ID | Primary Endorser Sig | Endorse Type | Currency | Amount | Issue Batch ID | Amount due from Acceptor | Guarantee Amount | Guarantee Fee Rate | Guarantee Fee Term | Guarantee Fee Amount | Acceptance Fee | Drawing Fee |
|---|---|---|---|---|---|---|---|---|---|---|---|---|---|---|
| 6 | | | | | | | | | | | | | | |
| 7 | | | | | USD | 247,982.03 | 247,982.03 | 247,982.03 | 247,982.03 | 0.734% | 60 | 303.36 | 0.50 | 0.25 |
| 8 | | | | | USD | 300,749.82 | 198,462.87 | 198,462.87 | 198,462.87 | 0.835% | 55 | 253.18 | 0.50 | 0.25 |
| 9 | | | | | USD | 250,046.00 | 0.00 | 0.00 | 0.00 | 0.649% | 70 | 0.00 | 0.50 | 0.25 |
| 10 | | | | | USD | 6,000.00 | 0.00 | 0.00 | 0.00 | 0.000% | 54 | 0.00 | 0.00 | 0.00 |

KEYS

Ebill Type
- 0 = Proposed Ebill
- 1 = Issued against guarantee
- 2 = Issued partly back-to-back against endorsed Ebills
- 3 = Issued against endorsed Ebills
- 4 = Split balance Ebill
- 5 = Guarantee fee collection
- 6 = Acceptor fee collection
- 7 = Drawer fee collection

Ebill Status
- 0 = Proposed
- 1 = Open
- 2 = In endorsement
- 3 = In collection
- 4 = Collected
- 5 = Dishonoured on presentment

Ebill Endorsement Type
- 1 = Back-to-back endorsement
- 2 = Discount

FIGURE 11.3 - Ebill Register

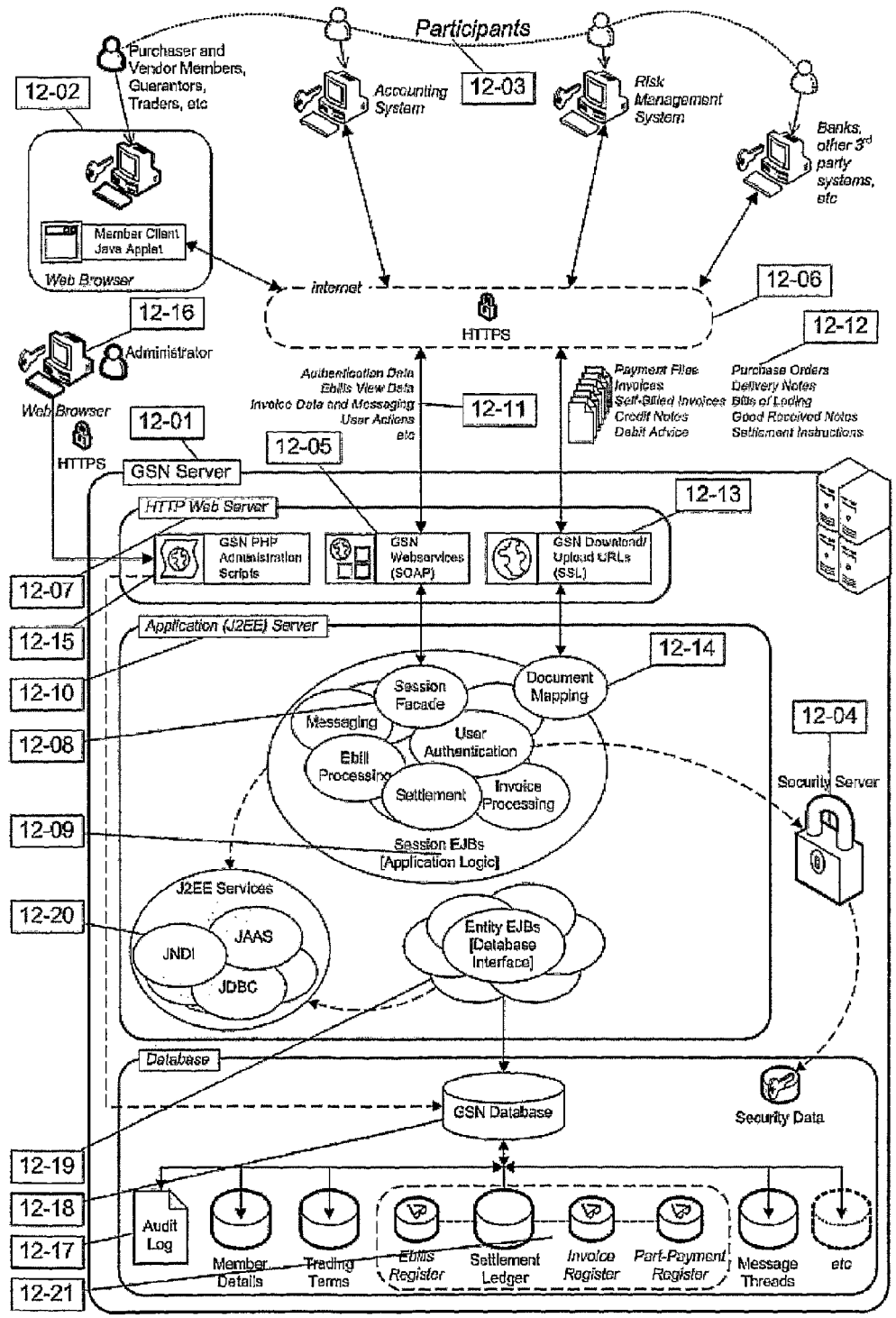
FIGURE 12 – GSN Deployment Diagram

METHOD OF SETTLING COMMERCIAL INDEBTEDNESS

CROSS-REFERENCE TO RELATED APPLICATIONS

This application is a U.S. national phase of PCT Appln. No. PCT/GB2005/001655 filed Apr. 29, 2005, which claims priority to United Kingdom Application 0409610.3, filed Apr. 29, 2004, the disclosures of which are hereby incorporated by reference in their entirety.

FIELD OF THE INVENTION

The present invention relates generally to the field of indebtedness communication and agreement integrated with settlement using electronic bills of exchange.

BACKGROUND OF THE INVENTION

Currently, a significant issue in the business sector is the problem of late payments between purchasers and vendors. Vendors incur both risk and cost in permitting purchasers extended time to settle. Legislation introduced to resolve the issue has been unenforceable in practice. Historically conventional bills of exchange and letters of credit have been utilized to accelerate access by a vendor to the proceeds from a sale by either endorsing a bill of exchange received to the benefit of its own vendors or by discounting the bill or letter of credit to cash. The legal, accounting and transactional processes are slow, time consuming and are not cost-effective, especially for high frequency settlement and for smaller amounts. Furthermore, conventional bills in particular are of variable and often unreliable quality, reducing their acceptability as a means of settling indebtedness. In consequence, bills of exchange and to a lesser extent, letters of credit, have fallen out of favour and are mostly only used for cross-border business and within a limited number of industries such as timber.

Existing methods of electronic bill/invoice presentment and payment (known as either EBPP or EIPP) only interface with the world of money. They rely upon banks and inter-bank settlement systems to move value between a vendor and a purchaser. These money-based systems suffer from delays and often excessive costs, especially for the rapid execution of settlement between vendor and purchaser. Furthermore, rapid money transfer methods are inappropriate for the transmission of smaller and particularly micro-amounts.

Bills of exchange and letters of credit payable are classified for accounting purposes as notes payable and are grouped, for balance sheet reporting purposes, as trade payables. The US Securities and Exchange Commission (SEC) is requiring that schemes for the third party financing of inventory and other trade purchases based on promissory notes such as IOUs be classified as loans and not trade payables on the balance sheet of purchasers. Bills of exchange are considered not to be affected by the recent SEC guidance. This has resulted in the need to update the traditional, paper-based bills of exchange method of settlement. Alternative methods of settlement are required whereby the purchaser provides advance funding to the vendor, taking full account of current methodology.

Currently the drawing and acceptance of a bill of exchange/letter of credit is a separate process from the process of approving purchase invoices for payment. The whole process is complex, leading to time delays and excessive costs. A fundamental disadvantage of the current solution is that the bills which are drawn and accepted are not only paper based but are wholly incompatible with an electronic bill of exchange.

Current electronic settlement solutions, such as Orbian which was introduced into the US in 2002, require methods of storing and transferring value requiring two separate instruments (a) to record the indebtedness of a purchaser to an intermediary in the form of extinguishable debt such as a promissory note or Primary Orbian Credit; and (b) to record the indebtedness of the intermediary to the vendor in the form of a further promissory note or Orbian Credit. Both known instruments are more likely to be classified for balance sheet purposes as loan notes payable or receivable rather than as trade payables or trade receivables. Such classification, from the purchaser's viewpoint, results in an adverse gearing effect.

Individual businesses as separate legal entities conventionally maintain their own individual accounting systems wherein many accounting documents are entered more than once and separately into each system. This leads to inefficiencies and error with consequent problems of reconciliation between contracting and interacting parties.

Communication between separate businesses is traditionally by means of telephone, letter, fax and email. Where these communications are related to the negotiation and settlement of trade transactions in larger organisations, it is difficult to ensure that all personnel have access to the full current picture. Many communications are really related to specific transactions rather than the wider scope of relations between the parties but are ineffectually indexed, if at all, to specific transactions.

DESCRIPTION

The present invention concerns a system and method which enables vendors (Vendor) and purchasers (Purchaser) who are members (Member) of a global settlement network (GSN) to submit and approve electronic invoices, whether generated by the Vendor or the Purchaser, which are recorded on an invoice register (Invoice Register) for payment integrated with the electronic drawing, accepting, guaranteeing, endorsing, trading, discounting, presenting and protesting of bills of exchange (which term includes letters of credit), denominated in any currency (Ebill).

For the avoidance of doubt, the terms sales invoice and purchase invoice shall respectively include sales credit note and purchase credit note and the term invoice shall include all or any of the aforementioned.

It is a feature of the present invention that an Ebill is contractually agreed by the Vendor as drawer, the Purchaser as acceptor, the guarantor, the endorser and the endorsee to conform to all requirements for a lawful bill of exchange and that duly authorised digital signatures applied by a party through GSN to or connection with an Ebill shall constitute a contractually binding written signature and authorization.

It is an advantage of the present invention to provide a system and method of effecting the settlement of indebtedness by means of an Ebill which are classifiable for accounting reporting purposes as trade receivables and trade payables and not as loans, promissory notes or corporate paper.

The present invention resides in an improvement in the known methods and systems for approving Vendor invoices for settlement by means of bills of exchange. The inventor has appreciated that it is advantageous to provide the Vendor with the proceeds of sale from its sales invoices at the time of or close to the invoice date as possible by means of electronic bills of exchange, guaranteed by a guarantor to the equivalent of a common A-1/P-1 standard. The inventor has also appreciated that it is to the advantage of the Vendor to automate the process of drawing the Ebill as a direct consequence of the issue and approval for payment of its sales invoice. The inventor has further appreciated that it is to the advantage of the Purchaser to automate the process of accepting Ebills in settlement of purchase invoices which it has approved for payment by means of Ebill.

It is a further feature of the present invention that the Vendor is provided with the means to transmit to GSN a file comprising one or more invoices created as suitable output from its own back-office system and mapped, where necessary, by GSN to the invoice input format of the Invoice Register. As an integral part of the action of transmitting the sales invoice(s) to GSN, the Vendor confirms its instruction to draw one or more Ebills in settlement of the invoices submitted.

It is an alternative feature of the present invention that the Purchaser functioning in self-billing mode is provided with the means to transmit to GSN a file comprising one or more self-billing invoices created as suitable output from its own back-office system and mapped, where necessary, by GSN to the input format of the Invoice Register. As an integral part of the action by the Purchaser of transmitting the file of self-billed invoice(s) to GSN, the Purchaser confirms its acceptance of one or more Ebills drawn by or on behalf of the Vendor in settlement of the invoices submitted and further the Purchaser accepts those Ebills as drawn.

According to a further aspect of the present invention, there is provided a method whereby the Purchaser can execute an accounts payable payment run in banking mode, creating and submitting a payment instruction (Payment File) thereby initiating the automated process for both drawing and accepting Ebills in settlement to its Vendors. As an integral part of the action of the Purchaser creating and transmitting a bank payment instruction to GSN, GSN executes the Vendor's instruction to draw one or more Ebills in settlement of the related invoices. The action of transmitting the bank payment instruction to GSN also automatically executes the Purchaser's acceptance of the Ebills thereby drawn.

In a preferred additional aspect to the present invention, when the Purchaser submits a Payment File, it also transmits one or more related remittance advises specifying the related vendor invoices settled by Ebill so as to enable the Invoice Register to be updated with the payment status.

According to a further aspect of the present invention, where the Purchaser has submitted a purchase order to GSN and the Purchaser has submitted a goods received note to GSN, the system calculates the invoice value of the goods delivered and the related sales taxes and generates a Vendor invoice for presentation and settlement in accordance with this invention.

According to another aspect of the present invention, where the Purchaser has submitted a purchase order to GSN and the Vendor has submitted a goods delivery note to GSN, the system calculates the invoice value of the goods to be delivered and the related sales taxes and generates a Vendor invoice for presentation and settlement in accordance with this invention.

According to yet another aspect of the present invention, where the Purchaser has submitted a purchase order to GSN and the Vendor has submitted a bill of lading to GSN, the system calculates the invoice value of the goods specified on the bill of lading and the related sales taxes and generates a Vendor invoice for presentation and settlement in accordance with this invention.

By way of clarification, a Member may be authorised to function both as a Purchaser and as a Vendor engaging in trading relationships, to be settled by Ebill, with any other Member which has likewise been registered with GSN. A Member may be any legal entity including, for the avoidance of doubt, a corporation, government or a department of government, public sector organization, charity and including a person or partnership or other unincorporated entity.

According to another aspect of the present invention there is provided a method of securely storing and distributing invoice and Ebill data concerning more subjects to and from authorised user sites operated on behalf of one or more authorised Vendors, Purchasers, guarantors (Guarantor), risk/liquidity managers (Risk Manager), discounters (Discounter) and banks ((Banks) (all the aforementioned are referred to collectively or, where appropriate individually, as Participants) the method comprising: storing and maintaining Ebill settlement trading terms for each Vendor/Purchaser pairing; receiving and holding invoice data in the Invoice Register; and securely enabling Participants to draw, accept, guarantee, endorse, present and protest Ebills recorded on the register of Ebills (Ebills Register).

It is a further feature of the present invention that it is contractually agreed by Participants that a goods received note, goods delivery note, bill of lading, purchase order, sales tax return and any other relevant documentation delivered through GSN shall be legally and irrevocably binding on the relevant parties thereto.

It is a further preferred feature of the present invention that GSN stores on the Invoice Register a single instance of each invoice in electronic document format or reproducible from stored data and any summary of an invoice for all the operational purposes of GSN and the Participants.

It is a distinguishing feature of the present invention that an Ebill is represented on the system for all purposes by a single document of record whether from the aspect of the Vendor, the Purchaser, the Risk Manager, the Guarantor or the Discounter. The Ebill data, which is securely held on the Ebills Register comprises the identities of the drawer, acceptor, guarantor, and endorser (if any) together with their digital signatures plus the identity of the endorsee (if any), holder for value, issue date, denominated currency, amount, due date (Due Date) and presentment method. The Ebill data also includes the history and status of each Ebill in terms of when and by whom drawn, accepted, guaranteed, endorsed and to whom endorsed, presented and, where applicable, protested.

It is yet a further feature of the present invention that it permits the drawing and acceptance of an Ebill with the number of days between the issue/acceptance date of the Ebill (Issue Date) and its due date (Due Date) as agreed between each Vendor/Purchaser pairing (Term).

It is a further feature and advantage of the present invention to permit any Vendor/Purchaser pairing to agree their mutual terms of trade expressed in terms of the maximum number of days between the invoice date or the date of entry of the Vendor's sales invoice on the system (Invoice Date) and the Issue Date of the Ebill (Issue Period). The mutually agreed terms of trade preferably further provide that where the Purchaser exceeds the contracted issue period before accepting an Ebill (Issue Period), the Due Date is foreshortened by a pre-agreed number of days related to the excess days beyond the Issue Period.

It is yet a further feature of the present invention to permit the Purchaser to withhold from acceptance the whole or any portion of one or more vendor invoices outstanding for settlement and the amount of the corresponding Ebill is calculated accordingly.

It is a further feature of the present invention to permit the Ebills Register to record acceptance by the Purchaser and the guarantee by a registered third party entity (Ebill Trader) of one or more Ebills issued against the back-to-back endorsement to the Ebill Trader of one or more or any part of Ebill(s) receivable by the Purchaser.

It is an important feature and advantage of the present invention to provide a system and method which enables a Purchaser to accept one or more Ebill(s) and obtain a simultaneous guarantee for the accepted Ebill(s) by endorsing to an Ebill Trader one or more Ebill(s) receivable which it already holds or any portion thereof as back-to-back collateral for the accepted Ebills with or without a compensating charge or credit to the Purchaser to take account of the disparate Due Dates and amounts of the Ebills endorsed to and the Ebills guaranteed by the Ebill Trader.

It is a further important feature of the invention to provide a system and method for an Ebill Trader to set credit and charging rates to compensate for any mismatch between the amounts and Due Dates of Ebills endorsed to it by the Purchaser and the amounts and Due Dates of the Ebills to be accepted by the Purchaser back-to-back against the endorsed Ebills. The system and method further automates the aggregation and netting by Due Date of the amounts of Ebills endorsed by the Purchaser as back-to-back collateral for the issue and guarantee by the Ebill Trader of Ebills accepted by the Purchaser, calculating the net charging or compensation rate to be applied (Trader's Fee).

Ebills are endorsed in their entirety without recourse to the endorser and the endorsee thereby becomes the payee. The endorser has no further interest in or title to the Ebill.

Where any part of the amount of an Ebill endorsed in its entirety to the Ebill Trader is in excess of the amount required as back-to-back collateral for the issue and guarantee by the Ebill Trader of Ebills accepted by the Purchaser, it is a further important feature of the invention to provide a system and method to split the amount of the Ebill endorsed and issue to the account of the Purchaser an Ebill corresponding to the excess balance amount after taking account of the Trader's Fee, on the same terms including Due Date as the original endorsed Ebill.

Where the total amount of one or more Ebills endorsed by the Purchaser to the Ebill Trader is less than the total amount required as back-to-back collateral for the issue and guarantee by the Ebill Trader of Ebills accepted by the Purchaser, it is a further important feature of the invention that the Purchaser is provided with a system and method whereby the portion of the amount of an accepted Ebill which is not covered by the endorsement of back-to-back collateral is covered by a guarantee from the Guarantor.

It is an additional feature of the present invention to provide a system and method of recording on the Ebills Reg.ister the endorsement of an Ebill without recourse to the endorser at any time between its Issue Date and its Due Date, the endorsee being a holder in due course.

It is a further feature of the present invention to provide a system and method which enables the Vendor as drawer to endorse and discount an Ebill to cash with a Discounter without recourse to the Vendor as endorser.

It is an additional feature of the present invention that a trader can provide foreign exchange services so that the holder of one or more Ebills denominated in one currency can endorse the Ebill(s) to the trader as back-to-back consideration for the Ebill Trader's acceptance of one of the same or a different plurality of Ebills denominated in one or more other currencies.

As a further feature of the present invention, the Discounter is provided with a system and method to consolidate by Due Date one or more Ebills to produce a corporate paper instrument with a corresponding total amount and Due Date for onward discounting in the money market.

Another feature of the present invention is to provide the Vendor with an Ebills receivable account (Ebills Receivable Account) which displays those Ebills recorded on the Ebills Register which have been drawn by the Vendor and accepted by the Purchaser.

A further feature of the present invention is to provide the Purchaser with an Ebills payable account (Ebills Payable Account) which displays those Ebills recorded on the Ebills Register which have been accepted by the Purchaser.

A further feature of the present invention enables a guarantor to maintain, enforce and monitor a maximum exposure limit on each Ebills Payable Account for which it is the contracted guarantor and to set and maintain fees payable by the Purchaser for the guarantee on acceptance by the Purchaser of each Ebill payable. The Ebills Payable Account displays to the Guarantor those Ebills which have been accepted by the Purchaser and also shows the balance amount payable by the purchaser to GSN on the due date.

It is a further feature of the present invention to provide a system and method that automatically presents the Ebill to the acceptor on the Due Date and either requests or instructs collection from the acceptor of the amount of the Ebill. In the event that the amount is not collected on the Due Date or a predetermined number of days thereafter, the bill being thereby dishonored by non-payment, the system automatically protests the dishonored Ebill and collects the amount from the guarantor.

It is another feature of the present invention to provide a system and method that authorizes the transmission of the value of the Ebill to the drawer or endorsee holder (Holder) on the Due Date. For the purpose of remitting the value of the Ebill to the Holder on the Due Date, the system and method aggregates the total of Ebills due for remittance to the Holder on that date or at any time thereafter. This has the advantage of minimizing cash remittance banking costs and of avoiding the disproportionate costs of remitting minor amounts of cash.

It is a further feature of the present invention that it provides a system and method which calculates and collects the issue fee (Issue Fee) for each Ebill on the issue date of the Ebill by drawing an Ebill for one or more Issue Fees, the Issue Fee being expressed as a fixed amount and/or an ad valorem amount per Ebill.

It is another feature of the present invention to provide Vendors and Purchasers with access to a near real-time system and method by which to record and book on their own back-office systems the drawing, accepting, endorsing and discounting of Ebills.

A further feature of the present invention is to provide the Vendor with integrated accounts receivable which display the sales invoices held on the Invoice Register for settlement by Ebill together with their payment status. The accounts receivable preferably provides access to a message thread created between the Vendor and the Purchaser (Message Thread), each Message Thread related to a specific invoice.

Another feature of the present invention is to provide the Purchaser with integrated accounts payable which displays the purchase invoices held on the Invoice Register for settlement by Ebill. The accounts payable enables the Purchaser to review, select and authorize payment of individual invoices, to withhold invoices in total or part total from payment and to accelerate payment of invoices before the contracted date for the settlement of the invoice. The accounts payable preferably provides access to the Message Thread.

It is a further feature of the present invention that it has a system and method that maintains a single ledger instance which is viewed by the relevant Vendor and Purchaser as their respective accounts receivable and accounts payable together with a single Message Thread related to each invoice within the trading pair.

It is a feature of the present invention that the Message Thread is created, stored and displayed as a single sequential list of messages related to a specific invoice regardless of the identity of the authorized user creating each message in the Message Thread.

It is a further feature and advantage of the present invention to provide Vendors and Purchasers with access to a method using electronic posting slips by which to record and book on their own back-office systems the settlement by means of Ebill of accounts receivable and accounts payable indebtedness.

It is still another feature of the present invention to provide the Vendor with a system and method of sales credit control tracking including reporting any delay or other delinquency in settlement by Ebill.

A further feature of the present invention is to provide the Purchaser with a system and method of raising a debit advice (Debit Advice) to the Vendor where all or any item of a Vendor's invoice is wrong as to product or line item identity, quantity, quality, unit price, extension, taxation, delivery or other cause wherein the system calculates the details and total of the amount of purchase credit required, creating a Debit Advice. The system and method offsets the Debit Advice against the related invoice, and the corresponding Ebill is drawn for the net amount. The Debit Advice is subsequently reconciled with the Vendor's credit note.

Yet a further feature of the present invention is to provide Members with an integrated and automated system for the reporting, summarizing, netting, collection and refund of sales taxes.

The method may further comprise gathering vendor, purchaser self-billing and remittance advice derived invoice data at a central site and subsequently updating the distribution site with the gathered data.

The invoice gathering step may comprise invoice data from more Members where two or more Members have different data transmission protocols, and for each Member having a different data distribution protocol, the method may further comprise implementing an appropriate communications protocol for gathering invoice data from each Member. This enables GSN to process data from different Members even if they employ different communication protocols.

The invoice gathering step preferably comprises consolidating, integrating and reformatting gathered invoice data from the plurality of Members. In order to place the invoice data into a suitable format, it is necessary to strip the gathered data down to its raw data and then reformat it and combine it with other data. The uniformity of the stored data is essential for efficient further distribution of the invoice data to Participants.

The method may further comprise providing a Vendor or Purchaser or another Participant with a viewable and/or printable image of an invoice in either a suitable GSN format or in the original invoice format with or without personalization with the images and layout of the original invoice format.

Preferred embodiments of the present invention will now be described by way of example with reference to the accompanying drawings. In the drawings:

FIG. 1 is a use case diagram which illustrates an example overview of the key entities/actors participating an updated settlement network and system for an embodiment of the present invention;

FIG. 2A is a use case diagram of an updated settlement network and system showing an overview of the data flow for an embodiment of the present invention;

FIG. 2B is a use case diagram of an updated settlement network and system showing a further overview of the data flow for an embodiment of the present invention;

FIG. 3 is a use case diagram showing methods used by the Vendor and Purchaser to process invoice data for an embodiment of the present invention;

FIG. 3.1 is an activity diagram showing the method by which a Vendor submits an electronic copy of its sales invoice for an embodiment of the present invention;

FIG. 3.2 is an activity diagram showing the method by which a Purchaser submits an electronic copy of its self-billed purchase invoice for an embodiment of the present invention;

FIG. 3.3 is an activity diagram showing the method by which a Vendor manually creates and submits a detailed invoice for an embodiment of the present invention;

FIG. 3.4 is an activity diagram showing the method by which a Vendor manually creates and submits an invoice summary for an embodiment of the present invention;

FIG. 3.5 is an activity diagram showing the method by which a Purchaser submits an electronic copy of its remittance advice for an embodiment of the present invention;

FIG. 4 is a use case diagram showing methods used by the Vendor and Purchaser to submit trade documents for an embodiment of the present invention;

FIG. 4.1 is an activity diagram showing the method by which a Purchaser, or a Vendor by way of a purchase order confirmation, submits an electronic copy of its purchase order for an embodiment of the present invention;

FIG. 4.2 is an activity diagram showing the method by which a Vendor submits an electronic copy of its goods delivery note for an embodiment of the present invention;

FIG. 4.3 is an activity diagram showing the method by which a Purchaser submits an electronic copy of its goods received note for an embodiment of the present invention;

FIG. 4.4 is an activity diagram showing the method by which a Vendor submits an electronic copy of its bill of lading for an embodiment of the present invention;

FIG. 4.5 is an activity diagram showing the method by which a payment request is created by matching a purchase order to one or more related goods delivery notes, bills of lading or goods received notes for an embodiment of the present invention;

FIG. 5 is a use case diagram showing the methods used to pay Vendors by means of Ebill for an embodiment of the present invention.

FIG. 5.1 is an activity diagram setting out the method used by the Purchaser to approve invoices for settlement by Ebill for an embodiment of the present invention.

FIG. 5.2A is an activity diagram setting out the method used by the Purchaser to prepare a debit advice for an embodiment of the present invention.

FIG. 5.2B is an activity diagram setting out the method used by the Purchaser to make one or part payments of an invoice for an embodiment of the present invention.

FIG. 5.3 is an activity diagram setting out the method used by the Purchaser to reconcile a debit advice with the related credit note when issued by the Vendor for an embodiment of the present invention.

FIG. 5.4 is an activity diagram setting out the method used by the Vendor to effect sales credit control for an embodiment of the present invention.

FIG. 6 is a use case diagram showing the methods which automate the authorised drawing, accepting, guaranteeing and endorsing of Ebills and which shows the processes foreign exchange transfer of Ebills and for discounting Ebills to cash for an embodiment of the present invention.

FIG. 6.1A is the first part of an activity diagram setting out the method of drawing an Ebill for an embodiment of the present invention.

FIG. 6.1B is the second part of an activity diagram, being a continuation of FIG. 6.1A which sets out the method of drawing an Ebill for an embodiment of the present invention.

FIG. 6.2A is a schematic representation of the example algorithm and method wherein one or more Ebills are drawn and accepted against both the collateral of one or more Ebills endorsed and, as there is an insufficient amount of Ebills receivable to meet the payables required, the excess amount of proposed draft Ebills is covered by guarantee for an embodiment of the present invention.

FIG. 6.2B is a schematic representation of the example algorithm and method where one or more Ebills are drawn and accepted against the endorsement of one or more Ebills receivable where Ebills receivable exceed Ebills payable for an embodiment of the present invention.

FIG. 6.2C is a schematic representation of the example algorithm and method where there are no Ebills receivable to be endorsed and thus all the Ebills payable are to be accepted against the guarantee for an embodiment of the present invention.

FIG. 6.2D is a schematic representation of an example execution journal summarizing and implementing FIG. 6.2A wherein excess payables are covered by a guarantee for an embodiment of the present invention.

FIG. 6.2E is a schematic representation of an example execution journal summarizing and implementing FIG. 6.2B wherein there are excess receivables for an embodiment of the present invention.

FIG. 6.2F is a schematic representation of an example execution journal summarizing and implementing FIG. 6.2C wherein there are no receivables and Ebills payable are covered by guarantee for an embodiment of the present invention.

FIG. 6.3 is an activity diagram setting out the method of reducing the total amount of the requested Ebills to an amount within Ebill acceptance limits in accordance with FIG. 6.1 by deselecting one or more Vendors and/or one or more invoices approved to pay for an embodiment of the present invention.

FIG. 6.4 is an activity diagram setting out the method of discounting Ebills to cash by selecting one or more Ebills to be endorsed and discounted to cash for an embodiment of the present invention.

FIG. 6.5 is an activity diagram setting out the method of discounting Ebills to cash by requesting a cash sum required and endorsing one or more Ebills as consideration for an embodiment of the present invention.

FIG. 6.6 is an activity diagram setting out the method of transferring one or more Ebills denominated in one currency into matching Ebills denominated in another currency for an embodiment of the present invention.

FIG. 7 is a use case diagram showing the methods by which GSN is administered for an embodiment of the present invention.

FIG. 8 is a use case diagram showing the methods by which cash settlement is effected on or about the Due Date of an Ebill for an embodiment of the present invention.

FIG. 8.1A is an activity diagram setting out the methods for collecting cash from an acceptor or guarantor on or about the Due Date of an Ebill for an embodiment of the present invention.

FIG. 8.1B is an activity diagram setting out the methods for paying cash to the holder of an Ebill (whether Vendor or the endorsee) on or about the Due Date of an Ebill for an embodiment of the present invention.

FIG. 9 is a use case diagram showing the methods by which Vendors, Purchaser, Guarantors and the Collector of Taxes process accounts for an embodiment of the present invention.

FIG. 9.1 is an activity diagram setting out the methods whereby Participants and the Administrator process and view accounts for an embodiment of the present invention.

FIG. 9.2 is an activity diagram setting out the methods whereby the Guarantor administers the credit risk limits and fees on the Purchaser's Ebills payable account for an embodiment of the present invention.

FIG. 10 is a use case diagram showing the methods by which the collection and refund of sales taxes are processed in conjunction with Ebills for an embodiment of the present invention.

FIG. 10.1 is an activity diagram setting out the methods for processing sales tax collection and refund in conjunction with Ebills for an embodiment of the present invention.

FIG. 11.1 is a schematic representation of the database format for the Invoice Re.g.ister together with example type keys for invoice type and invoice status for an embodiment of the present invention.

FIG. 11.2 is a schematic representation of the database format for the Invoice Part Payment Re.g.ister together with example type keys for invoice type and invoice status for an embodiment of the present invention.

FIG. 11.3 is a schematic representation of the database format for the Ebill Re.g.ister together with example type keys for Ebill type, Ebill status and Ebill endorsement type for an embodiment of the present invention.

FIG. 12 which is a deployment diagram setting out the physical elements of the Client/Server network to enable deployment of the GSN application software for an embodiment of the present invention.

Referring now to FIG. 1, an overview of the use case relationship between the Global Settlement Network (GSN) and the Participants is shown schematically.

Each Vendor [1-02] has a Vendor membership agreement with GSN [1-00]. Each Purchaser [1-04] has a Purchaser membership agreement with GSN-[1-00]. Any Member organisation is permitted to act in both Vendor and Purchaser modes. Each Vendor [1-02] and Purchaser [1-04] in a trading relationship has entered into a trading terms agreement registered with GSN [1-00] which records the mutually agreed terms upon which they will effect Ebill settlement.

GSN [1-00] has an agreement with an Ebill Trader [1-14] under the terms of which a Vendor [1-02] will endorse to the Ebill Trader [1-14] one or more Ebills it holds as back-to-back collateral for the issue and guarantee of Ebills by the Ebill Trader [1-14].

The Guarantor [1-10] has an agreement with GSN [1-00] under the terms of which it guarantees GSN against the loss and liquidity consequences of an Ebill being dishonored by non-payment by a Purchaser [1-04] as acceptor.

The Risk Manager [1-08] has an agreement with GSN [1-00] under the terms of which it uses the Risk Management System [1-06] to manage and mitigate the risk of Ebill dishonor, by either a Purchaser [1-04] as acceptor or by a Guarantor [1-10].

The Discounter [1-12] has an agreement with GSN [1-00] under the terms of which a Vendor [1-02] endorses Ebills which it holds to the Discounter [1-12] in exchange for discounted cash remitted by the Discounter [1-12] to the Vendor [1-02].

The Collector of Taxes [1-20] has an agreement with GSN [1-00] to manage a scheme for the reporting, summarizing, netting and payment by Ebill of sales taxes such as Value Added Tax. Each Member participating will have an agreement both with GSN and the Collector of Taxes.

The Bank [1-18] has a facility agreement to fund a cash flow gap arising because of a delay in collection of cash from the Purchaser [1-04] or the Guarantor [1-10] on the due date of an Ebill. One or any combination of the roles and functions of the Bank [1-18], the Guarantor [1-10] and the Ebill Trader [1-14] may be carried out by the same entity. An entity may function both as a Vendor and as a Purchaser. GSN [1-00] and the Participants may each be represented on the system by one or more instances.

The FX Trader [1-20] has an agreement with GSN [1-00] to provide foreign exchange services whereby the holder of one or more Ebills denominated in one currency can endorse the Ebill(s) to the trader as back-to-back consideration for the trader's acceptance of one of the same or a different plurality of Ebills denominated in one or more other currencies.

The Administrator [1-24] is responsible for the functions and methods further described in FIG. 7.

There may be one or more instances of all entities described above.

Referring now to FIG. 2A, which is an overview of the use cases applicable to GSN. FIG. 2A is to be read in association with FIG. 2B.

In the submit invoices use case [2-02], the Vendor [1-02] electronically submits a copy of its sales invoice to GSN. In the alternative, the Purchaser [1-04] electronically submits a copy of its self-billed purchase invoice to GSN. These aspects are further explained in FIG. 3. The original invoice will be transmitted as normal between the Vendor and the Purchaser.

In the submit trade documents use case [2-04], either the Vendor [1-02] or the Purchaser [1-04] electronically submit copies of their trade documents which may comprise one or more purchase orders, goods delivery notes, goods received notes or bills of lading. These aspects of the present invention are further explained in FIG. 4.

In the pay vendors use case [2-06], the Purchaser [1-04] is enabled to initiate payment of Vendors [1-02]. This aspect of the present invention is further explained in FIG. 5.

In the issue Ebills use case [2-08], GSN automatically enables the Vendor [1-02] to draw, the Purchaser [1-04] to accept and the Guarantor [1-10] to guarantee an Ebill drawn in full or partial settlement of one or more invoices. These aspects are further explained in FIG. 6.

In the administrate GSN use case [2-10], the Administrator [2-12] administers the GSN system using the administration system. This aspect is further explained in FIG. 7.

Referring now to FIG. 2B, which is a further overview of the use cases applicable to GSN. FIG. 2B is to be read in association with FIG. 2A.

In the cash settlement use case [2-20], on or prior to the Due Date of an Ebill, GSN instructs the Bank System [1-18] to collect the amount of the Ebill from the Purchaser [1-04] on the Due Date. In the event of dishonor by non-payment by the Purchaser [1-04], GSN instructs the Bank System [1-18] to collect the amount from the Guarantor [1-10].

Also within the cash settlement use case [2-20] and on the Due Date of the Ebill, GSN instructs the Bank System [1-18] to remit the amount of the Ebill, less any deductible fees and charges, to the Vendor [1-02] or holder for value if the Ebill has been endorsed by the Vendor. These aspects are further explained in FIG. 8.

In the view accounts use case [2-22], users with the relevant permissions acting for Vendors [1-02], Purchasers [1-04], the Guarantor [1-10] and the Tax Collector [1-20] are enabled to view accounts. This aspect of the present invention is further explained in FIG. 9.

In the process sales taxes use case [2-24], the Tax Collector [1-20] is enabled to process the reporting, summarizing, netting, collection and refunding of sales taxes such as European Union Value Added Tax. This aspect of the present invention is further explained in FIG. 10.

In the administrate GSN use case [2-10], the Administrator [2-12] administers the GSN system using the administration system. This aspect is further explained in FIG. 7.

Referring now to FIG. 3, which is an overview of the use cases applicable to the methods of submitting invoices to GSN.

In the Submit Own Invoice use case [3-02], the Vendor [1-02] electronically submits a copy of its sales invoice to GSN. This process is further explained in FIG. 3.1.

In the Submit Self Billing Invoice use case [3-04], the Purchaser [1-04] electronically submits a copy of its self-billed purchase invoice to GSN. This process is further explained in FIG. 3.2.

In the Enter Detailed Invoice use case [3-06], either the Vendor [1-02] or the Purchaser [1-04] electronically enters a detailed invoice. This process is further explained in FIG. 3.3.

In the Enter Invoice Summary use case [3-08], the Vendor [1-02] electronically enters an invoice summary. This process is further explained in FIG. 3.4.

In the Submit Remittance Advice use case [3-10], the Purchaser [1-04] electronically submits a copy of its remittance advice to GSN. This process is further explained in FIG. 3.5.

By the above means, payment of Vendors [1-02] is effected by Ebill [3-12].

Referring now to FIG. 3.1, which is an activity diagram setting out the method used by a Vendor to submit an electronic copy of its sales invoice.

The Vendor creates the sales invoice on its own back-office system and produces a further electronic copy [3-20]. This may be in any known format such as EDI, XML or WebServices. The copy invoice is transmitted by the Vendor to GSN [3-22] by any known method such as an EDI standard or XML format, or the Vendor's back-office system may be configured to link directly to the web services published by GSN using transport protocols such as HTTPS or Secure FTP. The invoice may be submitted in a file comprising one or more such invoices.

On receipt by GSN of the invoice [3-24], the system checks that the required Vendor/Purchaser trading relationship has been preconfigured [3-26] (this process is further explained in FIG. 7). If the trading relationship has not been set, the invoice is rejected and the Vendor is advised, for example by SMS or email [3-28]. A copy of the rejected invoice is stored for a system set variable number of days (e.g. 7 days) [3-42].

If the invoice is not duplicated, the submitted invoice data is mapped to GSN suitable invoice format [3-30] and filed [3-32]. A copy of the invoice is stored [3-34] for a system set variable number of days (e.g. 30 days) after the invoice has been paid in full by Ebill.

If the invoice is not duplicated, the submitted invoice data is mapped to GSN suitable invoice summary format [3-36], including setting invoice type and filed in the Invoice Re.g.ister [3-38]. A copy of the invoice summary is stored on the Invoice Re.g.ister [3-40] for a system set variable number of days (e.g. 30 days) after the invoice has been paid in full by Ebill.

Referring now to FIG. 3.2, which is an activity diagram setting out the method used by a Purchaser to submit an electronic copy of its self-billed purchase invoice.

The Purchaser creates the self-billed invoice on its own back-office system and produces a further electronic copy [3-50]. This may be in any known format such as EDI, XML or WebServices. The copy invoice is transmitted by the Purchaser to GSN by any known method [3-52] such as an EDI standard or XML format, or the Vendor's back-office system may be configured to link directly to the web services published by GSN using transport protocols such as HTTPS or Secure FTP. The invoice may be submitted in a file comprising one or more such invoices.

On receipt by GSN of the invoice [3-54], the system checks that the required Vendor/Purchaser trading relationship (including permission to self-bill) has been preconfigured [3-56] (this process is further explained in FIG. 7). If the trading relationship has not been set, the invoice is rejected and the Purchaser is advised, for example by SMS or email [3-58]. A copy of the rejected invoice is stored for a system set variable number of days (e.g. 7 days) [3-60].

If the invoice is not duplicated, the submitted invoice data is mapped to GSN suitable invoice format [3-30] and filed [3-32]. A copy of the invoice is stored [3-34] for a system set variable number of days (e.g. 30 days) after the invoice has been paid in full by Ebill.

If the invoice is not duplicated, the submitted invoice data is mapped to GSN suitable invoice summary format [3-36] including setting invoice type and filed in the Invoice Re.g..ister [3-38]. A copy of the invoice summary is stored on the Invoice Re.g.ister [3-40] for a system set variable number of days (e.g. 30 days) after the invoice has been paid in full by Ebill.

Referring now to FIG. 3.3, which is an activity diagram setting out the method used by the Vendor to create and submit a detailed invoice to GSN.

The user selects a Purchaser from a previously configured list of Purchasers (i.e. customers of the Vendor) [3-70] (this process is further explained in FIG. 7), The user enters the invoice details [3-72] which it submits to GSN [3-74]. On receipt of the detailed invoice [3-78], GSN checks if it is a duplicate [3-80]. If it is not duplicated, the invoice is filed [3-84] and a copy of the invoice is stored for a system set variable number of days (e.g. 7 days) [3-86].

If the invoice is not duplicated, the submitted invoice data is mapped to GSN suitable invoice summary format [3-36] including setting invoice type and filed in the Invoice Register [3-38]. A copy of the invoice summary is stored on the Invoice Register [3-40] for a system set variable number of days (e.g. 30 days) after the invoice has been paid in full by Ebill.

If it is duplicated, GSN advises the user that it is duplicated [3-88]. The user decides [3-89] to either amend the identified duplicated fields [3-82] or confirms that the invoice is to be deleted [3-83]. If the invoice is amended, it is rechecked for duplication and, if not duplicated, it is filed. A copy of the invoice is stored [3-84] for a system set variable number of days (e.g. 30 days) after the invoice has been paid in full by Ebill. If the duplicate invoice is deleted, it is stored [3-85] for a system set variable number of days (e.g. 30 days).

Referring now to FIG. 3.4, which is an activity diagram setting out the method used by the Vendor to create and submit an invoice summary to GSN.

The user selects a Purchaser from a previously configured list of Purchasers (i.e. customers of the Vendor) [3-90] (this process is further explained in FIG. 7). The user enters the invoice summary [3-92] which it submits to GSN [3-94]. On receipt of the invoice summary [3-98], GSN checks if it is a duplicate [3-100]. If it is not duplicated, the invoice is mapped to GSN suitable invoice summary format [3-36] including setting invoice type and filed in the Invoice Register [3-38]. A copy of the invoice summary is stored on the Invoice Register [3-40] for a system set variable number of days (e.g. 30 days) after the invoice has been paid in full by Ebill.

If the invoice summary is duplicated, the user is advised that it is duplicated [3-108]. The user decides [3-110] to either amend the identified duplicated fields [[3-102] or confirms that the invoice summary is to be deleted [3-112]. If the invoice is amended, it is rechecked for duplication and, if not duplicated, it is filed. A copy of the invoice is stored [3-40] for a system set variable number of days (e.g. 30 days) after the invoice has been paid in full by Ebill. If it is deleted, it is stored [3-114] for a system set variable number of days (e.g. 30 days).

Referring now to FIG. 3.5, which is an activity diagram setting out how a Vendor submits a remittance advice.

The Purchaser [1-04] creates a remittance advice [3-120]. The method is initiated by first setting up the equivalent of a nominal ledger bank account named, for example, as "Ebills Payable Account" and designated with a unique bank identifier such as "99-99-99". The Vendor trading terms for time of payment are set to conform to the contracted Ebill acceptance number of days after invoice date. The Vendor's account is preferably configured for settlement using the Ebills Payable Account, if this option is available on the Vendor's back-office system. Having created the remittance advice [3-122], the Purchaser [1-04] transmits the remittance advice to GSN [3-124].

When the remittance advice is received by GSN [3-126] a check is made to verify that the remittance advice method has been agreed between the Vendor and the Purchaser [3-128]. If the remittance advice method has not been configured, the remittance is rejected [3-140] and stored [3-141] for a system set variable number of days (e.g. 30 days). A message is created that it has been rejected [3-142] and the Purchaser is informed, for example by SMS or email [3-144].

Also when the remittance advice is received by GSN [3-126] a check is made to verify that the trading relationship between the Vendor and the Purchaser has been configured [3-130]. If the trading relationship has not been configured, the remittance is rejected [3-140] and stored [3-141] for a system set variable number of days (e.g. 30 days). A message is created that it has been rejected [3-142] and the Purchaser is informed, for example by SMS or email [3-144].

If the remittance advice is not rejected, it is mapped to the GSN suitable remittance advice format [3-132] from which a pseudo invoice summary in the suitable GSN format is created, including setting invoice type, for each remittance [3-134] and filed in the Invoice Register [3-138].

Referring now to FIG. 4, which is an overview of the use cases applicable to the methods of submitting trade documents to GSN.

In the Submit Purchase Order use case [4-02], the Purchaser [1-04] electronically submits a copy of its purchase order. It also enables a Vendor to submit a copy of a purchase order confirmation. This process is further explained in FIG. 4.1.

In the Submit Goods Delivery Note use case [4-04], the Vendor [1-02] electronically submits a copy of its goods delivery note. This process is further explained in FIG. 4.2.

In the Submit Goods Received Note use case [4-06], the Purchaser [1-04] electronically submits a copy of its goods received note. This process is further explained in FIG. 4.3.

In the Submit Bill of Lading use case [4-08], the Vendor [1-02] electronically submits a copy of its bill of lading. This process is further explained in FIG. 4.4.

In the Process Purchase Order use case [4-10], GSN processes the submitted trade documents against the related purchase order.

Referring now to FIG. 4.1, which is an activity diagram setting out the method used by the Purchaser (or a Vendor by way of a purchase order confirmation) to submit a purchase order to GSN.

The Purchaser or the Vendor, as may be, creates one or more copy purchase orders on its own back-office system [4-20] and produces a record of one or more purchase orders [4-22]. This may be in any known format such as EDI, XML or WebServices or the Vendor's back-office system may be configured to link directly to the web services published by GSN using transport protocols such as HTTPS or Secure FTP. The purchase order is transmitted to GSN by any known method [4-24].

On receipt by GSN of the purchase order [4-26], the system checks that the submission of the purchase order is permitted [4-30]. If it is permitted, then GSN checks to confirm that the required Vendor/Purchaser trading relationship has been preconfigured for each purchase order [4-28]. This aspect of the process is further explained in FIG. 7).

If the trading pair has been set, the purchase order is mapped to the suitable GSN format [4-32] and a copy is filed [4-34] for a system set variable time of days (e.g. 30 days) after the purchase order has been delivered in full [4-36].

If either the purchase order is not permitted and/or the trading relationship has not been set, the purchase order is rejected [4-38] and the Purchaser or the Vendor, as the case may, is advised, for example by SMS or email [4-40]. A copy of the rejected purchase order is stored after rejection for a system set variable number of days (e.g. 7 days) [4-42].

Referring now to FIG. 4.2, which is an activity diagram setting out the method used by the Vendor to submit a goods delivery note to GSN.

The Vendor creates one or more copy goods delivery notes on its own back-office system [4-50] and produces a record of one or more goods delivery notes [4-52]. This may be in any known format such as EDI, XML or WebServices or the Vendor's back-office system may be configured to link directly to the web services published by GSN using transport protocols such as HTTPS or Secure FTP. The goods delivery is transmitted by the Vendor to GSN [4-54] by any known method.

On receipt by GSN of the goods delivery note [4-56], the system checks that the submission of the goods delivery note is permitted [4-58]. If it is permitted, then GSN checks to confirm that the required Vendor/Purchaser trading relationship has been preconfigured for each goods delivery note [4-60]. This process is further explained in FIG. 7.

If the trading pair has been set, the goods delivery note is mapped to the suitable GSN format [4-62] and a copy is filed [4-70] for a system set number of days (e.g. 30 days) after the invoice related to the goods delivery note has been paid by Ebill [4-72]. This aspect is further explained in FIG. 4.5.

If either the goods delivery note is not permitted and/or the trading relationship has not been set, the goods delivery note is rejected and the Vendor is advised [4-64], for example by SMS or email [4-66]. A copy of the rejected goods delivery note is stored for a system set number of days (e.g. 7 days) after rejection [4-68].

Referring now to FIG. 4.3, which is an activity diagram setting out the method used by the Purchaser to submit a goods received note to GSN.

The Purchaser creates one or more copy goods received notes on its own back-office system [4-80] and produces a record comprising one or more goods received notes [4-82]. This may be in any known format such as EDI, XML or WebServices. The goods received note is transmitted by the Purchaser to GSN [4-84] by any known method such as EDI, XML or WebServices or the Vendor's back-office system may be configured to link directly to the web services published by GSN using transport protocols such as HTTPS or Secure FTP.

On receipt by GSN of the goods received note [4-86], the system checks that the submission of the goods received note is permitted [4-88]. If it is permitted, then GSN checks to confirm that the required Vendor/Purchaser trading relationship has been preconfigured for each goods received note [4-90]. This process is further explained in FIG. 7.

If the trading pair has been set, the goods received note is mapped to the suitable GSN format [4-92] and a copy is filed [4-100] for a system set variable number of days (e.g. 30 days) after the related invoice related to the goods delivery received has been paid by Ebill [4-102]. This aspect is further explained in FIG. 4.5.

If either the goods received note is not permitted and/or the trading relationship has not been set, the goods received note is rejected [4-94] and the Purchaser is advised, for example by SMS or email [4-96]. A copy of the rejected goods received note is stored for a system set number of days after rejection (e.g., 7 days) [4-98].

Referring now to FIG. 4.4, which is an activity diagram setting out the method used by the Vendor to submit a bill of lading to GSN.

The Vendor creates one or more copy bills of lading on its own back-office system [4-110] and produces a record comprising one or more bills of lading [4-112]. This may be in any known format such as EDI, XML or WebServices. The bills of lading is transmitted by the Vendor to GSN [4-114] by any known method such as EDI, XML or WebServices or the Vendor's back-office system may be configured to link directly to the web services published by GSN using transport protocols such as HTTPS or Secure FTP.

On receipt by GSN of the bills of lading [4-116], the system checks that the submission of the bill of lading is permitted [4-118]. If it is permitted, then GSN checks to confirm that that the required Vendor/Purchaser trading relationship has been preconfigured for each bill of lading [4-120]. This process is further explained in FIG. 7).

If the trading pair has been set, the bill of lading is mapped to the suitable GSN format [4-122] and a copy is filed [4-124] for a system set variable number of days (e.g. 30 days) after the invoice related to the bill of lading has been paid by Ebill [4-126]. This aspect is further explained in FIG. 4.5.

If either the bill of lading is not permitted and/or the trading relationship has not been set, the bill of lading is rejected [4-128] and the Vendor is advised, for example by SMS or email [4-130]. A copy of the rejected bill of lading is stored for a system set number of days after rejection (e.g. 7 days) [4-132].

Referring now to FIG. 4.5, which is an activity diagram setting out the method of creating a payment request by matching a purchase order to one or more related goods delivery notes, bills of lading or goods received notes.

The systems periodically polls for new delivery documents [4-150], matching a goods received note [4-152], a goods delivery note [4-154] or a bill of lading [4-156] with the related purchase order [4-158].

If a related purchase order is found and there is no mismatch on the delivered items [4-160], the delivered items are matched to the purchase order items [4-140] and the delivered items are evaluated, taking account of associated sales taxes [4-166]. A payment request is created in the format of a suitable GSN invoice [4-168] as a pro-form a invoice. On creation of the payment request, it is mapped to the suitable GSN invoice summary format [4-170] and a posting slip created [4-174] for notification to both the Vendor and the Purchaser [4-176]. The invoice summary is registered in the Invoice Register [4-172]. The process then follows FIG. 5.

If there is a mismatch between the line items on the purchase order and the related delivery document, the Vendor or the Purchaser, as appropriate, is informed of the mismatch [4-162] and is provided with the detail of the mismatched documents [4-164].

If no matching purchase order can be found, then the Vendor or Purchaser (as appropriate) is informed [4-162] of the mismatched documents [4-178] and the documents are rejected, the advice being given, for example, by SMS or email [4-164]. A copy of the rejected delivery document is stored for a system set number of days after rejection (e.g. 7 days).

Referring now to FIG. 5, which is an overview of the use cases applicable to the method of paying Vendors by means of Ebills.

In the Approve Invoices use case [5-00] invoices which have been entered into the Invoice Register are approved for payment. This aspect of the present invention is further explained in FIG. 5.1.

In the Issue Ebills use case [5-02] the method for automatic drawing, acceptance and guaranteeing of Ebills is set out. This aspect of the present invention is further explained in FIG. 6.

In the Prepare Debit Advice use case [5-04] the Purchaser [1-04] creates an evaluated debit advice to the Vendor [1-02] setting out and quantifying the specific aspects of the Vendor's [1-02] invoice for which it requests a Vendor [1-02] credit note. This aspect of the present invention is further explained in FIG. 5.2.

In the Reconcile Debit Advice use case [5-06] the Purchaser [1-04] is enabled to compare and reconcile a previously created debit advice with the subsequent related Vendor [1-02] credit note. This aspect of the present invention is further explained in FIG. 5.3.

In the Sales Credit Control use case [5-08], the Vendor [1-02] utilises the sales credit control method to monitor the status of Ebill settlement by Purchasers [1-04]. This aspect of the present invention is further explained in FIG. 5.4.

In the Submit Invoice use case [5-10] the method by which Vendors [1-02] and Purchasers [1-04] submit invoices is set out. This aspect of the present invention is further explained in FIG. 3.

In the Cash Settlement use case [5-12] the method whereby cash is collected and paid out by GSN on the Ebill Due Date is set out. This aspect of the present invention is further explained in FIG. 8.

Referring now to FIG. 5.1, which is an activity diagram setting out the method used by the Purchaser to approve invoices for settlement by Ebill.

The Purchaser requests GSN to display open invoice summaries [5-20] held on the Invoice Register per selected Vendor/Purchaser pairing [5-22]. The selected invoices are selected [5-24] and displayed to the Purchaser [5-26]. The Purchaser views the open items [5-28] and selects an invoice to view (which expression includes credit note) [5.30]. If messages exist, the Purchaser requests to view messages [5.32] which are displayed [5.34] and viewed by the Purchaser [5-36]. The Purchaser may select to add a message to the message trail [5-38] in which case the message thread is updated [5-40] and the process is completed.

If, having viewed the invoice (or credit note), the Purchaser determines that there is no message or if it decides to ignore the message or having viewed the message it decides not to create any further message or it adds a message which permits it to move towards payment approval, then the Purchaser decides whether it intends to pay the whole invoice or a part thereof.

If the Purchaser decides to pay the whole invoice, as will normally be the case, it sets the pay status [5-42] from the proffered options: 'Approved' (Ebill approved for acceptance to be drawn on pre-agreed date for settlement), 'Pay Now' (agreement confirmed for the drawing and acceptance of an Ebill in settlement at time of instruction to pay, whether or not already at pre-agreed date for settlement); and 'Hold' (do not pay unless instruction to hold is deleted).

On the payment status being set [5-44], a check is made as to whether the date on which the invoiced is approved for payment is later than the pre-agreed approval date determined from the trading terms recorded for the related Vendor and Purchaser [5.46]. This aspect of the present invention is further explained in FIG. 7.

If the date of the approval is overdue (i.e. later than the agreed approval date) then a check is made to determine whether the related Vendor and Purchaser have agreed to apply a system rule to reset the invoice Due Date [5-50]. If they have so agreed, the Due Date is recalculated and reset [5-51]. An example of such a rule is that the invoice Due Date is reduced by 2 days for every day of delay by the Purchaser in approving the invoice. This in turn accelerates the Due Date of the Ebill to be drawn in settlement of the invoice. The minimum reset period between invoice approval date and the consequent date of the related Ebill under this example rule is set at 2 days.

If there is no provision for the invoice Due Date to be reset, the invoice Due Date, which is set by taking account of the pre-agreed trading terms of the related Vendor/Purchaser pairing, is not reset [5-48]. This aspect of the present invention is further explained in FIG. 7.

The amount authorised to be paid [5-52] is the remaining balance which is the total of the invoice less the amount (if any) paid prior to the process date and the Invoice Register is updated [5-53].

If the Purchaser decides to make a part payment against the selected invoice [5-54], it will select to use the Debit Advice method which is described in FIG. 5.2A.

Once the Purchaser has either approved the invoice for payment or not, or has decided upon a part payment, it will then move to the next invoice [5-56]. If there is another invoice, it will recommence the process from the selection of the invoice [5-30]. If there are no further invoices from that particular Vendor, then the Purchaser will select another Vendor [5-58]. If there is a further Vendor, it will recommence the process from the selection of the Vendor [5-22]. If there are no further Vendors to be selected, then the invoice approval review is completed [5-60].

Referring now to FIG. 5.2A, which is an activity diagram setting out the method used by the Purchaser to prepare a debit advice.

The Purchaser has already selected the create debit advice process and a disputed invoice [5.80]. A copy of the detailed invoice is delivered [5.82] which is viewed by the Purchaser [5-84] who decides either to do nothing, in which case the action is aborted [5-116] or, if deciding to take action, either elects to pay part of the invoice [5-86], in which case it uses GSN's Make Part Payment method described in FIG. 5.2B [5-88], which returns to this method on completion [5-89]. Alternatively, the Purchaser selects the disputed line item [5-90]. The Purchaser then selects a dispute code [5-92] (e.g. re quantity; unit price; extension; sales tax rate; addition; wrong product; product not delivered; damaged; defective) and enters a revised value [5-94]. If another item or a further dispute code is selected, the method returns to the select dispute line item mode [5-90].

If no further line item is selected, the Purchaser views the debit advice [5-96] and the debit advice is either issued [5-98], or it is not confirmed, in which case the part payment process is aborted [5-116]. GSN notifies the issue of the debit advice [5-100] to the Vendor [5-106]. The Vendor, on its own back-office system, if agreed, raises a sales credit note [5-108] which may or may not conform to the debit advice raised by the Purchaser. The sales credit note, if any, is submitted by the Vendor [5-110] and processed as a submitted credit note [5-112] as further explained in FIG. 3.1.

GSN calculates the authorised amount to pay against the selected invoice. The amount to be paid is the invoice total less the total of the Debit Advice [5-102].

The Invoice Register is then updated with the amount to pay against the selected invoice [5-104]. The Debit Advice is recorded in the Invoice Register [5-112].

Referring now to FIG. 5.2B, which is an activity diagram setting out the method used by the Purchaser to make a part payment against an invoice.

The Purchaser decides to make a part payment [5-86] against a selected invoice [5-80].

GSN examines the current invoice payment status [5-120] to determine both the total invoice value, shown as value "T" [5-122] and the total amount, if any, of payments made against the selected invoice, shown as value "P" [5-24].

GSN calculates the balance due, value "B", [5-126] shown as:

$$B=(T-P)$$

An invoice payment status report is prepared [5-128], along with a part payment form [5-130] and these are made available for the Purchaser to view [5-132]. The Purchaser will decide either to pay nothing, in which case the process is terminated and the Purchaser reverts to approving the next invoice, as at FIG. 5.1.

If the Purchaser decides to make a part payment, it enters the amount that it wishes to pay, shown as value "A" [5-134] and the system evaluates whether the selected amount is <=B [5-136]. If the amount entered exceeds B, then the Purchaser is again requested to enter a part payment value to ensure conformity to the system.

If the amount selected is <=B, then the Invoice Register is provided with the information of the amount to be paid [5-138], and the Invoice Register is updated with the amount approved to pay [5-140].

Referring now to FIG. 5.3, which is an activity diagram setting out the method used by the Purchaser to reconcile a debit advice with the related credit note when issued by the Vendor.

The Purchaser selects a credit note [5-206] and a related debit advice [5-208] and is provided with a GUI setting out the comparison of the two selected documents [5-210]. The Purchaser reviews the documents and, if there are no differences, the Purchaser approves the credit note for settlement [5-212] and the debit advice is filed as approved both by the Purchaser [5-214] and GSN [5-216]. If there are differences between the documents then, if such differences can be agreed, the credit note is issued [5-212] as above, and archived for a system set variable number of days (e.g. 30 days) from the date of the approval of the related credit note. If the differences cannot be reconciled, then the credit note is rejected [5-220], a rejection message created [5-222] and notified to the Vendor by, for example, SMS or email [5-224].

The Vendor is also able to review a debit advice [5-200]. If it is approved, a credit note is raised [5-202] and submitted, as described in FIG. 3.1. If it is not approved, the process terminates.

Referring now to FIG. 5.4, which is an activity diagram setting out the method used by the Vendor to effect sales credit control.

The Vendor, from time to time, sets its sales credit control rules for each related Purchaser [5-130] such as generating an automated message in accordance with this method when, for example an invoice exceeding a set amount is overdue for settlement, a debit advice over a set amount has been created by a related Purchaser or the total overdue for settlement by the Purchaser exceeds a set amount.

The rules are stored [1-132] and the Vendor's open invoices are polled from time to time, applying the rules [1-134].

Where there is a reportable condition, a message is created [1-136] which is sent, for example, by SMS or Email to the Vendor [5-138]. Where the message is invoice related, it is also added to the Message thread.

Depending on permissions, the message is read by either the Vendor [5-140] or the Purchaser [5-142].

The Vendor reviews messages alerting exceptions to the pre-set limits [5-144]. If there is also a message from the Purchaser can take either no further action or read the message [5-146]. The relevant accounts receivable ledger is requested [5-148], the account view is prepared [5-150] and viewed by the Vendor [1-152].

The Vendor can either take no further action or create a message to the Purchaser [5-154] which is sent [5-156] as either the beginning or a continuation of an existing Message Thread which is stored [5-158] and subsequently read by the Purchaser [5-160].

The method continues if there are further messages to review [5-162] Referring now to FIG. 5.5, which is an activity diagram setting out the method of recording one or more payment approvals against an individual invoice.

[To be completed].

Referring now to FIG. 6, which is a use case diagram showing the methods which automate the authorised drawing, accepting, guaranteeing and endorsing of Ebills and which shows the process for discounting Ebills to cash.

In the draw Ebills and execute ledger postings use case [6-00], the GSN system automatically draws, accepts, guarantees and endorses one or more Ebills in settlement for one or more invoices and credit notes. It also updates the related ledgers. This aspect of the present invention is further explained in FIGS. 6.1A and 6.1B.

In the reduce draft Ebills use case [6-02], the Purchaser [1-04] uses the method to deselect one or more draft Ebills in order to bring the overall total of such Ebills within pre-authorised limits. This aspect of the present invention is further explained in FIG. 6.2.

In the reduce invoices approved to pay use case [6-04], the Purchaser [1-04] uses the method to deselect one or more invoices which have been previously approved to pay in order to bring the overall total of proposed Ebills within pre-authorised limits. This aspect of the present invention is further explained in FIG. 6.3.

In the discount Ebills use case [6-06], the Purchaser [1-04] instructs the discounting of all or part of one or more Ebills which it holds to cash, either to the same currency in which the Ebill is denominated or into a foreign exchange currency. This aspect of the present invention is further described in FIG. 6.4.

In the foreign exchange transfer use case [6-08], either the Vendor [1-02] or the Purchaser [1-04] use the method to endorse one or more Ebills receivable to the FX Trader [1-22] as back-to-back consideration of the drawing and acceptance of one or more Ebills denominated in any traded currency. This aspect of the present invention is further described in FIG. 6.5.

Referring now to FIG. 6.1A which is the first part of an activity diagram setting out the method of drawing an Ebill and should be read in conjunction with FIG. 6.1B.

On a periodic basis, GSN polls the Invoice Register [6-10] to identify Vendor balances due for settlement [6-12]. If no payment is due to a Vendor, GSN continues to the next Purchaser. If a payment is due to a Vendor, a check is made on the status of the Purchaser's Ebill accounts. If either its Ebills payable account or the Ebills receivable account is not 'Open' then the payment process is stopped for that Purchaser [6-14] and the Purchaser is informed, for example by SMS or email [6-16].

If there are invoices to pay and the accounts are 'Open', the Purchaser's available guarantee balance is obtained wherein:
L=maximum credit risk exposure limit set by the Guarantor on that Purchaser's Ebill Payable account [6-15]
U=Total amount of guarantees outstanding on the Ebills drawn by the Purchaser on the designated Ebills Payable account (including Ebills under presentment) [6-16]
Y=Available guarantee balance as set by the Guarantor [6-18]
Expression:

$Y=L-U$

The invoices due for payment by Ebill are selected [6-20] and a proposed Ebill is drafted per Vendor for the total amount of one or more invoices (less credit notes) due to the Vendor [6-22]. The draft Ebill amounts are expressed as negative values. The total of the draft proposed Ebills is obtained as value "A" (negative) [6-24]. This aspect is further explained in FIGS. 6.2 A to C.

The Ebills receivable recorded on the Ebills Register as being held by the Purchaser are selected [6-28]. The total amount of the Ebills receivable is calculated as value "X" (positive) [6-30].

The selected Ebills receivable (expressed as positive values) and the proposed draft Ebills (expressed as negative values are merged in ascending Due Date order [6-32]. A check is then made to determine whether the Purchaser has mandated to force the acceptance of the proposed draft Ebills payable only against the guarantee. If the acceptance is forced, the selected Ebills receivable are excluded from the computation [6-34] and the execution journal is prepared [6-36] accordingly. Otherwise, the execution journal is prepared including both Ebills receivable and the proposed draft Ebills payable [6-36]. This aspect is further explained in FIGS. 6.2 A to B.

Such number and amount of Ebills receivable (if any) are marked which are equal to or exceed by part of one Ebill receivable the amount "A" or, if less than "A" in total, all the Ebills receivable are so marked [6-38]. The draft Ebills payable in the proposed execution journal are updated to show the extent that their individual amounts are offset by proposed endorsed Ebills receivable. This aspect is further explained in FIGS. 6.2 A to B.

Reference should be made to FIGS. 6.2 A to C for further clarification of this example method.

The Draw Ebills method continues to FIG. 6.1B.

Referring now to FIG. 6.1B is the second part of an activity diagram setting out the method of drawing an Ebill and should be read in conjunction with FIG. 6.1A.

A check is made to determine whether the expression "X"+"A" is positive or negative [6-39].

If "X"+"A" is positive, all Ebills receivable in excess of the required number and total amount to equal or exceed by part of one Ebill receivable, are excluded from the draft execution journal [6-40]. A draft balancing Ebill is requested equal in amount to the excess of the last Ebill receivable included in the draft execution journal [6-42]. This aspect is further explained in FIG. 6.2B.

If "X"+"A" is negative, then the amount of guarantee required to cover all or part of the amount of a proposed draft Ebill in excess of any prospective endorsed Ebill is calculated [6-44]. The guarantee fee per Ebill is then calculated [6-48]. These aspects are further explained in FIGS. 6.2A and 6.2C.

If "X"+"A" is negative, then GSN calculates the amount of guarantee required to meet the total of the excess proposed Ebill [6-44A], and the total of the guarantee fees payable in respect of such guaranteed amounts on the Ebills payable in the draft execution journal is then obtained [6-48] and an Ebill payable to be accepted by the Purchaser on execution is drafted [6-45]. The total guarantee fees are expressed as value "C" (negative). These aspects are further explained in FIGS. 6.2A and 6.2C.

Also, if "X"+"A" is negative, then the Due Date interest adjustment is calculated taking account of the calculated running balances of the draft execution journal [6-50]. This value is expressed as "D" (negative, if payable). This aspect is further explained in FIG. 6.2A.

Whether the balance is + or −, GSN transaction fees to be charged to the Purchaser and the Vendor are then set up from the GSN table of transaction charges applicable to the individual Purchaser and Vendor. Such transaction fees are then calculated and expressed as value "B" (negative) and an Ebill payable is drafted for acceptance by the Purchaser [6-46]. This aspect is further explained in FIG. 6.2A.

The draft execution journal is then finalised and checked to determine whether the Purchaser has sufficient available capacity whether by guarantee or endorsement to execute acceptance of the proposed draft Ebills [6-52]. The check is made using the following formula:
A=total of draft Ebills payable
B=total of draft transaction fees
C=total of draft guarantee fees
D=total of draft Ebill Due Date adjustment
X=total Ebills receivable
Y=available guarantee balance
Expression:

$$\text{Reject execution journal If}((A+B+C+D)\times -1) > (X+Y)$$
$$\text{Accept execution journal If}((A+B+C+D)\times -1) <= (X+Y)$$

If the execution journal is rejected, the method for reducing Ebills payable is used [6-54]. This aspect is further explained in FIG. 6.3. The draft Ebills in the proposed execution journal are not drawn [6-56].

If the execution journal is accepted, the journal is checked to verify check sum=Zero. This aspect is further explained in FIG. 6.2 A to C.

If the check sum is not Zero, then a system execution error is reported [6-60].

If the check sum is Zero, the draft Ebills are drawn, accepted, guaranteed (where relevant) and issued [6-58]. The Ebills so drawn include an Ebill for each of the total guarantee fees, total Ebill issue fees and the net Due Date allowance as further explained in FIG. 6.2A. The Ebills issued are recorded on the Ebills Register [6-70].

If the check sum is Zero, any Ebills proposed for endorsement are endorsed to the Ebill Trader [6-62]. The Ebills Register is updated with the endorsement [6-64] and the execution batch is filed [6-66], in the executed batch table [6-68].

If the check sum is zero, ledger journals are prepared [6-72] and transmitted [6-76] to the respective Vendor and Purchaser [6-78].

On completion of batch execution, the GSN ledgers and registers are updated, in particular, the Invoice Register is updated with the amount paid and where a part payment has been made, the Part Payment Register is likewise updated [6-80]. The completion of the updates is verified [6-82].

Referring now to FIG. 6.2A, which is a schematic representation of the example algorithm and method wherein one or more Ebills are drawn and accepted against both the collateral of one or more Ebills endorsed and, as there is an insufficient amount of Ebills receivable to meet the payables required, the excess amount of proposed draft Ebills is covered by guarantee.

The fields and functions are described below:

(1A) Current Date—date of computation;

(1D) Guarantee Fee Rate—current rate charged by the Guarantor and applied on the acceptance of an Ebill drawn against a guarantee. It is expressed as an annual percentage fee calculated on the guarantee amount;

(2D) Guarantee Limit—maximum guarantee risk exposure set from time to time by the Guarantor;

(3D) Guarantee Available—current difference between the Guarantee Limit and the total guaranteed amount outstanding on all Ebills recorded in the Ebill Register as being guaranteed by the same Guarantor;

(1H) Credit Balance Rate—rate applied to calculate the Due Date Allowance if the Running Balance is less than zero;

(2H) Debit Balance Rate—rate applied to calculate the Due Date Allowance if the Running Balance is more than zero;

(4A) Due Date—Due date as held in the Ebill Register;

(4C) Ebill Amount Payable—amount of requested Ebill expressed as a negative value;

(4D) Ebill Amount Receivable—amount of Ebill held by the Member (received in its role as Vendor) to be endorsed to the Ebill Trader on a back-to-back basis, in its role as a Purchaser, against the proposed draft Ebills. Ebills receivable are selected on the basis of earliest Due Date first;

(4E) Ebill Endorsed—indicator as to whether Ebill is to be endorsed;

(4F) Guaranteed Amount—amount of requested Ebill to be covered by Guarantee determined by off-setting endorsed Ebill receivable;

(4G) Guarantee Fee—amount of guarantee fee as set from time to time by the Guarantor per requested Ebill where:
a=amount guaranteed
r=guarantee fee rate
t=term
b=number of base days per year as determined by currency rules
Expression $$a*r*t/b$$

(4H) Ebill Acceptance Fee—fee charged per Ebill accepted as set from time to time by GSN;

(4J) Running Balance—running balance where:
b1=previous balance
bp=amount of requested Ebill payable
br=amount of Ebill receivable
g=amount of guarantee
b2=new running balance
Expression $$b2=b1+bp+br+g$$

(4K) Due Date Allowance—amount of credit balance charge or debit balance credit where:
b1=previous balance (zero if first iteration)
d1=Due Date of next previous Ebill or Current Date if none
d2=Due Date of this Ebill receivable or requested Ebill payable
Charge %=credit balance rate
Credit %=debit balance rate
b=number of base days per year as determined by currency rules
A=amount of due date allowance (ne.g.ative if chargeable, positive if to be credited)
Expression $$A=\text{if } b1<0 \text{ then } b1*\text{Charge \%}*(d2-d1)/b \text{ ELSE } b1*\text{Credit \%}*(d2-d1)/b$$

(4L) Ebill Drawing Fee—fee to be collected from the Vendor as drawer for drawing the Ebill. Recorded by way of note only. This aspect of the present invention is further explained in FIG. 7.

(Rows 6, 8, 10 and 12)—are examples of draft proposed Ebills payable which are requested by the Purchaser at the current date of the transaction. As explained under FIG. 6.1A, these are expressed as negative values.

(Rows 7, 9 and 11)—are examples of Ebills receivable held the Purchaser (received in its role as a Vendor) as recorded on the Ebill Register at the current date of the transaction. As explained under FIG. 6.1A, these are expressed as positive values.

Such number of whole Ebills receivable are selected in ascending date order, as may be available, amounting in total to less than, equal to or exceeding the total of the requested Ebills payable. The requested Ebills payable and the selected Ebills receivable are merged in ascending date order and the running balance calculated as set out under (4J) above. In this example (FIG. 6.2A), the Ebills payable exceed the Ebills receivable by [$] 30,000 calculated [C12] plus [J11] (being the last positive running balance), the resulting amount to be covered by guarantee shown at [F12].

The total guarantee fees of [$] 54.95 [G15] is paid by the algorithm automatically drawing an Ebill which is accepted by the Purchaser as shown [Row 15].

The total Ebill acceptance fees of [$] 2.00 [H16] is paid by the algorithm automatically drawing an Ebill which is accepted by the Purchaser as shown [Row 16].

Where the total due date allowance is a credit to the Purchaser (as in this example) the credit amount [$] 20.27 [K17] is paid by the algorithm automatically drawing an Ebill which is accepted by GSN, drawn by and payable to the Purchaser as shown [Row 17].

Where the total due date allowance is a charge to the Purchaser, the charge amount is paid by the algorithm automatically drawing an Ebill which is accepted by the Purchaser, drawn by and payable to GSN.

The algorithm calculates the total drawing fee to be charged to the Vendor as drawer [L18]. The method by which this fee is paid is further explained in FIG. 7[.*****]

The example values for the algorithm, which is applied is further explained in FIG. 6.1B, are:

Total Ebills payable="A"=−139,000.00
Total Ebill issue fees="B"=−2.00
Total guarantee fees="C"=−54.95
Due date adjustment="D"=+20.27
Total Ebills receivable="X"=+109,000.00
Guarantee available="Y"=+723,000.00

An example of the check zero journal applicable to FIG. 6.2A is further explained in FIG. 6.2D.

Referring now to FIG. 6.2B, which is a schematic representation of the example algorithm and method where one or more Ebills are drawn and accepted against the endorsement of one or more Ebills receivable where Ebills receivable exceed Ebills payable.

This figure differs from FIG. 6.2A in that no guarantee is required.

Where the amount of the ultimate endorsed Ebill exceeds the required endorsed amount needed to be applied against the last proposed draft Ebill payable, the excess amount is adjusted by GSN drawing a balancing Ebill accepted by the Ebill Trader. The example of such an Ebill is shown on [Row 15] in the amount [$] 6,000 [D15]. The required amount is equal to the final running balance [J12].

An example of the check zero journal applicable to FIG. 6.2B is further explained in FIG. 6.2E.

Referring now to FIG. 6.2C, which is a schematic representation of the example algorithm and method where there are no Ebills receivable to be endorsed and thus all the Ebills payable are to be accepted against the guarantee. This condition also applies where the Purchaser has forced the acceptance of the proposed draft Ebills against the guarantee, thus excluding any Ebills receivable.

An example of the check zero journal applicable to FIG. 6.2C is further explained in FIG. 6.2F.

FIG. 6.2D is a schematic representation of an example execution journal summarizing and implementing FIG. 6.2A.

FIG. 6.2E is a schematic representation of an example execution journal summarizing and implementing FIG. 6.2B.

FIG. 6.2F is a schematic representation of an example execution journal summarizing and implementing FIG. 6.2C.

Referring now to FIG. 6.3, which is an activity diagram setting out the method of reducing the total amount of the requested Ebills to an amount within Ebill acceptance limits in accordance with FIG. 6.1 by deselecting one or more Vendors and/or one or more invoices approved to pay for an embodiment of the present invention.

The total proposed draft Ebills has exceeded the acceptance free capacity available and the execution journal has been rejected in accordance with FIG. 6.1B [6-52]. In consequence the draft Ebills have not been drawn [6-100]. The Purchaser is advised that the Ebills have not been drawn [6-102] and requests a list of the refused Ebills [6-104].

The Purchaser is provided with both a list of refused Ebills and a list of invoices consequentially refused for payment [6-106] which the Purchaser reviews [6-108].

The Purchaser can select to review Ebills by Vendor [6-110]. If the Purchaser deselects one or more Ebills [6-112], the related invoices are marked as withdrawn [6-113].

The Purchaser can otherwise select to review invoices by Vendor [6-16]. If the Purchaser deselects one or more invoices [6-118], the deselected invoices are marked as withdrawn [6-120].

The Purchaser then requests the recalculation of its Ebill issuance capability [6-114] and Draw Ebill (FIG. 6.1) is used to effect the recalculation being presented with those invoices previously processed less the invoices marked as withdrawn [6-122].

If the Ebills to be accepted are within the limit, GSN prepares an advice message [6-126] and notifies the Purchaser [6-129]. The procedure concludes with Draw Ebills (FIG. 6) executed [6-128].

If the Ebills to be accepted are still outside the limit, a check is made as to whether further reduction is possible by there being more than one related invoice not withdrawn [6-130].

If further reduction is possible, the Purchaser is advised [6-124] and asked if it wants to effect further reduction [6-136]. If the Purchaser elects for further reduction, the procedure uses Draw Ebill (FIG. 6.1) [6-122], which will exclude the one or more invoices marked as withdrawn. [After a system set time interval (e.g. 24 hours), the withdrawn status is cancelled].

If further reduction is not possible, the Purchaser is advised that it is outside the limit and that further reduction is not possible [[6-132]. On advising the Purchaser that further reduction is not possible [6-138], the reduce invoice process is terminated [6-140].

Referring now to FIG. 6.4, which is an activity diagram setting out the method of discounting Ebills to cash by selecting one or more Ebills to be endorsed and discounted to cash.

The Member (whether a Vendor or a Purchaser) holding Ebills receivable recorded on the Ebill Register elects to discount one or more or any part of its Ebills to cash at any time between the issue date and the time of its presentation on the Due Date [6-150]. If there are no Ebills available for discounting, the discount process is ended and the Member so informed [6-151].

The Member is offered three modes [6-152]: (a) request a specific amount of cash; (b) select one or more Ebills to be discounted in their entirety; or (c) select automatic discounting to cash on the issuance of each Ebill receivable.

If the Member selects to request a cash amount, the method uses FIG. 6.5—Discount Cash Amount.

If the Member selects to discount one or more Ebills in their entirety [6-52] then the Ebills recorded on the Ebill Register as being held by the Member are selected [6-154]. The Member then views the Ebills recorded on the Ebill Register [6-156] and selects the Ebills which it requires to discount [6-158]. The Member then selects the currency for the discount cash [6-160].

The Discounter maintains a discounting rate table by currency following known principles for setting such spot and forward delivery rates [6-162]. These rates are stored by GSN [6-164].

The method then calculates the net discount offer in the selected currency for the selected Ebills [6-166].

The discount offer is proposed to the Member [6-168], who views it [6-70] and decides whether to accept or reject the offer. If the offer is rejected [6-172], the process terminates.

If the offer is accepted, the selected Ebills are endorsed to the Discounter [6-174] and the Invoice Register is updated to record that the selected Ebills have been endorsed together with the Discounter ID [6-176].

The Member's standing discount cash remittance instructions (further explained in FIG. 7) are selected [6-177], and GSN then notifies the Discounter that the discount deal has been effected [6-178]. The deal is confirmed to the Member [6-179] and executed by the Discounter [6-180]. The Discounter uses its own system to effect remittance of the discounted cash to the Member. When both the Member and the Discounter have been notified, the discount deal is completed [6-182].

If the Member has pre-set the standing instruction to automatically discount all Ebills received to cash (further explained in FIG. 7), then on a system set periodic frequency (e.g. each day) the Ebill Register is polled by Member for any new Ebills held which are then endorsed to the Discounter [6-74]. The process then proceeds as for the manual selection of Ebills at [6-74].

Referring now to FIG. 6.5, which is an activity diagram setting out the method of discounting Ebills to cash by requesting a cash sum required and endorsing one or more Ebills or any part thereof as consideration.

This procedure continues from FIG. 6.4 [6-152] where the Member has selected the discount cash amount mode [6-200].

The Discounter maintains a discounting rate table by currency following known principles for setting from time to time spot and forward delivery rates [6-162]. Those rates are stored by GSN [6-164].

The Member selects the currency for the discount cash [6-160] and enters the requested amount of cash [6-202].

The method then calculates the net discount offer in the selected currency for the selected Ebills [6-204].

The discount offer is proposed to the Member [6-206], who views it [6-207] and decides whether to accept or reject the offer. If the offer is rejected, the process terminates [6-238].

If the offer is accepted, GSN prepares a pro-form a invoice on behalf of the Discounter for the amount of the cash required plus commissions, fees and charges [6-210]. This aspect of the present invention is further explained in FIG. 11.1.

The pro-form a invoice is submitted, using the Submit Invoice method (FIG. 3.1) [6-212] with its payment status set to 'Pay Now'. This aspect of the present invention is further explained in FIG. 11.1.

The Draw Ebills method (FIG. 6.1) is then used to request the drawing of an Ebill in settlement of the submitted invoice [6-214].

If the invoice is paid [6-216], the Member's standing discount cash remittance instructions (further explained in FIG. 7) are selected [6-217], and GSN then notifies the Discounter [6-220] and the Member [6-222] that the discount deal has been effected [6-224]. The Member is informed that the deal has been executed by, for example, SMS or by email. The Discounter uses its own system to effect remittance of the discounted cash to the Member.

If the invoice is not paid, the deal is cancelled [6-228], the Member notified [6-230] and the invoice is deleted [6-232]. The pro-form a invoice is deleted from the Invoice Register [6-234]. The proposed discount deal is cancelled [6-236].

Referring now to FIG. 6.6, which is an activity diagram setting out the method of transferring one or more Ebills denominated in one currency into matching Ebills denominated in another currency.

The FX Trader sets FX transfer rates by currency pair following known principles for setting such spot and forward delivery rates [6-258]. These rates are stored by GSN [6-260].

The Member selects the FX transfer mode [6-250]. The Ebills recorded on the Ebill Register as being held by the Member are selected by currency [6-252]. The Member views the selected Ebills [6-254] and selects one or more whole Ebills for transfer into another FX currency [6-256]. The Member then selects the conversion currency [6-262].

The method then calculates the FX transfer offer in the selected currency for the selected Ebills [6-264].

The FX transfer offer is proposed to the Member [6-266], who views the offer [6-268] and decides whether to accept or reject. If the offer is rejected, the deal is terminated [6-292]. If the offer is accepted, the relevant Ebill records are locked.

A pro-form a FX transfer invoice is raised by GSN on behalf of the Member listing the selected Ebills proposed for endorsement to the FX Trader in consideration for the acceptance by the FX Trader of Ebills matched on a one to one basis by Due Date at the currency converted value of the original currency amount [6-270].

The pro-form a invoice [6-270] is submitted, using the Submit Invoice method (FIG. 3.1) [6-212] with its payment status set to 'Pay Now'. This aspect of the present invention is further explained in FIG. 11.1.

The Draw Ebills method (FIG. 6.1) is then used to request the drawing of an Ebill in settlement of the submitted invoice [6-214].

If the invoice is paid [6-216], GSN then notifies [6-278] both the FX Trader [6-284] and the Member [6-280] that the FX transfer deal has been effected. The Member is informed by, for example, SMS or by email.

When both the Member and the FX Trader have been notified, the FX transfer deal is executed [6-286].

If the invoice is not paid, the deal is cancelled [6-288], the Member notified [6-290] and the pro-form a invoice is deleted [6-294] from the Invoice Register [6-296]. The proposed FX transfer deal is cancelled [6-298]. The locked Ebills records are simultaneously unlocked.

Referring now to FIG. 7, which is a use case diagram showing the methods by which GSN is administered for an embodiment of the present invention.

In the create, read, update and delete (CRUD) membership use case [7-0], the Administrator [1-24] manages the setting up and ongoing maintenance of the Member records. The records conform to known requirements together with management of user permissions. Member records specific to GSN include: bank account instruction of the Member for the collection and remittance of cash and standing instructions for discounting to cash of Ebills receivable.

The Administrator [1-24] uses the CRUD trading terms use case [7-02] to maintain the trading terms agreed between any trading pair of Members comprising one Vendor [1-02] and one Purchaser [1-04]. The trading terms to be recorded by GSN comprise:

Trading relationship type (e.g., Vendor [1-02] submits invoice; Purchaser [1-04] submits self-billed invoice; settlement by purchase order process; settlement by Purchaser [1-04] remittance advice).

Invoice approval type (e.g. automatic approval of invoice submission; automatic approval after a set period after the invoice date; manual approval).

Maximum delay from invoice submission date to invoice approval date.

GSN penalty rule (if any) to be applied where the invoice is approved late.

Number of days from invoice date to the Due Date for the Ebill drawn in settlement of indebtedness.

The Administrator [1-24] uses the CRUD fees and charges use case [7-4] to maintain the fees and charges made to Vendors [1-02] and Purchasers [1-04]. The fees and charges comprise:

Guarantee fee %
Ebill acceptance fee
Ebill drawing fee
Due date allowance %
Due date charge %
Vendor [1-02]/Purchaser [1-04] membership subscriptions
GSN Ebill discounting fee (ad valorem % and/or per item transaction fee)
GSN Ebill FX transfer fee (ad valorem % and/or per item transaction fee)

The Administrator [1-24] uses the CRUD submitted invoices use case [7-06] to maintain the status of a submitted invoice as agreed by the relevant Vendor [1-02] and Purchaser [1-04] in accordance with the Member's agreement with GSN (e.g. delete duplicated invoice; delete scam invoice; anti-money laundering actions; implementation of court orders).

Referring now to FIG. 8, which is a use case diagram showing the methods by which cash settlement is effected on or about the Due Date of an Ebill.

In the process case settlement use case [8-00], GSN uses the process to collect cash due from the Purchaser [1-04] on or about the Due Date of an Ebill.

The process cash settlement use case [8-00] is also used by GSN to remit cash due to the holder of the Ebill, which will be the Vendor [1-02] unless the Ebill has been endorsed when the payee will be one of the Discounter [1-12], the Ebill Trader [1-14] or the FX Trader [1-22], on or about the Due Date of an Ebill.

The process cash settlement use case [8-00], is also used by GSN to collect cash from the Guarantor [1-10] in the event of dishonor by non-payment of an Ebill by the Purchaser [1-04] on its presentment on or about the Due Date.

Referring now to FIG. 8.1A, which is an activity diagram setting out the methods for processing cash settlement on or about the Due Date of an Ebill.

GSN selects one or more Ebills due for cash settlement on or about the Due Date, taking account of banking days of the currency in which the Ebill(s) are denominated [8-01]. The Ebill(s) are then selected by acceptor who is either the Purchaser or the Ebill Trader [8-02].

GSN then prepares and issues a cash collection instruction to the bank, in known banking format [8-04] which is auctioned by the bank [8-10] which confirms the collection status [8-12]. This is recorded by GSN [8-14]. GSN also prepares a cash collection advice for the acceptor [8-06] who is notified of the collection [8-08].

If there is no default, then the funds are received from the acceptor [8-16] and the cash collection process is completed [8-14].

If there is a collection default, then GSN notifies the default [8-18] to the acceptor [8-20] and activates the default cash collection facility by preparing and issuing a cash collection instruction to the bank [8-30]. The bank provides the default drawdown by remitting or transferring the default cash amount [8-32] to GSN's bank account [8-34].

If there is a collection default, then GSN notifies the default [8-18] to the guarantor [8-22] and the guarantor activates its own default process [8-24], and advises the acceptor that the process has been activated [8-26]. The default process continues until completion [8-28].

Referring now to FIG. 8.1B, which is an activity diagram setting out the methods for paying cash to the relevant holder of an Ebill on or about the Due Date.

Whether or not there is a collection default, the Ebills due for settlement or about the Due Date are selected by payee taking account of banking days of the currency in which the Ebill(s) are denominated [8-50]. The payee will be the Vendor or, by endorsement, the Ebill Trader or the Discounter [8-52].

GSN then prepares and issues a cash payment instruction to the bank, in known banking format [8-54] which is auctioned by the bank [8-56] which confirms the payment status [8-58]. GSN then records the payment status [8-60].

In the event that payment to the payee failed, the failed payment process is activated [8-72] through to completion [8-76] and the payee is advised that the payment failed [8-74]. Otherwise, a payment advice is created for each payee [8-62], the payment is executed [8-68] and the payee is advised of payment [8-64]. On the payee's notification [8-66], the cash payment process is completed [8-70].

Referring now to FIG. 9, which is a use case diagram showing the methods by which a Participant may view accounts held by GSN.

In the Process Accounts use case [9-00], Participants, including the Vendor [1-02], the Purchaser [1-04], the Guarantor [1-10] and the Collector of Taxes [1-20], as well as the System Administrator [1-24] are permitted to select and view any relevant accounts.

In addition, the Process Accounts use case interfaces with the Pay Vendors use case detailed in FIG. 5 [9-04] to enable payments to be made within the system.

The Guarantor [1-10] also uses this method to manage the Guarantee Administration use case [9-02] which CRUDs credit risk limits and fees.

Referring now to FIG. 9.1 which is an activity diagram setting out the methods by which Participants and the Administrator are permitted to select and view individual accounts.

Any authorised Participant or the Administrator is permitted to select an account to view [9-10], determining the period of the report [9-12]. It then views the relevant account [9-14].

The open invoices are selected from the Invoice Register [9-16] and related Ebills are selected from the Ebills Register [9-18]. The selected records are merged in order to compile the requested account [9-20]. The account is displayed [9-22] and viewed by the Participant or the Administrator [9-24] which selects further action [9-26]. It either instructs the execution of further action [9-28] or no further action which prompts the selection of another account [9-32].

On completion of the account action, the Participant or the Administrator either selects to take further action on the selected account [9-30] by reverting to [9-26] or, if no further action is to be taken, either a further account is requested [9-32] or the process accounts method is completed [9-34]. If the Participant wishes to review further accounts then it reverts to selecting an account [9-10].

Referring now to FIG. 9.2, which is an activity diagram setting out the methods by which the Guarantor administers the credit risk limits and fees related to the guarantees it provides to Purchasers.

The method opens from Process Accounts, FIG. 9.1, [9-50] with the account selected [9-52]. The account action manage guarantee is selected [9-54].

The Guarantor then CRUDs any one or more of the guarantee status [9-56], the guarantee fee charged [9-58] or the credit limit [9-60].

Any revisions are displayed [9-62] and notified to the relevant Purchaser [9-64] and the revised terms are filed [9-66].

The Guarantor either selects a further account [9-68] to be managed by reverting to Process Accounts [9-50] or the guarantee administration process is terminated [9-70].

Referring now to FIG. 10 which is a use case diagram showing the methods by which the collection and refund of sales taxes are processed in conjunction with Ebills.

In the process tax collection use case [10-00], the Vendor [1-02] and the Purchaser [1-04] review and approve sales tax returns (e.g. EU VAT returns) which are also reviewed, investigated, approved or blocked by the Collector of Taxes [1-20].

Referring now to FIG. 10.1, which is an activity diagram setting out the method for processing sales tax collection and refund in conjunction with Ebills.

The Collector of Taxes maintains the tax review and return rules [10-40].

The Member initiates periodically (e.g. daily), either by manual selection or pre-set automated instruction, a sales tax return [10-20].

GSN polls the Invoice Register for any newly approved invoices [10-22].

GSN selects those invoices submitted by the Member as Vendor or approved or submitted by the Member as Purchaser since the date of the previous auto sales tax return [10-24].

A list of invoices on which the Member is the Vendor is prepared [10-26]. A total calculated for the output taxes payable ("A") and the total outputs (e.g. goods and services) is also calculated [10-28].

A list of invoices on which the Member is the Purchaser is prepared [10-30]. A total calculated for the input taxes refundable ("B") and the total inputs (e.g. goods and services) is also calculated [10-32].

The values are stored [10-33] and the sales tax return is prepared including calculation of the net tax payable or refundable [10-34], applying the review and return rules [10-42]. The Member reviews the return and either approves the return by applying a digital signature [10-36] or rejects the return [10-38].

The return, having been approved by the Member, is reviewed by the Collector of Taxes [10-44] applying the review and return rules [10-42]. If selected, the Collector of Taxes reviews the invoice details [10-46] using FIG. 9. A decision is then made either to approve or block the return [10-48].

If the return is not approved, the return is blocked [10-58] and return action cancelled [10-60]. The Member is notified of the blocking [10-61] as is the Collector of Taxes [10-62]. The GSN return process is cancelled [10-64].

If the return is approved by the Collector of Taxes [10-48], the return is recorded as approved [10-50].

If net tax is to be collected, a tax collection demand, configured as a GSN generated invoice, is created [10-52] and submitted for collection [10-54]. The collection is advised to the Member [10-53] and to the Collector of Taxes [10-72].

If net tax is to be refunded, a tax refund request, configured as a GSN generated invoice, is created [10-66] and submitted [10-68]. The refund is advised to the Member [10-55] and to the Collector of Taxes [10-74], at which point the Collector of Taxes review is completed [10-76].

Referring now to FIG. 11.1, which is a schematic representation of the database format for the Invoice Register together with example type keys for invoice type and invoice status.

(Rows 2, 3 and 4) are examples of invoices before the Ebills are drawn, detailing their invoice type, approval status, payment status, invoice total, total previously paid and amount approved to pay.

(Rows 5, 6 and 7) are examples of invoices after the Ebills have been drawn, detailing their invoice type, approval status, payment status, invoice total, total previously paid and amount approved to pay.

Referring now to FIG. 11.2, which is a schematic representation of the database format for the Invoice Part Payment Register together with example type keys for invoice type and invoice status.

The field names shown are the GSN document ID, the cross reference to the GSN ID of the related invoice on which the part payment has been made, the GSN ID of the related Debit Advice (if any), the Ebill ID which effected the part payment, date paid and the amount paid.

Referring now to FIG. 11.3, which is a schematic representation of the database format for the Ebill Register together with example type keys for Ebill type, Ebill status and Ebill endorsement type.

The field names shown on (Row 1) are continued on (Row 6).

The examples recorded on the Ebill Register on (Roams 2, 3, 4 and 5) are continued on (Rows 7, 8, 9, and 10).

The examples shown detail their Ebill type, Ebill status, issue date, due date, currency, amount, amount due from the acceptor, guarantee amount, guarantee fee (rate, term and amount), acceptance fee and drawing fee.

Referring now to FIG. 12, which is a deployment diagram setting out the physical elements of the Client/Server network to enable deployment of the GSN application software, comprising the GSN server software [12-01] and the GSN client software [12-02].

The GSN server software [12-01] is initially deployed to a single physical server, but the scalability of the software will enable the application to be clustered and deployed across a number of physical servers.

The GSN client software [12-02] initially consists of a Java Applet which is deployed using Java Webstart and gathered via a Participant's web browser. The client software will be updated to integrate the existing computer systems of all those GSN Participants [12-03] requiring integration to their back-office systems. The term 'client software' in this context therefore refers to all Participants' client software that communicates to the GSN server software.

The client software enables Participants to securely logon to GSN with a one-time password provided by a secure token. The one-time password is used to authenticate the Participant by cryptographically verifying the password with a Security Server [12-04] located in the GSN server software. Once logged in the Participant has controlled access to a number of screens detailing relevant and selected information provided by the GSN server software, including review of Participant details, invoice summaries, invoice transaction registers, invoice approval, payment and part-payment status, EBill registers and EBill presentment [12-11].

The client software communicates with the GSN server via server-published web services [12-05], utilising SOAP over HTTPS [12-06]. The web services are published in the HTTP Web Server [12-07], exposing interfaces to the session facade [12-08] of the Application Logic [12-09] residing within the J2EE Application Server [12-10]. The web services provide a Participant with restricted access to trading and settlement data and also enables use of the invoice-based messaging system [12-11]. Purchasers are able to use the client software to process settlement of invoices through generation of Ebills. The session facade [12-08] represents the loosely coupled interfaces to the Session EJBs which make up the Application Logic, thereby enabling logic changes without changes to the exposed interfaces.

For those Participants' back-office systems that support web services, both the GSN web services and the Participants' back office systems can be configured to enable use of back-office systems in place of the GSN client software java applet if desired. Alternatively, other 'Participant-specific' java applets could be developed to utilise the web services.

For upload and downloading of specific electronic trading and settlement documents [12-12], the web services are not utilised. Instead, the client software uploads and downloads documents to specific GSN URLs [12-13] transferring data to Java Servlets. Because the Servlets reside within the Application (J2EE) server, they have access to the namespace of the GSN Application Logic Session EJBs (Enterprise Java Beans) [12-09] enabling the Servlets to call the appropriate application logic to process the electronic documents. The 'Document Mapping' object [12-14] on FIG. 12 collectively represents the Servlets and EJBs utilised to map and process the electronic documents.

The GSN application software is securely administered utilising PHP (HTML-based) scripts [12-15] published by the HTTP Web Server and accessed using an administrator's web browser [12-16]. The administration interface enables setup of all appropriate Participants including company details, users, privileges, trading terms and relationships. The administration interface also provides access to the system facilities including the Audit Log [12-17] which records all Participant, Administrator and System events. Future enhancements may result in Participant administrative functionality being performed within the GSN client software java applet, with GSN system administration being performed using an additional administration java applet and support from remaining PHP scripts.

The business logic of GSN is implemented by the Session EJBs [12-09]. These EJBs interface with the client software through web services and Servlets, and interface with the database [12-18] using the Entity EJBs [12-19]. The Entity EJBs represent the interface to the database within the J2EE Application server, and also contain some elements of logic to assist data retrieval and storage.

The Session EJBs [12-09] implement the application logic to provide the GSN trading capabilities, including Messaging, User Authentication, Invoice Processing, EBill processing and Settlement amongst other areas.

To carry out the necessary application logic, the Session and Entity EJBs utilise standard J2EE services [12-20] provided by the Application Server, including the Java Authentication and Authorization Service (JAAS) facilitating integration with a $3^{rd}$ Party Security Server [12-04], the Java DataBase Connectivity service (JDBC) providing access to the SQL database, and also the Java Naming and Directory Interface (JNDI). JNDI enables the application to integrate with both Java objects and other directory services such as DNS.

The relational database [12-18] efficiently manages access to the large amounts of data. It is implemented on an industry leading product renowned for its scalability and industrial strength for large-scale commerce. The database schema includes items such as a single Settlement Ledger [12-21] that ensures all transactional data is stored together to ease review of net positions. The Settlement Ledger can be combined with additional data to provide a view of the Ebill, invoice and part payment registers.

Referring now to the Ebills receivable account, which is now described in detail.

The Ebills Receivable Account displays per account: account number, account name, account status (open, suspended, closed) currency, date of displayed balance, and balance. The Ebills Receivable Account further displays per Ebill on the account: Ebill number, issue date, term, due date, supplier/drawer, issue fee rate, issue fee percentage applied, original amount, amount outstanding and status. The displayed Ebill status are: open (not matured), presented, paid, default (protested), traded (endorsed to the Ebill trader).

Referring now to the Ebills payable account, which is now described in detail.

The Ebills Payable Account displays per account: account number, account name, account status (open, suspended, closed), insurer/guarantor, current bill issue fee expressed as a percentage of bill value, maximum number of permitted days from issue date to due date (Term), currency, date of displayed balance, the total of bills payable outstanding, the free balance available for further Ebill issue and the guarantor's maximum exposure limit on the account. The Ebills Payable Account further displays per Ebill on the account: Ebill number, issue date, term, due date, supplier/drawer, issue fee rate, issue fee percentage applied, original amount, amount outstanding and status. The displayed status are: open (not matured), in presentment, paid, default (protested), traded (accepted all or in part against Ebills endorsed to the Ebill trader).

The invention extends to any one of, or any compatible combination of two or more of, the following clauses:

1. A system and method which enables members of a settlement network to submit and approve electronic invoices for payment integrated with the electronic drawing, accepting, guaranteeing, endorsing, trading, discounting, presenting and protesting of bills of exchange (which term includes letters of credit), denominated in any currency known as an Ebill.
2. A method according to Clause 1, wherein the vendor receives the proceeds of sale from its sales invoices at the time of or close to the invoice date by means of an Ebill.
3. A method according to Clause 1, wherein the Ebill is credit enhanced, insured or guaranteed to the equivalent of a rating standard of A-1/P-1.
4. A method according to Clause 1, wherein the process of drawing an Ebill is automated and is a consequence of issuing the invoice invoice.
5. A method according to Clause 1, wherein the process of accepting an Ebill in settlement of purchase invoices is automated following the approval for payment of one or more invoices.
6. A method according to Clause 1, wherein the vendor is provided with the means to transmit one or more invoices created as output from its own back-office system.
7. A method according to Clause 6, wherein the invoice is mapped to the invoice input format in the database.
8. A method according to Clause 6, wherein as an integral process consequent upon the action of transmitting one or more the sales invoices, the vendor confirms its instruction to draw one or more Ebills in settlement of the invoices transmitted.
9. A method according to Clause 1, wherein a purchaser functioning in self-billing mode transmits one or more self-billing invoices created as output from its own back-office system.
10. A method according to Clause 9, wherein the invoice transmitted in the self-billing mode are mapped to the invoice input format of the database.
11. A method according to Clause 9, wherein as an integral part of the action of the purchaser transmitting self-billed invoices, the vendor automatically confirms its agreement to the drawing of one or more Ebills in settlement of the invoices submitted and the purchaser further accepts those Ebills as drawn.
12. A method according to Clause 1, wherein the Purchaser submits a purchase order to GSN and the Purchaser having submitted a goods received note to GSN, the system calculates the invoice value of the goods delivered and the related sales taxes and generates a Vendor invoice for presentation and settlement.
13. A method according to Clause 1, wherein the Purchaser submits a purchase order to GSN and the Vendor having submitted a goods delivery note to GSN, the system calculates the invoice value of the goods delivered and the related sales taxes and generates a Vendor invoice for presentation and settlement.

14. A method according to Clause 1, wherein the Purchaser submits a purchase order to GSN and the Vendor having submitted a bill of lading to GSN, the system calculates the invoice value of the goods specified in the bill of lading and the related sales taxes and generates a Vendor invoice for presentation and settlement.

15. A method according to Clause 1, wherein the purchaser executes an accounts payable payment run in banking mode, creating and transmitting a bank payment instruction configured to a known bank payment instruction format thereby initiating an automated process for the drawing and accepting Ebills in settlement to its vendors.

16. A method according to Clause 15, wherein the action by the purchaser of creating and transmitting a bank payment instruction executes the vendor's instruction to draw one or more Ebills in settlement of the related invoices.

17. A method according to Clause 15, wherein the action of transmitting a bank payment instruction automatically executes the purchaser's acceptance of the Ebills thereby drawn.

18. A method according to Clause 15, wherein when the Purchaser submits a bank payment instruction, it also transmits one or more related remittance advises specifying the related vendor invoices settled by Ebill.

19. A method according to Clause 18, wherein the invoices specified in the remittance advice and entered in the invoice register are updated with the payment status.

20. A method according to Clause 1, wherein a member functions both as a purchaser and as a vendor, engaging in trading relationships, to be settled by Ebill, with any other member.

21. A method according to Clause 1, wherein a member may be any legal entity including a corporation, government or department of government, public sector organization, charity and including a person or partnership or other incorporated entity.

22. A method according to Clause 1, wherein provision is made for the secure storing and distributing of invoice and Ebill data concerning more subjects to and from authorised user sites operated on behalf of one or more authorised vendors, purchasers, guarantors, risk/liquidity managers, discounters and banks the method comprising: storing and maintaining Ebill settlement trading terms for each vendor/purchaser trading relationship; receiving and holding invoice data in a database; and securely enabling relevant authorised users to draw, accept, guarantee, endorse, present and protest Ebills.

23. A method according to Clause 1, wherein a database stores a single instance of each invoice and any summary of an invoice for all or any of the operational purposes of one or more authorised vendors, purchasers, guarantors, risk/liquidity managers, discounters and banks.

24. A method according to Clause 1, wherein an Ebill is represented on the system for all purposes by a single document of record for all or any of the operational purposes of one or more authorised vendors, purchasers, guarantors, risk/liquidity managers, discounters, FX traders and banks.

25. A method according to Clause 1, wherein the Ebill data is securely held on an Ebills register (Ebills Register) the data comprising: the identities of the drawer, acceptor, guarantor, and endorser (if any) together with their digital signatures plus the identity of the endorsee (if any), holder for value, issue date, denominated currency, amount, due date and presentment method.

26. A method according to Clause 25, wherein the Ebill data also includes the history and status of each Ebill in terms of when and by whom drawn, accepted, guaranteed, endorsed and to whom endorsed, presented and protested.

27. A method according to Clause 1, wherein an Ebill can be materialized [as a certified document] in printed form.

28. A method according to Clause 1, wherein an Ebill can be drawn and accepted with the number of days between the issue/acceptance date of the Ebill and its due date as agreed between each Vendor/Purchaser pairing.

29. A method according to Clause 1, wherein any Vendor 1 Purchaser pairing can agree their mutual terms of trade expressed in terms of the maximum number of days between the invoice date or the date of entry of the Vendor's sales invoice on the system and the issue date of the Ebill.

30. A method according to Clause 29, wherein the mutually agreed terms of trade preferably further provide that where the purchaser exceeds the contracted issue period before accepting an Ebill, the due date of the Ebill is foreshortened by a pre-agreed number of days related to the excess days beyond the agreed issue period.

31. A method according to Clause 1, wherein the Purchaser can withhold from acceptance the whole or any portion of one or more vendor invoices outstanding for settlement and automatically thus to amend the amount of the corresponding Ebill.

32. A method according to Clause 1, wherein Ebills are endorsed in their entirety without recourse to the endorser and the endorsee thereby becomes the payee, the endorser thereby having no further interest in or title to the Ebill.

33. A method according to Clause 1, wherein the Ebills register records acceptance by the Purchaser and the guarantee by a registered third party entity of one or more Ebills issued against the back-to-back endorsement to the registered third party entity of one or more or any part of the Ebill(s) receivable by the Purchaser.

34. A method according to Clause 1, wherein a Purchaser can accept one or more Ebill(s) and obtain a simultaneous guarantee for the accepted Ebill(s) by endorsing to a registered third party one or more Ebill(s) receivable which it already holds or any portion thereof as back-to-back collateral for the accepted Ebills with or without a compensating charge or credit to the Purchaser to take account of the disparate due dates and amounts of the Ebills endorsed to and the Ebills guaranteed by the registered third party.

35. A method according to Clause 1, wherein a participant can set interest charging rates and interest compensation rates to be applied when evaluating Ebills endorsed to it by a Purchaser.

36. A method according to Clause 35, wherein a participant can automate the aggregation and netting by due date of the amounts of Ebills endorsed by the Purchaser as back-to-back collateral for the issue and guarantee by the registered third party of Ebills accepted by the Purchaser, calculating the net charging or compensation rate to be applied.

37. A method according to Clause 35, wherein any part of the amount of an Ebill endorsed in its entirety to the registered third party is in excess of the amount required as back-to-back collateral for the issue and guarantee by the registered third party of Ebills accepted by the Purchaser, it is a further important feature of the invention to provide a system and method for an registered third party to split the amount of the Ebill endorsed and issue to the account of the Purchaser an Ebill corresponding to the excess balance amount after taking account of the registered third party's fee, on the same terms including due date as the original endorsed Ebill.

38. A method according to Clause 35, wherein, if the total amount of one or more Ebills endorsed by the Purchaser to the registered third party is less than the total amount required as back-to-back collateral for the issue and guarantee by the registered third party of Ebills accepted by the Purchaser, the registered third party is provided with a system and method whereby the excess portion of an accepted Ebill is covered by a guarantee from a guarantor.

39. A method according to Clause 1, wherein it records on the Ebills register the endorsement of an Ebill without recourse to the endorser at any time between its issue date and its due date, the endorsee being a holder in due course.

40. A method according to Clause 1, which enables the Vendor as drawer to endorse and discount an Ebill to cash with a discounter without recourse to the Vendor as endorser.

41. A method according to Clause 40 wherein the discounter can consolidate by due date one or more Ebills to produce a corporate paper instrument with a corresponding total amount and due date for onward discounting in the money market.

42. A method according to Clause 1, wherein a trader can provide foreign exchange services so that the holder of one or more Ebills denominated in one currency can endorse the Ebill(s) to the trader as back-to-back consideration for the trader's acceptance of one of the same or a different plurality of Ebills denominated in one or more other currencies.

43. A method according to Clause 1, wherein the Vendor is provided with an Ebills receivable account which displays those Ebills recorded on the Ebills register which have been drawn by the Vendor and accepted by the Purchaser.

44. A method according to Clause 1, wherein the Purchaser is provided with an Ebills payable account which displays those Ebills recorded on the Ebills register which have been accepted by the Purchaser.

45. Message thread

46. A method according to Clause 44 which enables a guarantor to maintain, enforce and monitor a maximum exposure limit on each Ebills payable account for which it is the contracted guarantor and to set and maintain fees payable by the Purchaser for the guarantee on acceptance by the Purchaser of each Ebill payable.

47. A method according to Clause 1, which automatically presents the Ebill to the acceptor on the due date and either requests or instructs collection from the acceptor of the amount of the Ebill.

48. A method according to Clause 47 wherein, in the event that the amount is not collected on the Due Date or a predetermined number of days thereafter, the bill being thereby dishonored by non-payment, the system automatically protests the defaulted Ebill and collects the amount from the guarantor.

49. A method according to Clause 1, which authorizes the transmission of the value of the Ebill to the drawer or endorsee holder on the due date.

50. A method according to Clause 49 which aggregates the total of Ebills due for remittance to the Holder on that date or at any time thereafter.

51. A method according to Clause 1, which calculates and collects the Ebill issue fee for each Ebill on the issue date of the Ebill.

52. A method according to Clause 1, which provides Vendors and Purchasers with access to a near real-time system and method using electronic posting slips by which to record and book on their own back-office systems the drawing, accepting, endorsing and discounting of Ebills.

53. A method according to Clause 1, which provides the Vendor with integrated customer/accounts receivable accounts which displays the unpaid or part paid sales invoices held on the database for settlement by Ebill.

54. A method according to Clause 53 which enables the Vendor to review individual invoices, to hold invoices from payment and to accelerate payment of invoices before the due date for the settlement of the invoice.

55. A method according to Clause 53 which provides the Purchaser with access to a message thread related to a specific invoice and created between the Vendor and the Purchaser.

56. A method according to Clause 1, which provides the Purchaser with integrated supplier/accounts payable accounts which displays the purchase invoices held on the database for settlement by Ebill.

57. A method according to Clause 56 which enables the Purchaser to review, select and authorize payment of individual invoices, to withhold invoices from payment and to accelerate payment of invoices before the contracted date for the settlement of the invoice.

58. A method according to Clause 57 which provides the Purchaser with access to a message thread related to a specific invoice and created between the Vendor and the Purchaser.

59. A method according to Clause 1, which stores a single ledger instance which is viewed by the relevant Vendor and Purchaser as their respective customers' account and suppliers' account.

60. A method according to Clause 55 wherein the message thread is created, stored and displayed as a single sequential list of messages related to a specific invoice regardless of the identity of the authorized user creating each message in the message thread.

61. A method according to Clause 58 wherein the message thread is created, stored and displayed as a single sequential list of messages related to a specific invoice regardless of the identity of the authorized user creating each message in the message thread.

62. A method according to Clause 1, which provides Vendors and Purchasers with access to a near real-time system and method by which to record and book on their own back-office systems the settlement by means of Ebill of accounts receivable and accounts payable indebtedness.

63. A method according to Clause 53 which provides sales credit control tracking including reporting any delay or other delinquency in settlement by Ebill.

64. A method according to Clause 56 which provides the Purchaser with a system and method of raising a debit advice to the Vendor where all or any line of a Vendor's invoice is wrong as to product or line item identity, quantity, unit price, extension, taxation, delivery or other cause wherein the system calculates the details and total of the amount of purchase credit required including any sales tax adjustment.

65. A method according to Clause 56 which provides an integrated and automated system for the reporting, summarizing, netting, collection and refund of sales taxes.

66. A method according to Clause 64 which provides the Purchaser with a system and method of reconciling the debit advice with the Vendor's credit note.

67. A method according to Clause 64 which offsets the debit advice against the related invoice, adjusts the amount of the corresponding Ebill which has been drawn prior to its acceptance by the Purchaser.

68. A method according to Clause 1, comprising the gathering of vendor, purchaser self-billing and remittance advice derived invoice data at a central site and subsequently updates the distribution site with the gathered data.

69. A method according to Clause 1, wherein the invoice gathering step may comprise invoice data from more members where two or more members have different data transmission protocols, and for each Member having a different data distribution protocol, the method may further comprise implementing an appropriate communications protocol for gathering invoice data from each Member.

70. A method according to Clause 1, wherein the invoice gathering step comprises consolidating, integrating and reformatting gathered invoice data from the plurality of members.

71. A method according to Clause 70 wherein the Vendor or Purchaser or a Participant is provided with a viewable and/or printable image of an invoice in either a suitable GSN format or in the original invoice format with or without personalization with the images and layout of the original invoice format.

72. A settlement network substantially as herein described above and illustrated in the accompanying drawings.

The invention claimed is:

1. A computer system including a processor and a computer-readable storage medium for the settlement of pre-existing commercial indebtedness by means of a contractually agreed electronic legal equivalent of a bill of exchange (eBEX), the system being accessible by members of a settlement network including at least a vendor and a purchaser, the computer-readable storage medium further comprising:
   (a) an invoice submission mechanism including instructions stored on the storage medium for execution by the processor for the submission of pre-existing electronic invoices for settlement by eBEX; and
   (b) an eBEX creation mechanism including instructions stored on the storage medium for execution by the processor for causing the computer to create eBEXs for the settlement of pre-existing commercial indebtedness.

2. A computer system as claimed in claim 1 in which each eBEX is represented by a single document of record to which common access is provided to the members.

3. A computer system as claimed in claim 1 in which each invoice is represented by a single invoice record to which common access is provided to the members.

4. A computer system as claimed in claim 1 including a mechanism which, when an invoice is submitted, automatically instructs the eBEX creation mechanism to create one or more eBEXs in settlement of the invoice.

5. A computer system as claimed in claim 1, in which the invoice submission mechanism accepts self-billed invoices submitted by a purchaser.

6. A computer system as claimed in claim 5 in which the submission of a self-billed invoice by a purchaser causes the generation of one or more corresponding eBEXs in settlement of the self-billed invoice, the corresponding eBEXs being contractually binding on the purchaser.

7. A computer system as claimed in claim 6 including a mechanism whereby a vendor automatically confirms its binding agreement to the generation of one or more corresponding eBEXs.

8. A computer system as claimed in claim 1 wherein a vendor receives the proceeds of a sale from a sale invoice submitted to the invoice submission mechanism by means of an eBEX, the proceeds being received on or close to an invoice date.

9. A computer system as claimed in claim 1 in which the members include an eBEX acceptor and in which the eBEX record includes an eBEX due date, the system being arranged to present the eBEX to the acceptor on or about the due date and to request or instruct collection from the acceptor of the amount of the eBEX.

10. A computer system as claimed in claim 9 in which, in the event of the eBEX being unpaid or dishonored by the acceptor, the system collects the amount from a guarantor.

11. A computer system as claimed in claim 1 in which the system calculates and collects an eBEX creation fee whenever an eBEX is created.

12. A computer system as claimed in claim 1 in which the system creates a message thread, readable by both vendor and purchaser, related to a specific invoice.

13. A computer system as claimed in claim 1 including a mechanism for the automated collection of sales taxes.

14. A computer system as claimed in claim 1 including integrated supplier accounts-receivable accounts for displaying to a purchaser invoices held on the system for settlement by eBEX.

15. A computer system as claimed in claim 1 including an automated mechanism for accepting an eBEX in settlement of one or more invoices following approval of the one or more invoices.

16. A computer system as claimed in claim 1 including a mechanism for a member to endorse an eBEX to an endorsee, the system then recording the endorsee as the payee for the eBEX.

17. A computer system as claimed in claim 1 including a mechanism for a vendor as drawer to endorse and discount to a discounter an eBEX to cash without recourse to vendor as endorser.

18. A computer system as claimed in claim 17 including a mechanism for the discounter to consolidate a plurality of eBEXs and to create an instrument for onward discounting.

19. A computer system as claimed in claim 1 in which one of the members is a guarantor or eBEX trader, the system being arranged to record in connection with an eBEX a guarantee by the guarantor or eBEX trader of the amount of the eBEX or a part thereof 20. A computer system as claimed in claim 19 including a mechanism for a purchaser to accept an eBEX and to obtain a guarantee therefore by endorsing to the guarantor or an eBEX trader one or more eBEXs or a part thereof, which the purchaser already holds.

21. A computer system as claimed in claim 1 including a mechanism for a member to set charge and interest rates to be applied when evaluating an eBEX which has been endorsed to the member by a purchaser.

22. A computer system as claimed in claim 21 including a mechanism for the aggregation of eBEXs which have been endorsed by the purchaser and for the guarantee of the aggregate amount by a guarantor or eBEX trader.

23. A computer system as claimed in claim 21 wherein a purchaser endorses to an eBEX trader an eBEX or eBEXs the total amount of which exceeds that required as collateral for the issuance and guarantee by the eBEX trader of eBEXs accepted by the purchaser, and wherein the system issues to the purchaser an eBEX for the excess amount, less fees.

24. A computer system as claimed in claim 21 wherein a purchaser endorses to an eBEX trader an eBEX or eBEXs the total amount of which is less than that required as collateral for the issuance and guarantee by the guarantor or eBEX trader of eBEXs accepted by the purchaser, and wherein the guarantor or eBEX trader may cover the excess amount by a further guarantee recorded in the system.

25. A computer system as claimed in claim 1 in which the system automatically authorizes transmission of the eBEX amount to an eBEX drawer or an endorsee on the due date specified by the eBEX.

26. A computer system as claimed in claim 25 in which the system automatically aggregates for payment all eBEXs having a common due date.

27. A computer system as claimed in claim 1 in which one of the members is a guarantor, the system being arranged to monitor and enforce a maximum exposure limit in respect of eBEXs for which the guarantor member has guaranteed payment.

28. A computer system as claimed in claim 1 in which the system automatically amends the amount of an eBEX when a purchaser withholds from acceptance the whole or part of any corresponding invoice.

29. A computer system as claimed in claim 1 including an automated mechanism for drawing and accepting of eBEXs by a purchaser in settlement of its vendors.

30. A computer system as claimed in claim 1 in which the eBEX record includes data representative of the drawer and acceptor of the corresponding eBEX, and optionally their respective digital signatures.

31. A computer system as claimed in claim 30 in which the eBEX record further includes data representative of any guarantor, endorser, endorsee or holder for value.

32. A computer system as claimed in claim 1 in which the eBEX record includes data representative of the trading history of the corresponding eBEX.

33. A computer system as claimed in claim 1 in which, on receipt of an instruction from the purchaser, the system initiates a process for the generation of an eBEX.

34. A computer system as claimed in claim 1 which provides the vendor and the purchaser with electronic data for updating their respective back-office systems.

35. A computer system as claimed in claim 1 which provides the vendor with sales credit tracking information.

36. A computer system as claimed in claim 1 including a mechanism for the purchaser to review individual invoices, to hold invoices from payment, and to accelerate payment of invoices.

37. A computer system including a processor and a computer-readable storage device for the settlement of pre-existing commercial indebtedness by means of a contractually agreed electronic legal equivalent of a bill of exchange (eBEX), the system being accessible by members of a settlement network including at least a vendor, a purchaser, and a guarantor, the computer-readable storage device further comprising:
   an invoice submission mechanism including instructions stored on the storage device for execution by the processor for submission of pre-existing electronic invoices for settlement by eBEX;
   an eBEX creation mechanism including instructions stored on the storage device for execution by the processor for causing the computer to create eBEXs for the settlement of pre-existing commercial indebtedness;
   a guarantee mechanism including instructions stored on the storage device for execution by the processor to record a guarantee by the guarantor of an amount of an eBEX in connection with the eBEX.

38. A computer system as claimed in claim 37 further including a mechanism for a purchaser to accept an eBEX and to obtain a guarantee therefore by endorsing to the guarantor at least a portion of one or more eBEXs already associated with the purchaser.

* * * * *